(12) United States Patent
Matsumoto et al.

(10) Patent No.: US 12,007,931 B2
(45) Date of Patent: Jun. 11, 2024

(54) BUS SYSTEM AND COMMUNICATION DEVICE

(71) Applicant: Sony Group Corporation, Tokyo (JP)

(72) Inventors: Hideyuki Matsumoto, Tokyo (JP); Hiroaki Hayashi, Kanagawa (JP); Takashi Yokokawa, Kanagawa (JP); Naoki Yoshimochi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 1053 days.

(21) Appl. No.: 15/558,785

(22) PCT Filed: Mar. 25, 2016

(86) PCT No.: PCT/JP2016/059681
§ 371 (c)(1),
(2) Date: Sep. 15, 2017

(87) PCT Pub. No.: WO2016/163252
PCT Pub. Date: Oct. 13, 2016

(65) Prior Publication Data
US 2018/0074990 A1    Mar. 15, 2018

(30) Foreign Application Priority Data

Apr. 6, 2015 (JP) ................................ 2015-077328
Oct. 2, 2015 (JP) ................................ 2015-196644

(51) Int. Cl.
G06F 13/40    (2006.01)
G06F 13/36    (2006.01)
H04L 25/02    (2006.01)
H04M 1/00    (2006.01)

(52) U.S. Cl.
CPC .......... *G06F 13/4086* (2013.01); *G06F 13/36* (2013.01); *H04L 25/02* (2013.01); *H04M 1/00* (2013.01)

(58) Field of Classification Search
CPC ..... G06F 13/36; G06F 13/4086; H04L 25/02; H04M 1/00
See application file for complete search history.

(56) References Cited

U.S. PATENT DOCUMENTS

| | | | | |
|---|---|---|---|---|
| 5,263,138 A | * | 11/1993 | Wasserman | G06F 13/374 710/114 |
| 5,719,868 A | * | 2/1998 | Young | H04J 4/00 370/436 |
| 5,818,350 A | * | 10/1998 | Estakhri | G11C 8/12 340/9.16 |
| 6,356,106 B1 | * | 3/2002 | Greeff | G06F 13/4086 326/30 |

(Continued)

FOREIGN PATENT DOCUMENTS

| | | |
|---|---|---|
| JP | 62-036940 A | 2/1987 |
| JP | 03-254246 A | 11/1991 |

(Continued)

*Primary Examiner* — Eric T Oberly
(74) *Attorney, Agent, or Firm* — Michael Best & Friedrich LLP

(57) ABSTRACT

A bus system of the disclosure includes three or more devices that include one or a plurality of imaging devices, and transmit or receive data signals in a time-division manner; and a bus to which the three or more devices are coupled.

18 Claims, 44 Drawing Sheets

(56) References Cited

U.S. PATENT DOCUMENTS

| | | | |
|---|---|---|---|
| 6,918,007 B2* | 7/2005 | Chang | G06F 11/1076 711/114 |
| 7,577,251 B2* | 8/2009 | Kawada | G11B 20/00086 380/201 |
| 2003/0128702 A1* | 7/2003 | Satoh | G06F 13/37 370/390 |
| 2003/0200359 A1* | 10/2003 | Fernald | G06F 13/4291 710/5 |
| 2004/0153870 A1* | 8/2004 | Konz | H04L 12/40169 710/100 |
| 2005/0213725 A1* | 9/2005 | Rodman | H04L 12/66 379/202.01 |
| 2008/0005518 A1* | 1/2008 | Gillingham | G06F 13/4243 711/167 |
| 2008/0031166 A1* | 2/2008 | Fukuda | H04L 5/1469 370/297 |
| 2008/0286643 A1* | 11/2008 | Iwasaki | B01D 53/326 429/111 |
| 2009/0244310 A1* | 10/2009 | Kuwazoe | H04N 5/232 348/222.1 |
| 2010/0066404 A1* | 3/2010 | Zhang | H03K 19/0005 326/30 |
| 2011/0025695 A1* | 2/2011 | Yoshida | G09G 5/006 345/501 |
| 2014/0281753 A1 | 9/2014 | Wagh et al. | |

FOREIGN PATENT DOCUMENTS

| | | |
|---|---|---|
| JP | 06-006798 A | 1/1994 |
| JP | 10-084393 A | 3/1998 |
| JP | 2000-307410 A | 11/2000 |
| JP | 2002-325107 A | 11/2002 |
| JP | 2003-347923 A | 12/2003 |
| JP | 2008-042376 A | 2/2008 |

* cited by examiner

[FIG. 1]
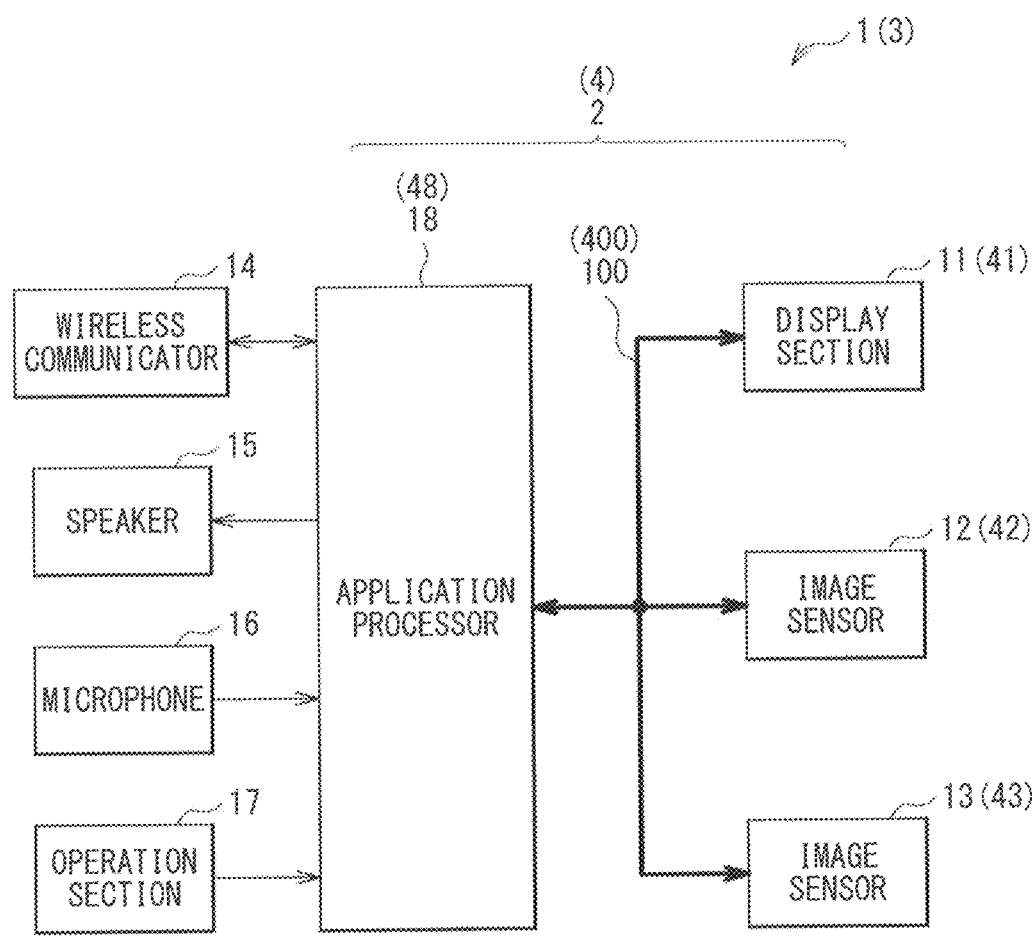

[FIG. 2]
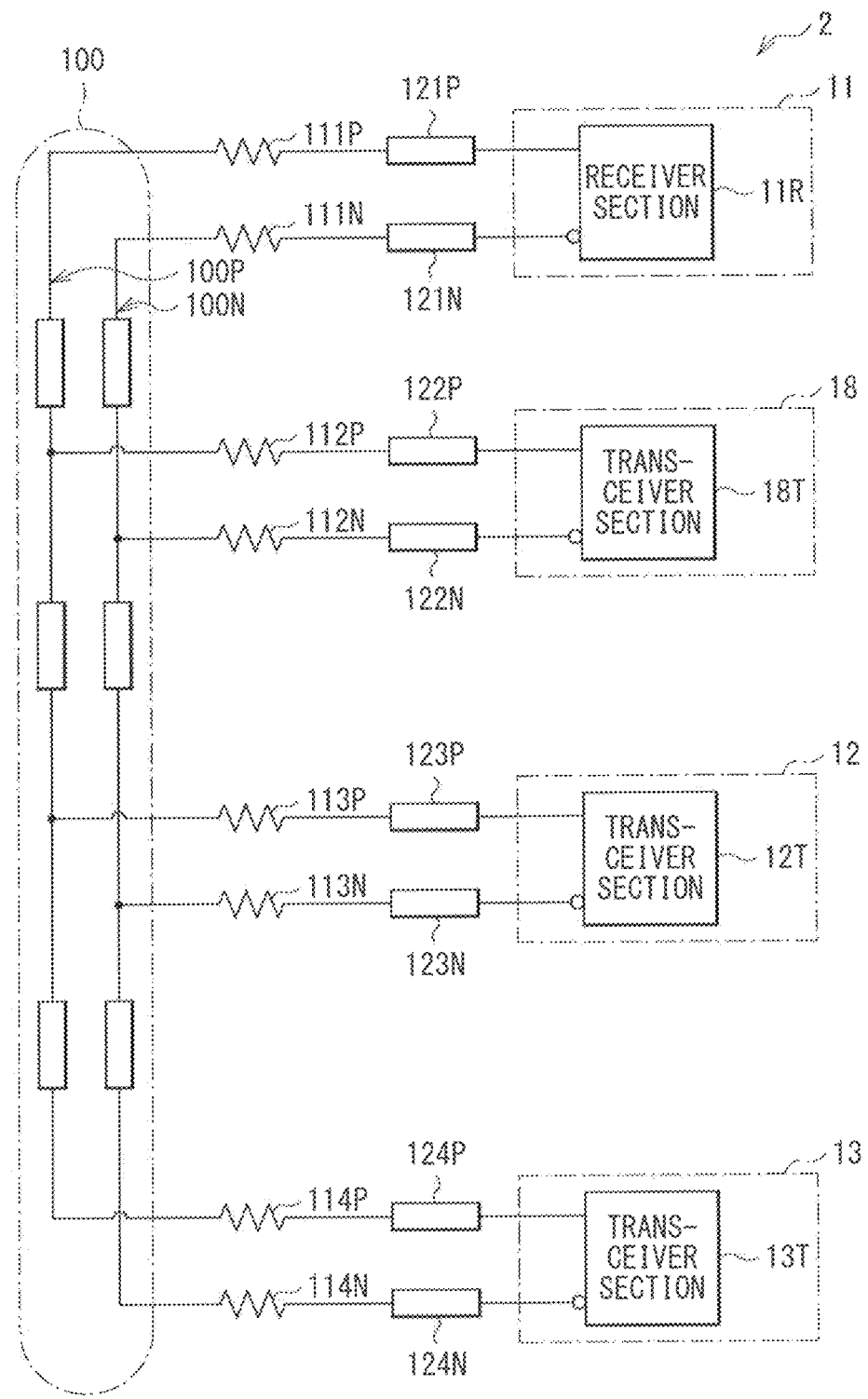

[FIG. 3]
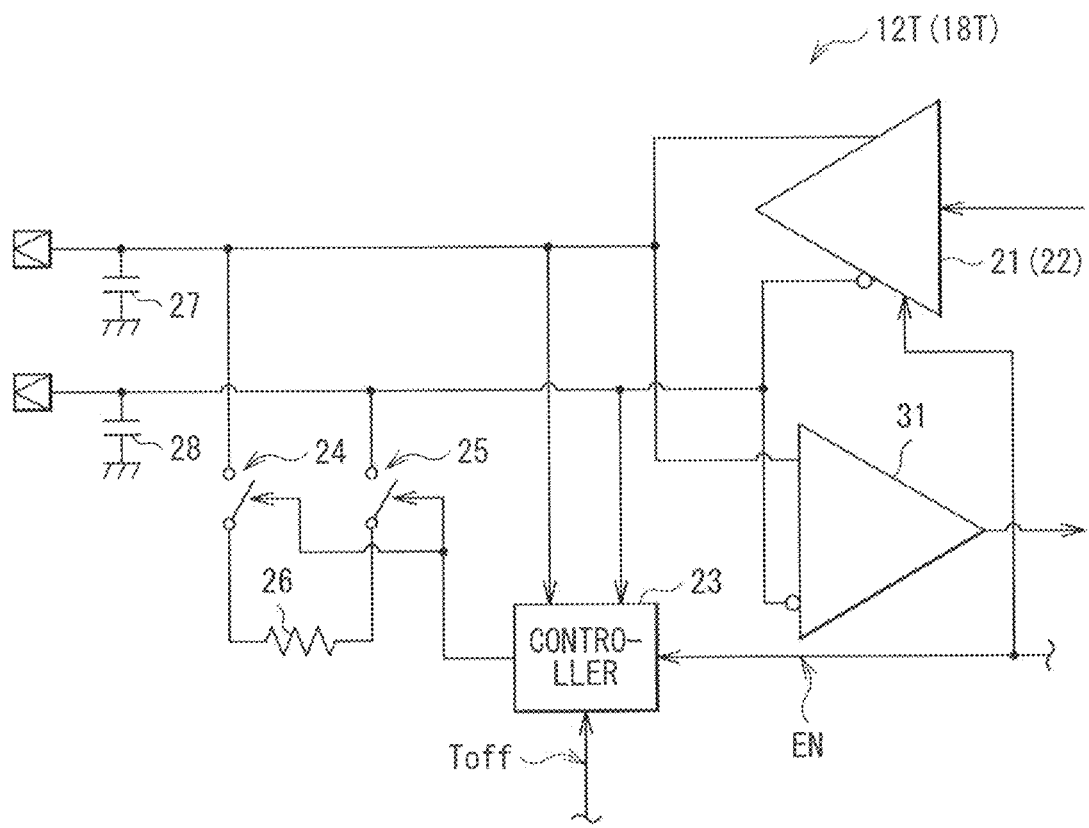
[FIG. 4]
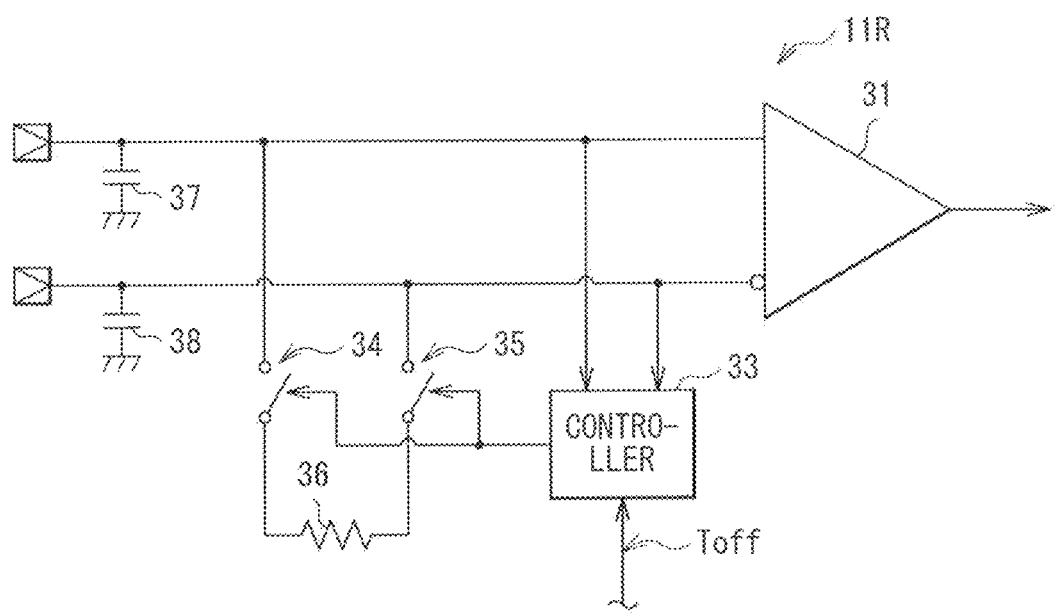

[FIG. 6A]
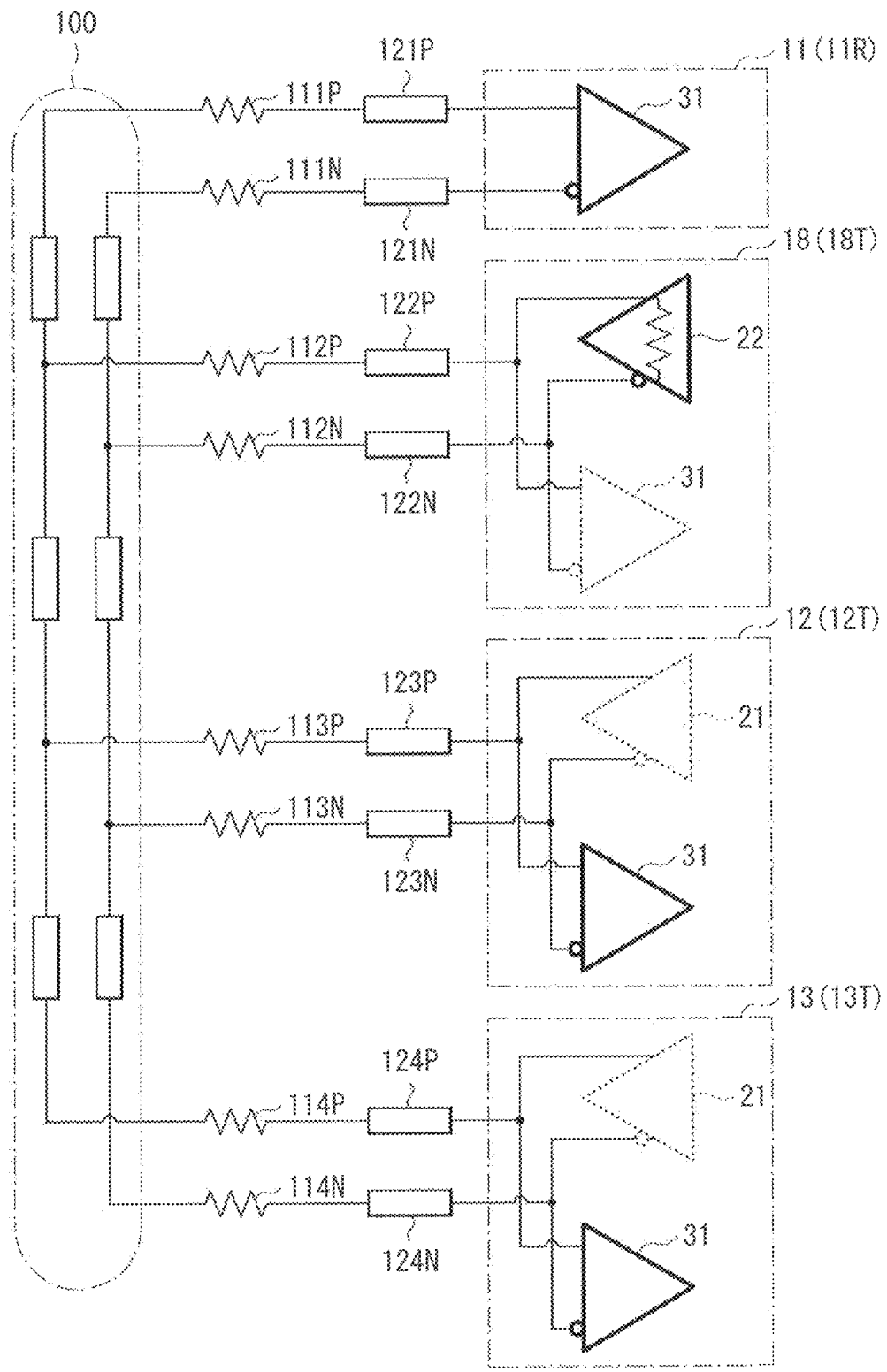

[FIG. 6B]
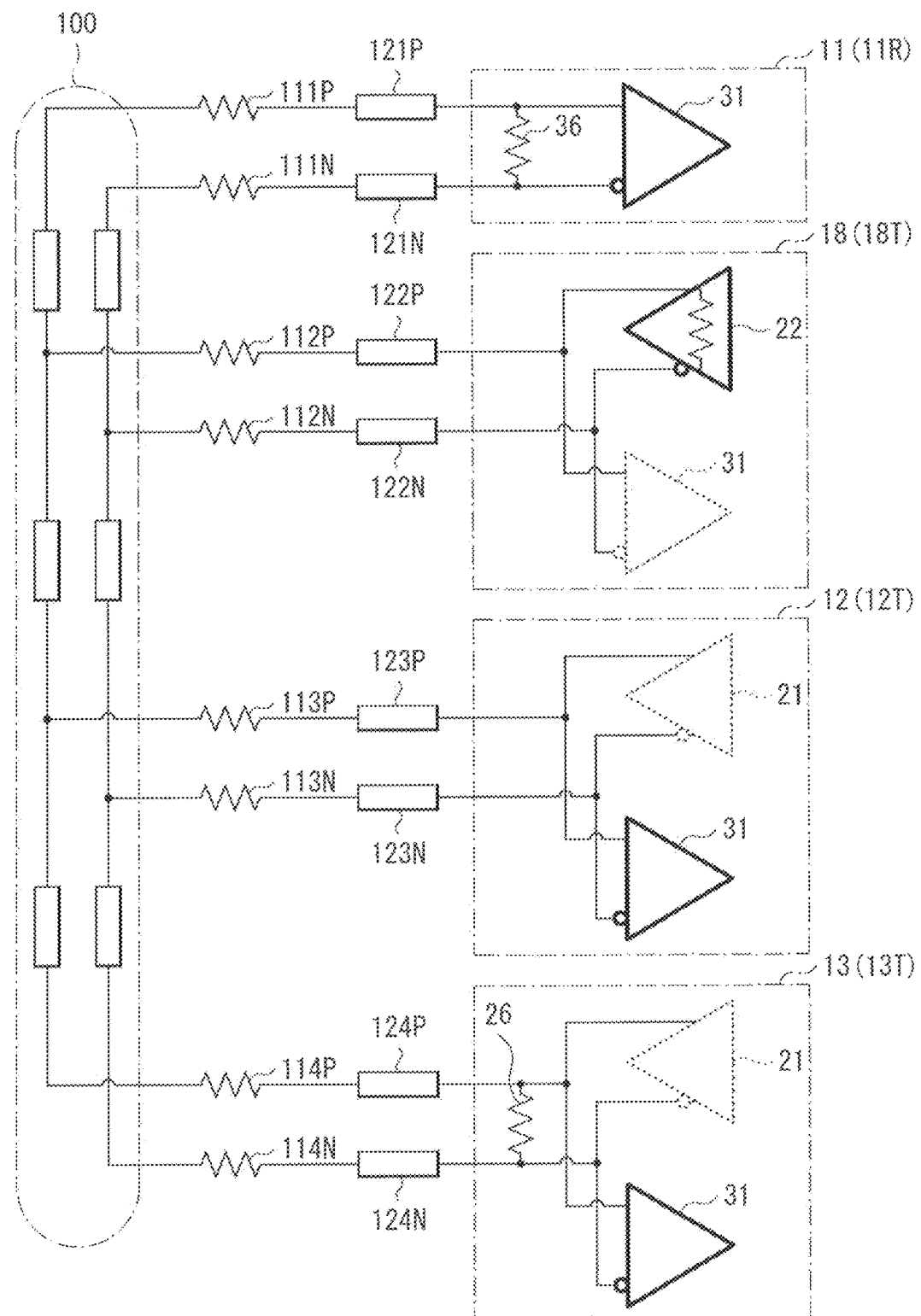

[FIG. 6C]
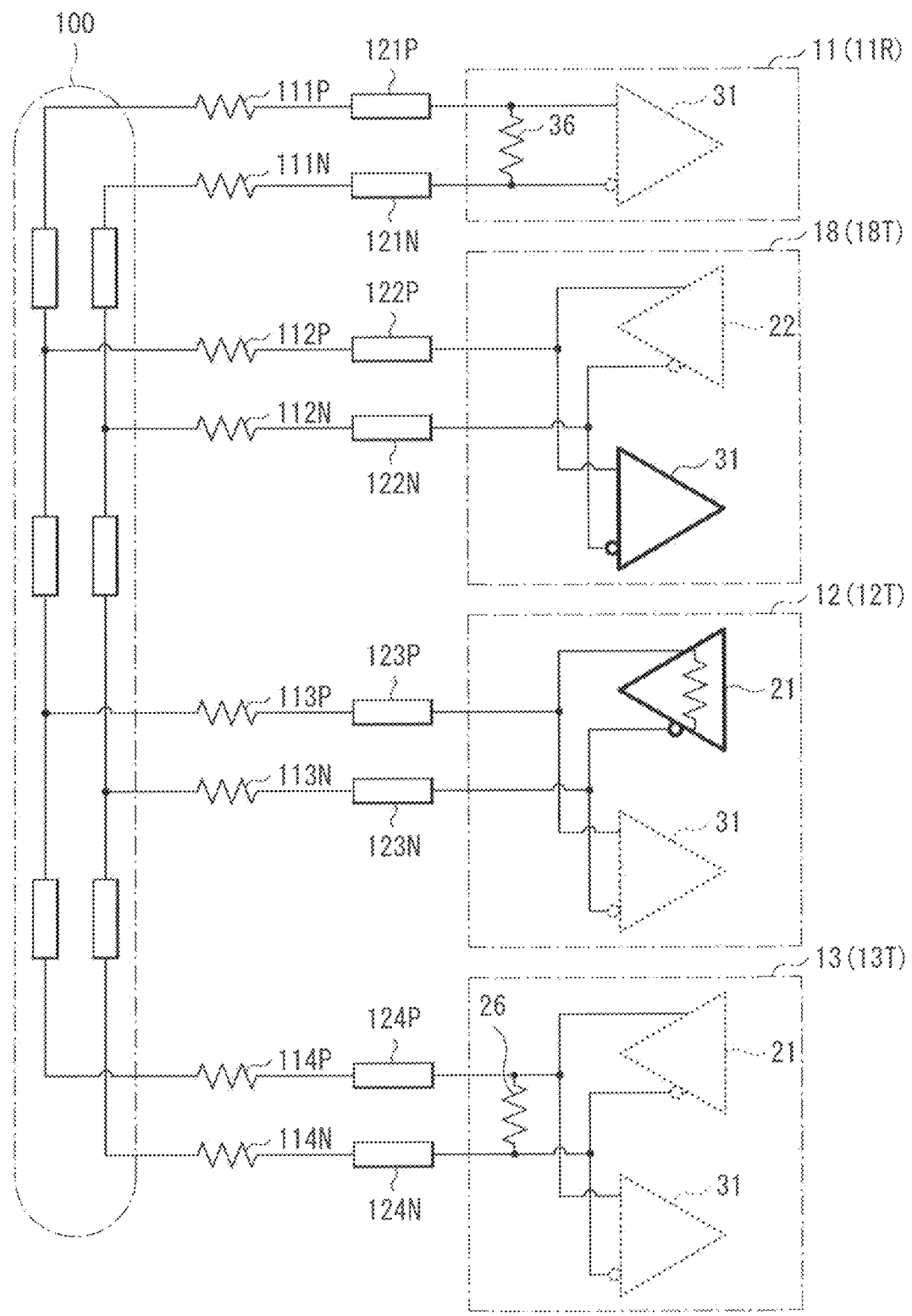

[FIG. 6D]
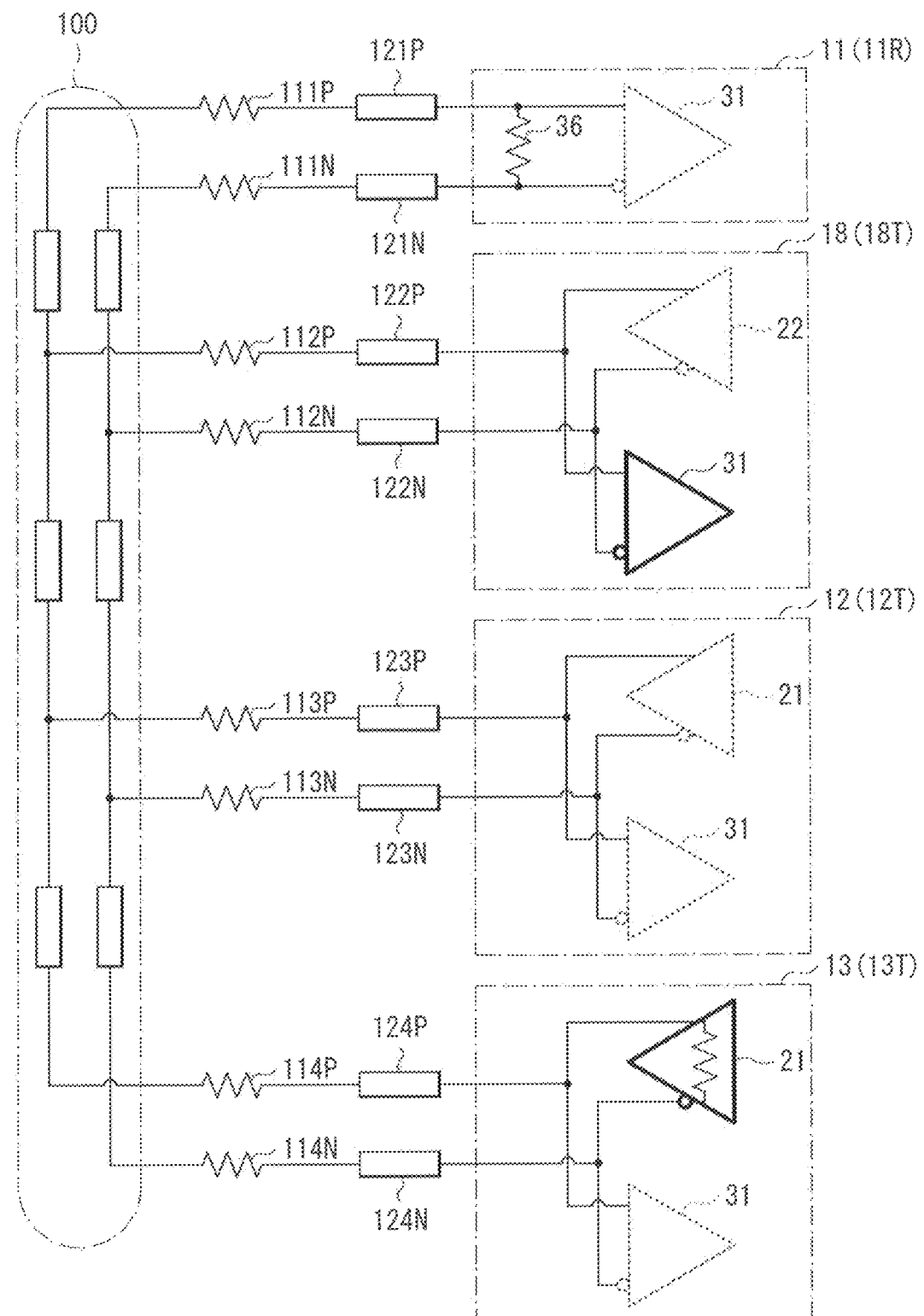

[FIG. 6E]
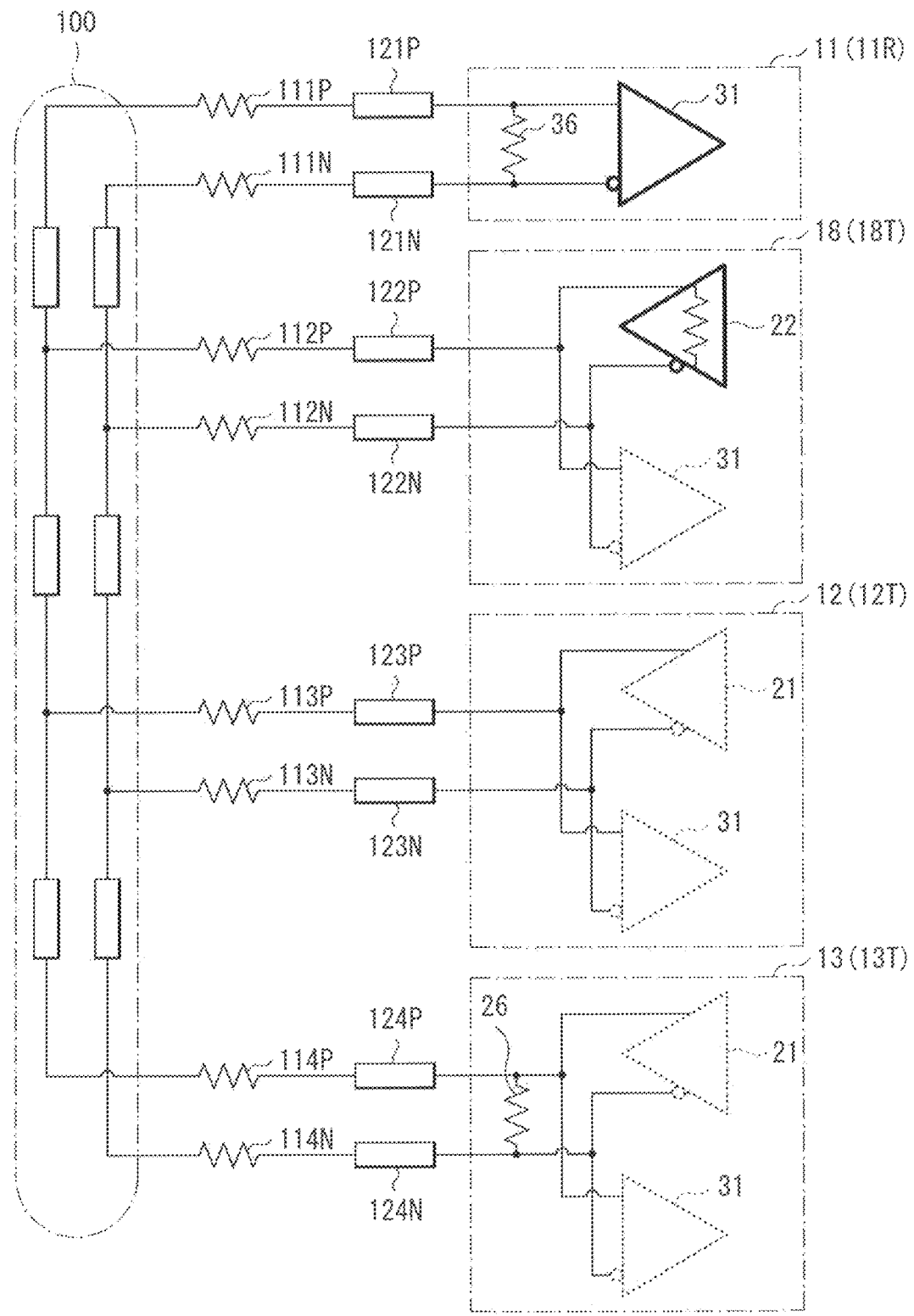

[FIG. 7A]
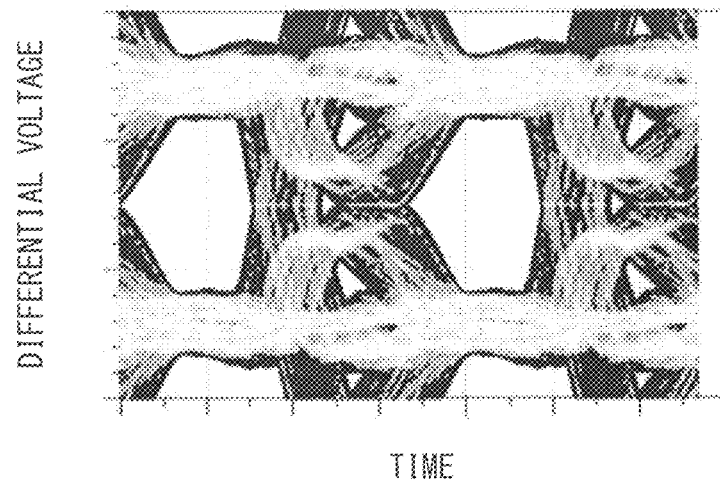
[FIG. 7B]
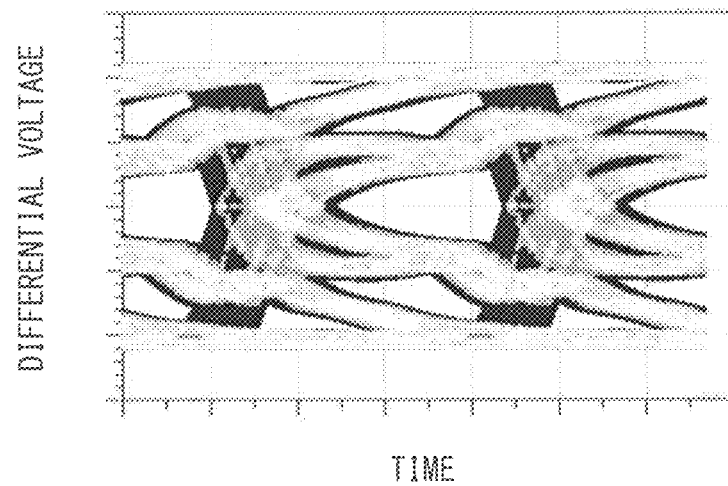
[FIG. 8]
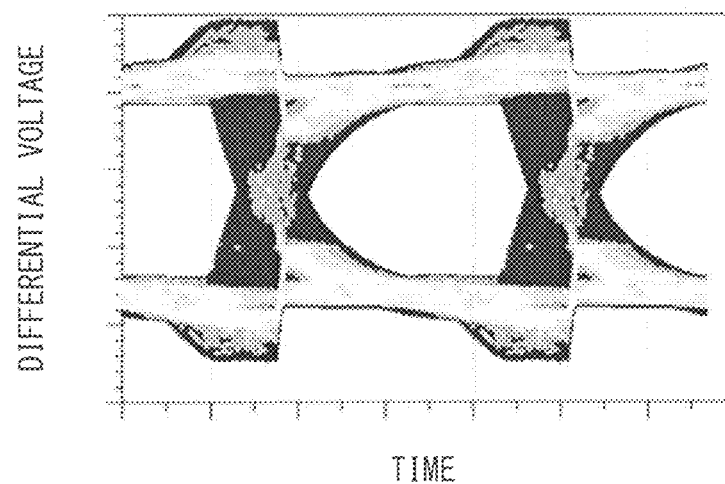

[FIG. 9]
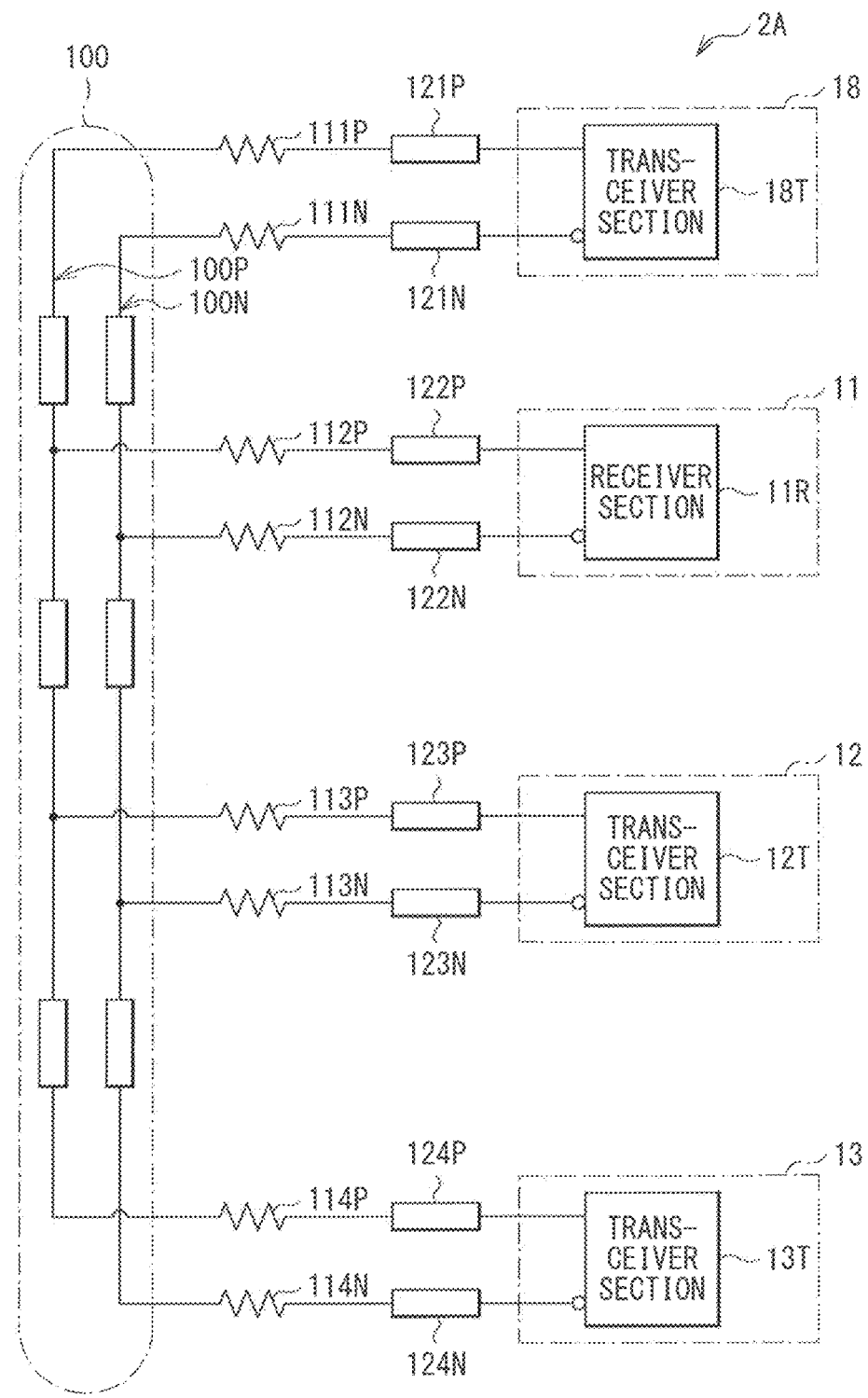

[FIG. 10A]
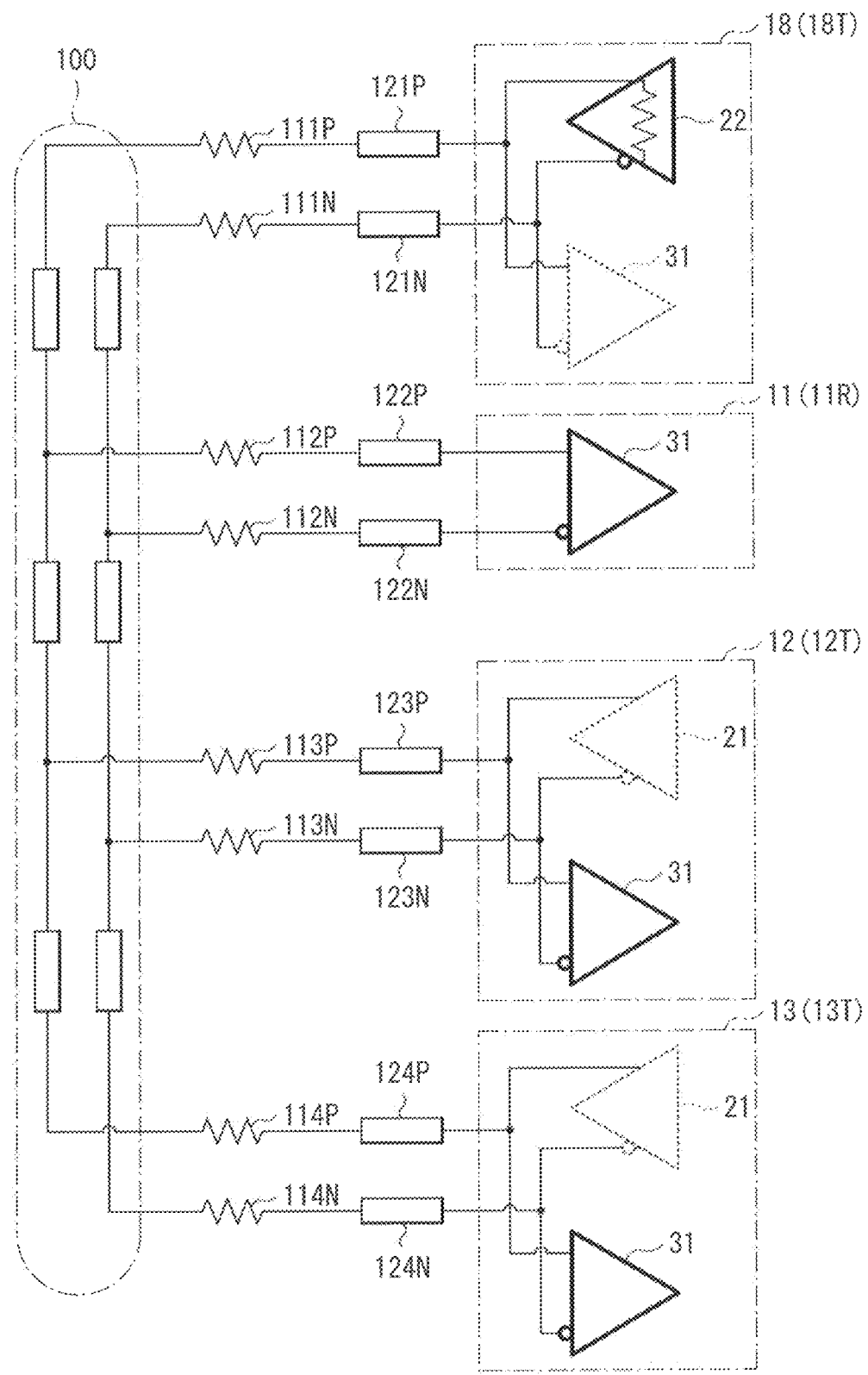

[FIG. 10B]
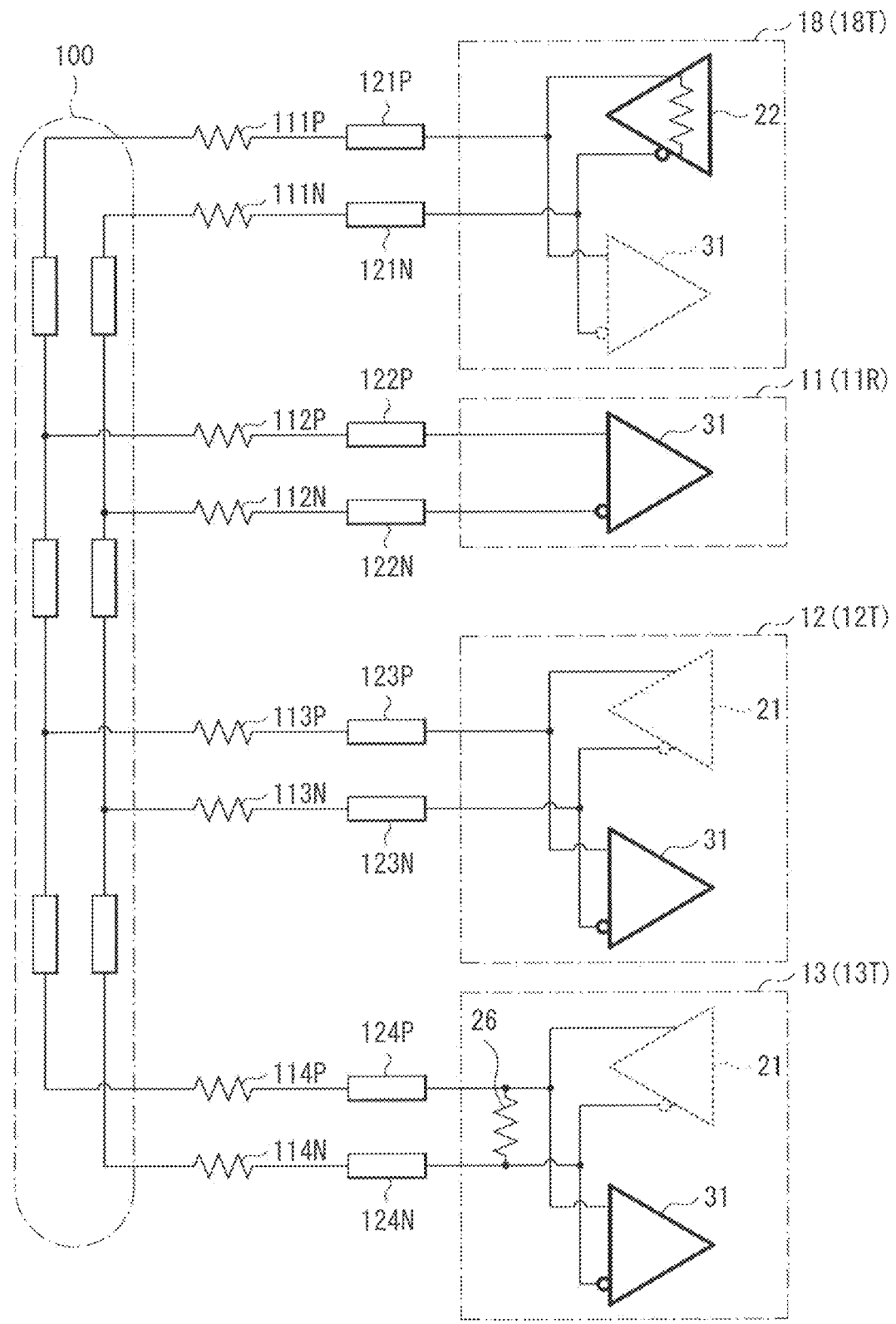

[FIG. 10C]
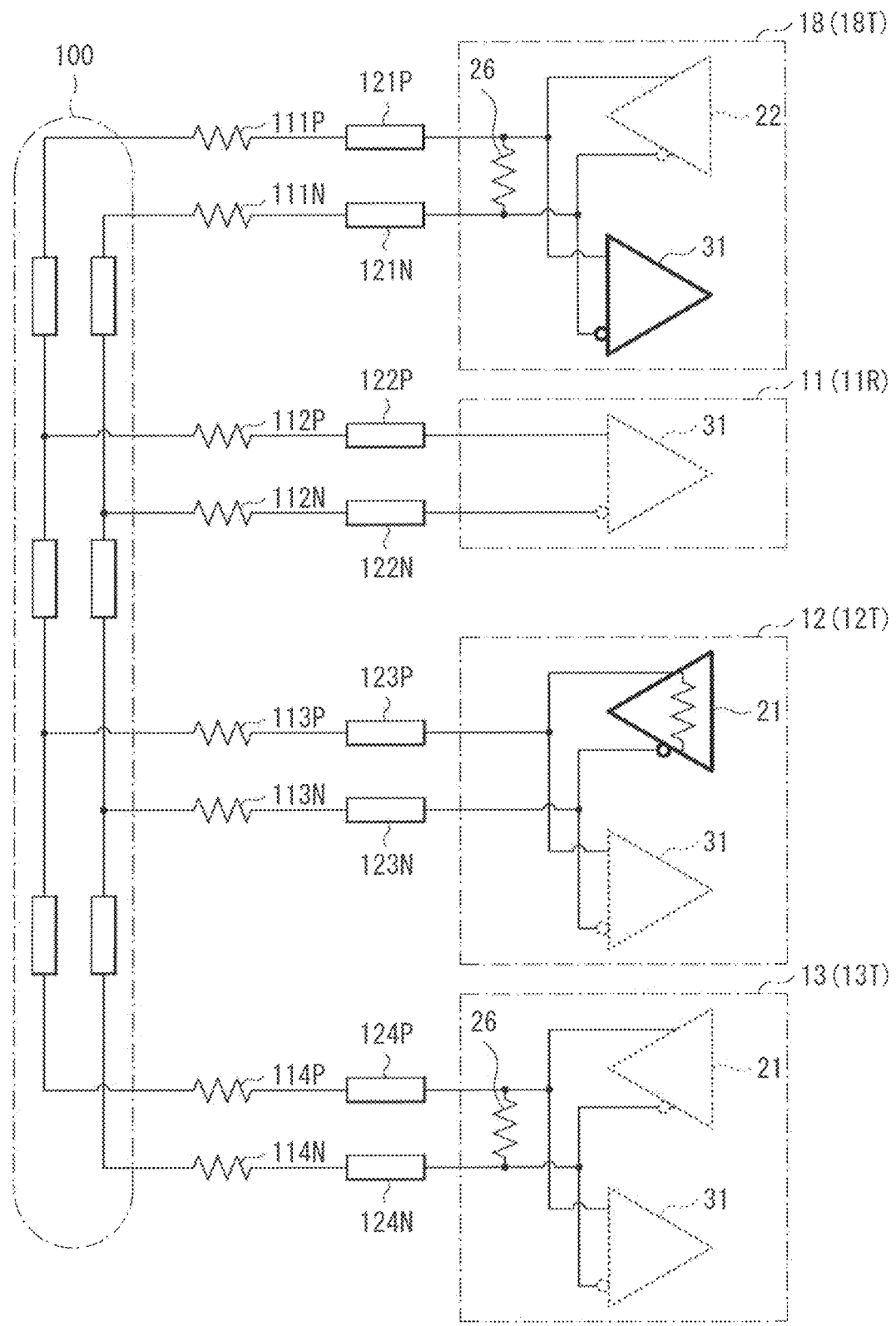

[FIG. 11]
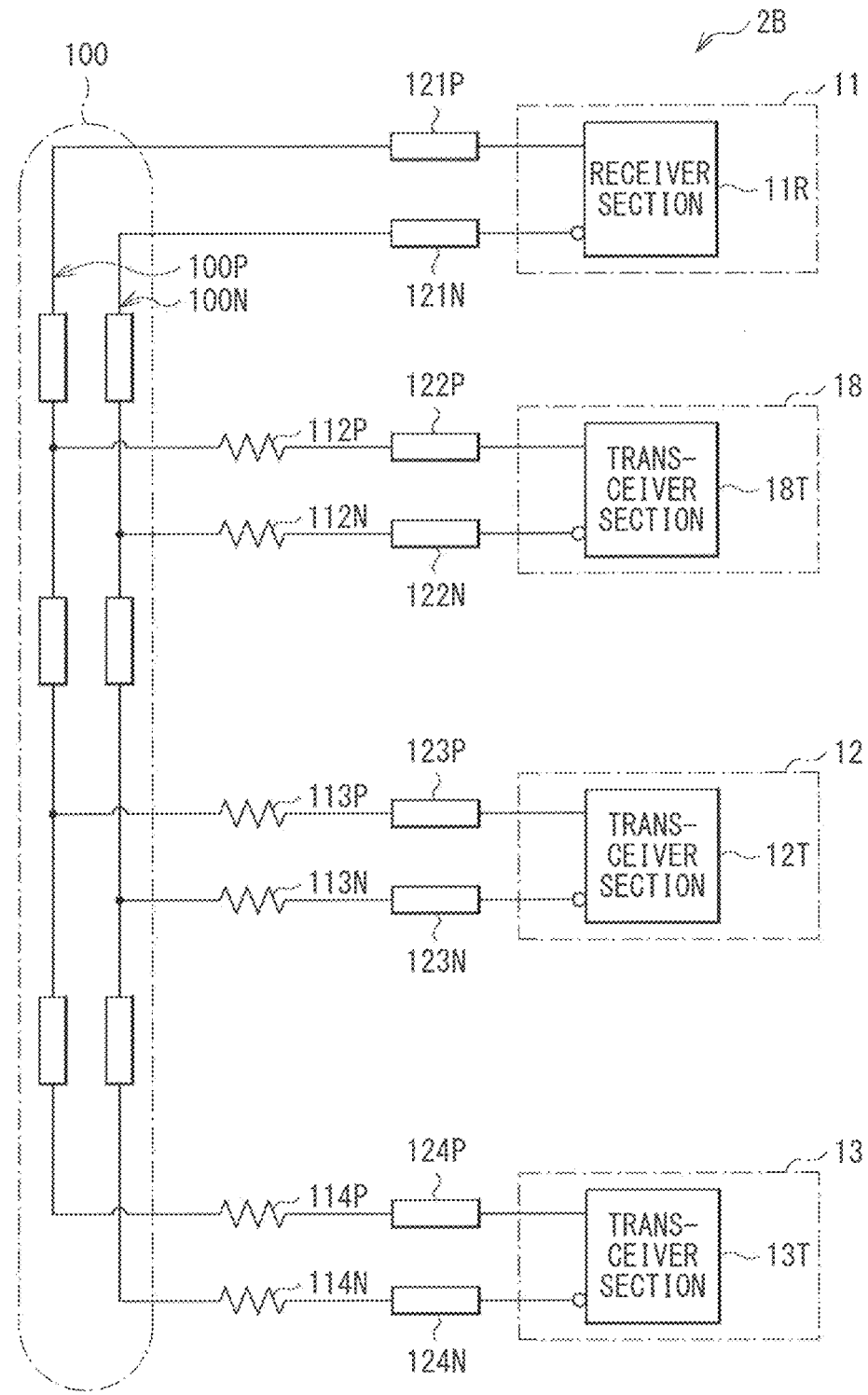

[FIG. 12]
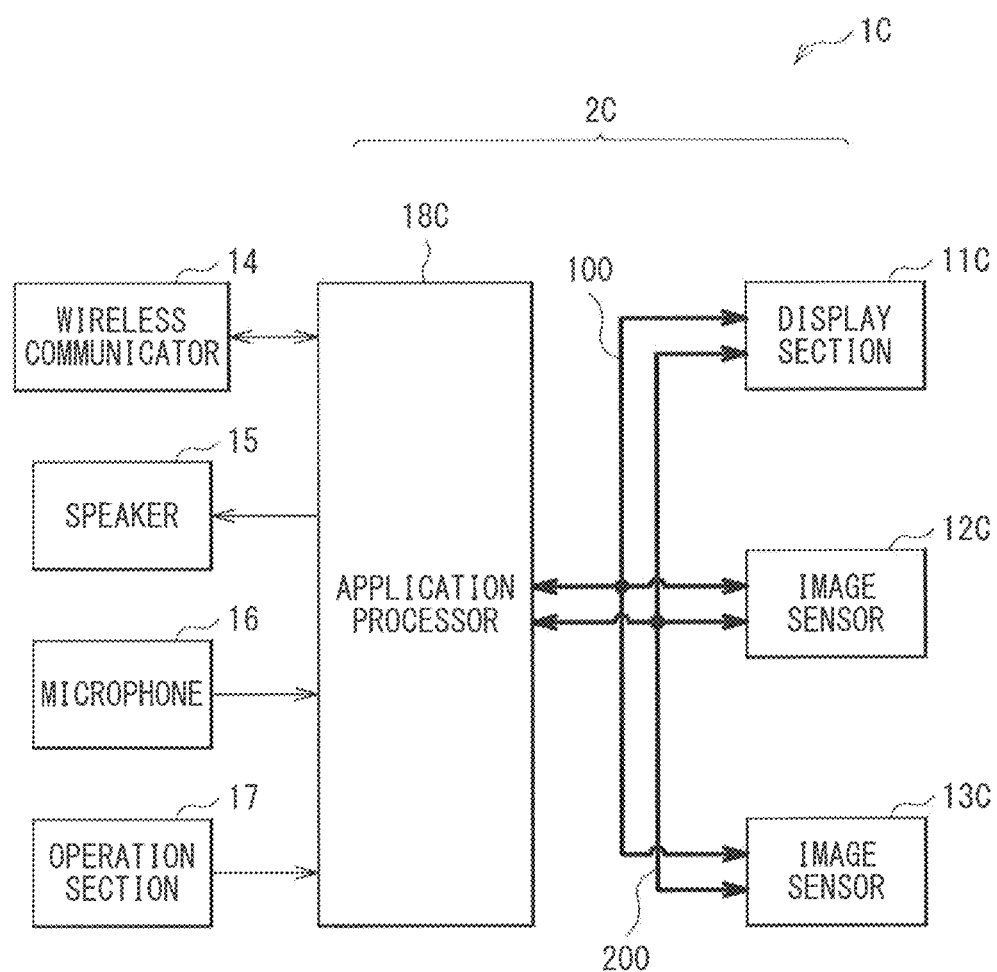

[ FIG. 13 ]
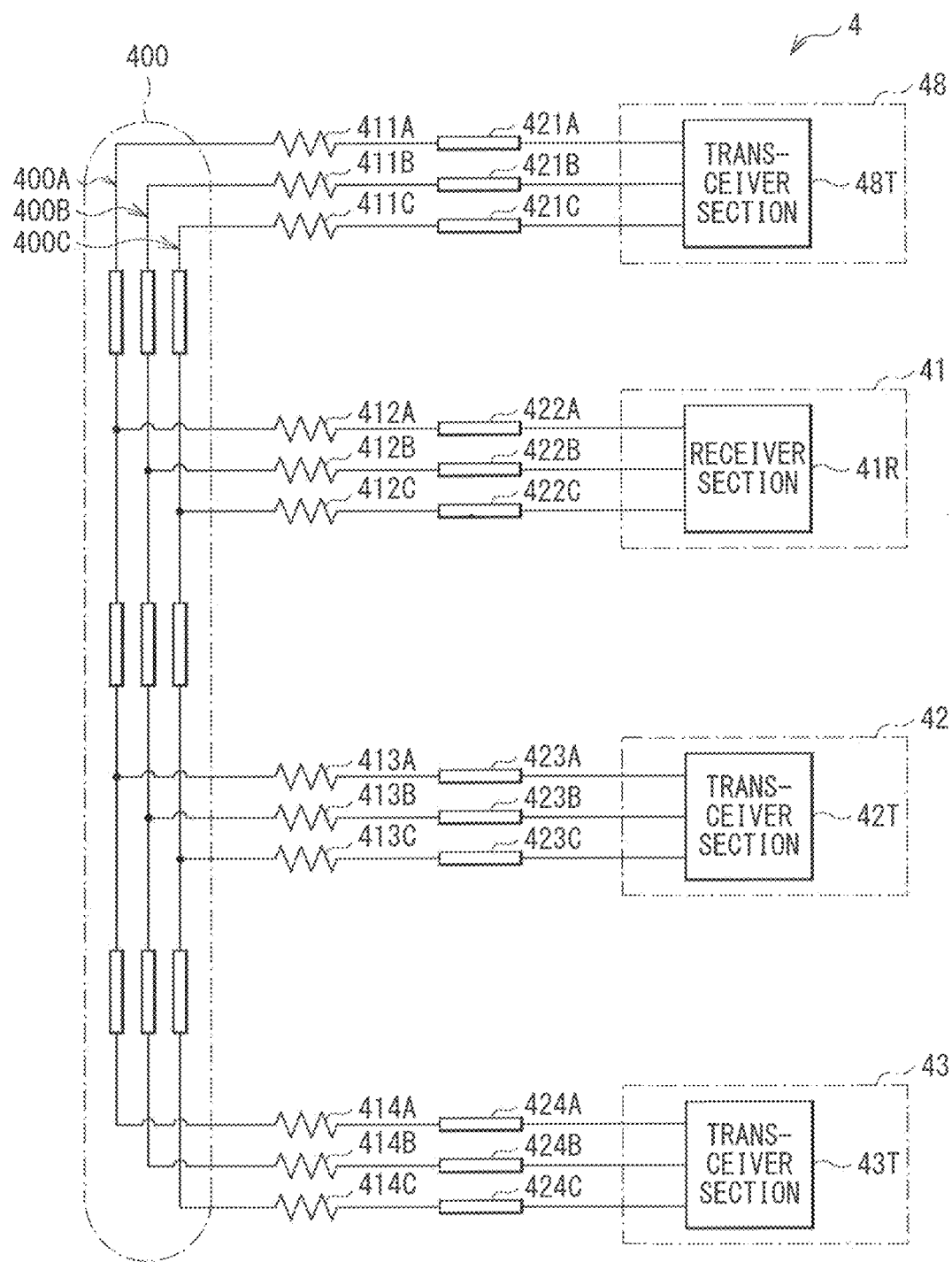

[ FIG. 14 ]
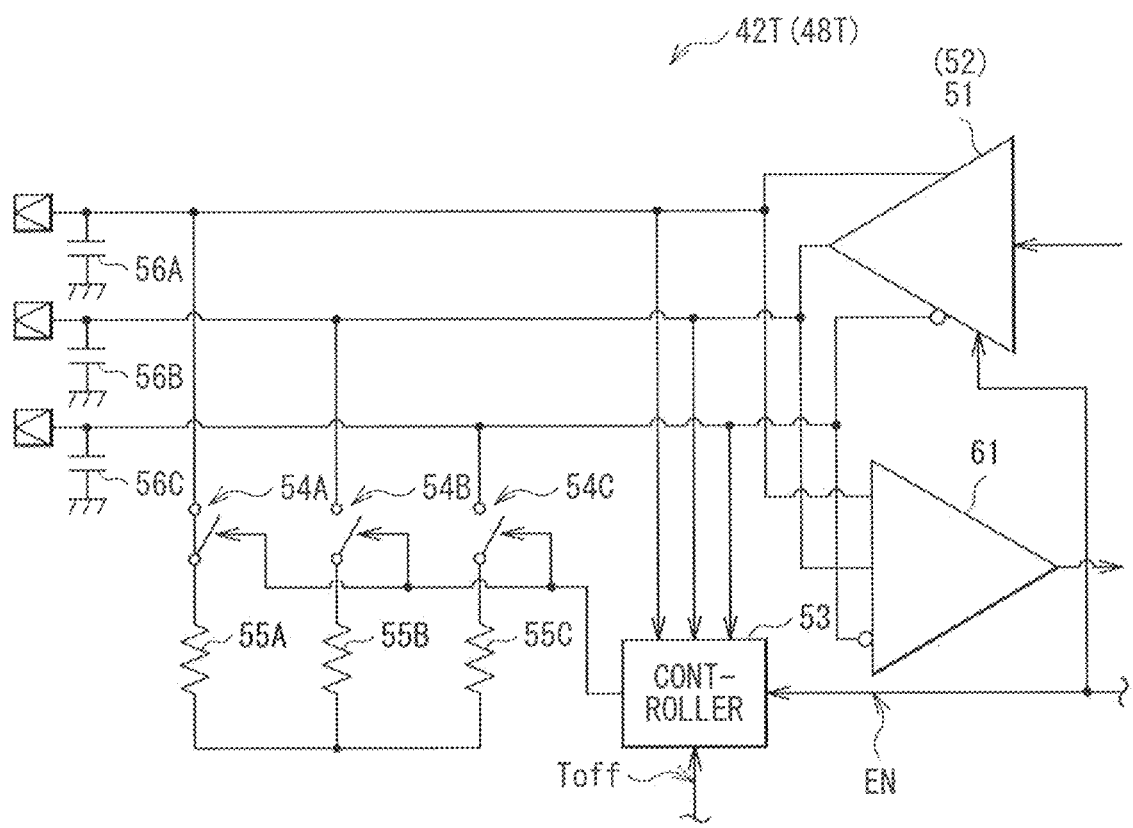
[ FIG. 15 ]
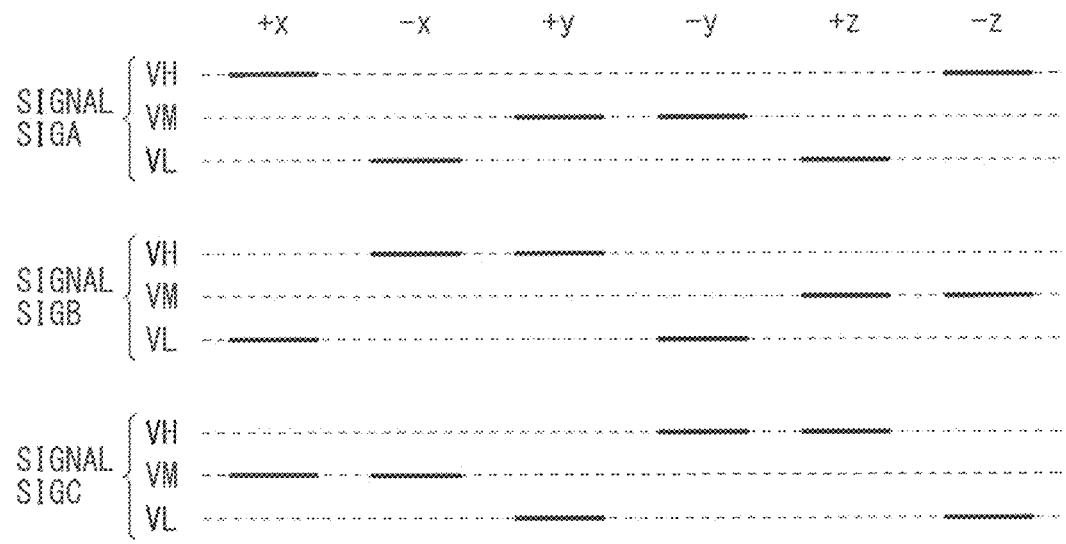

[ FIG. 16 ]
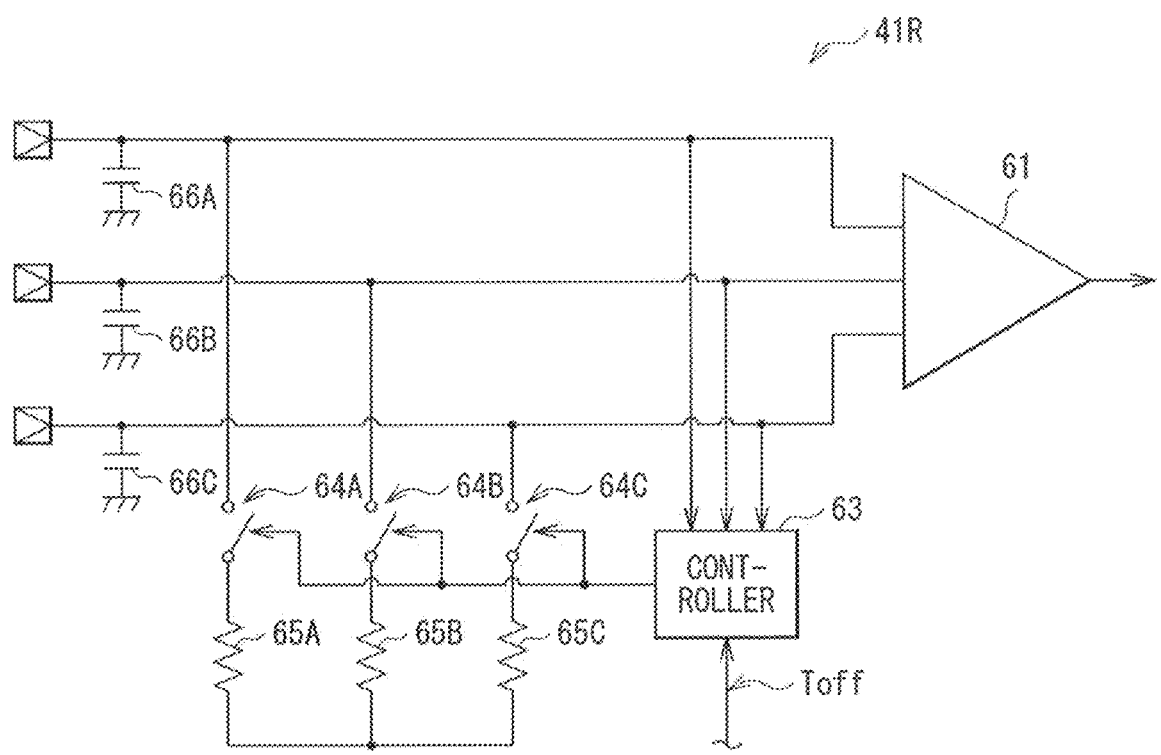

[ FIG. 17A ]
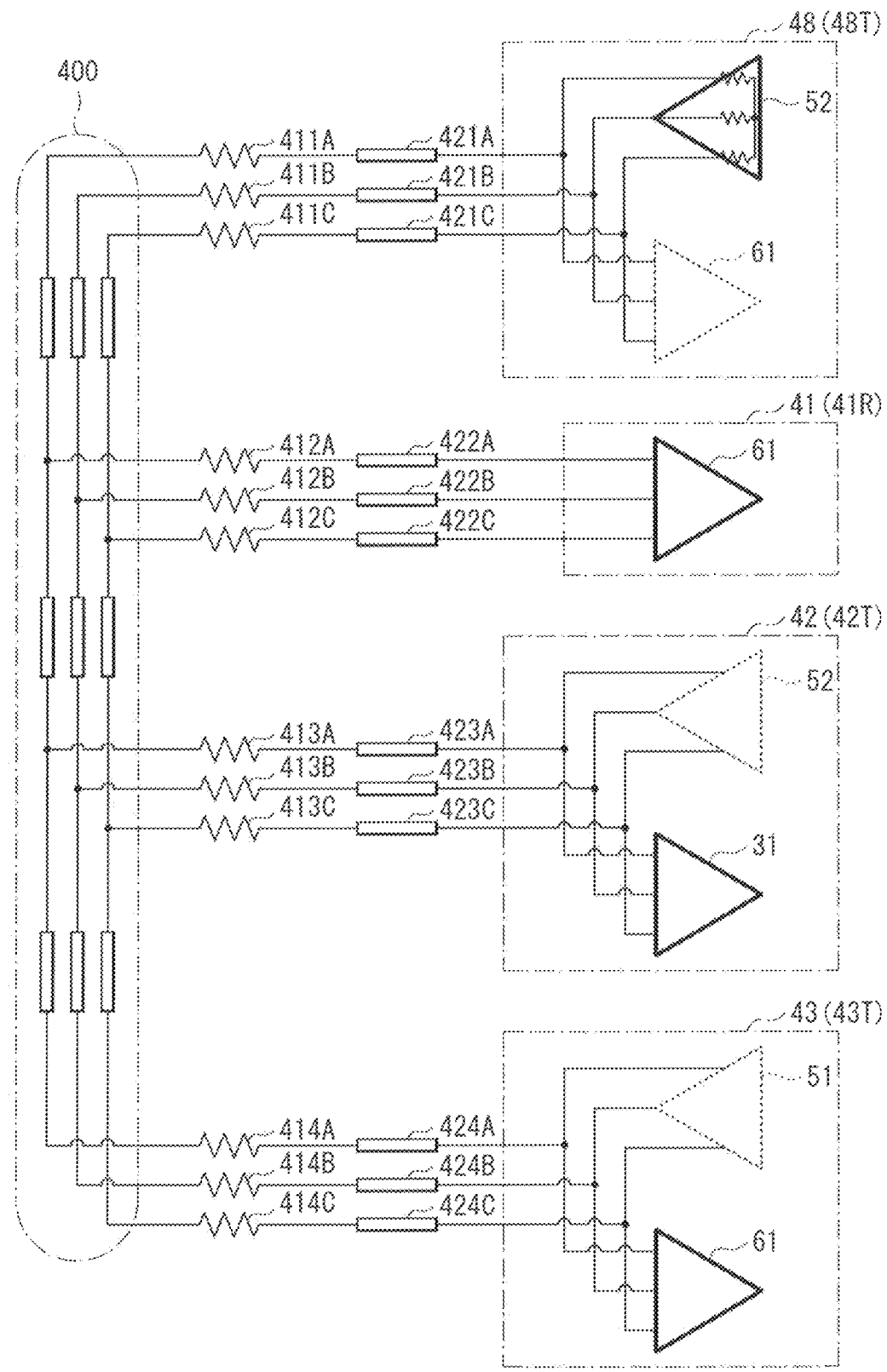

[FIG. 17B]
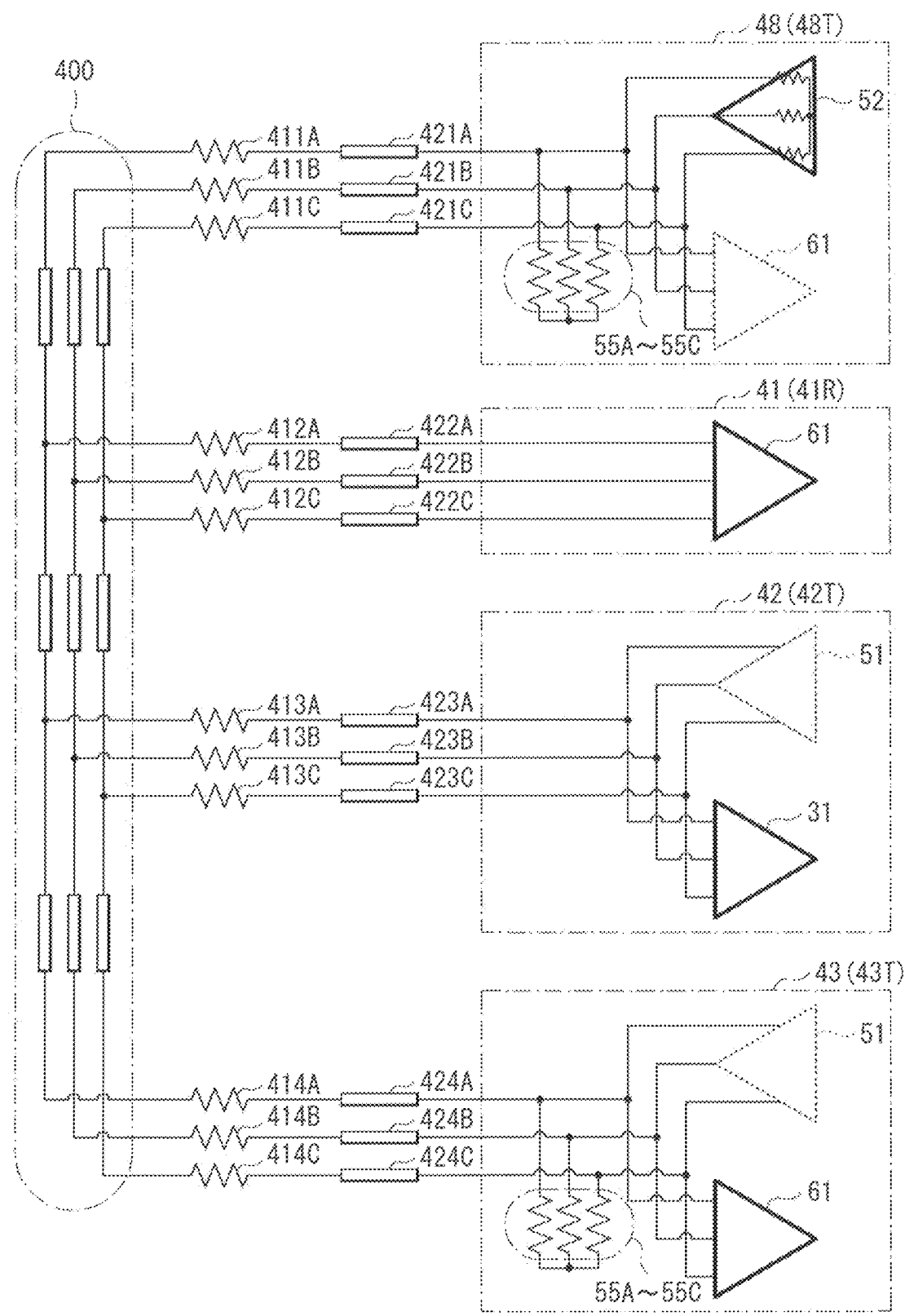

[FIG. 17C]
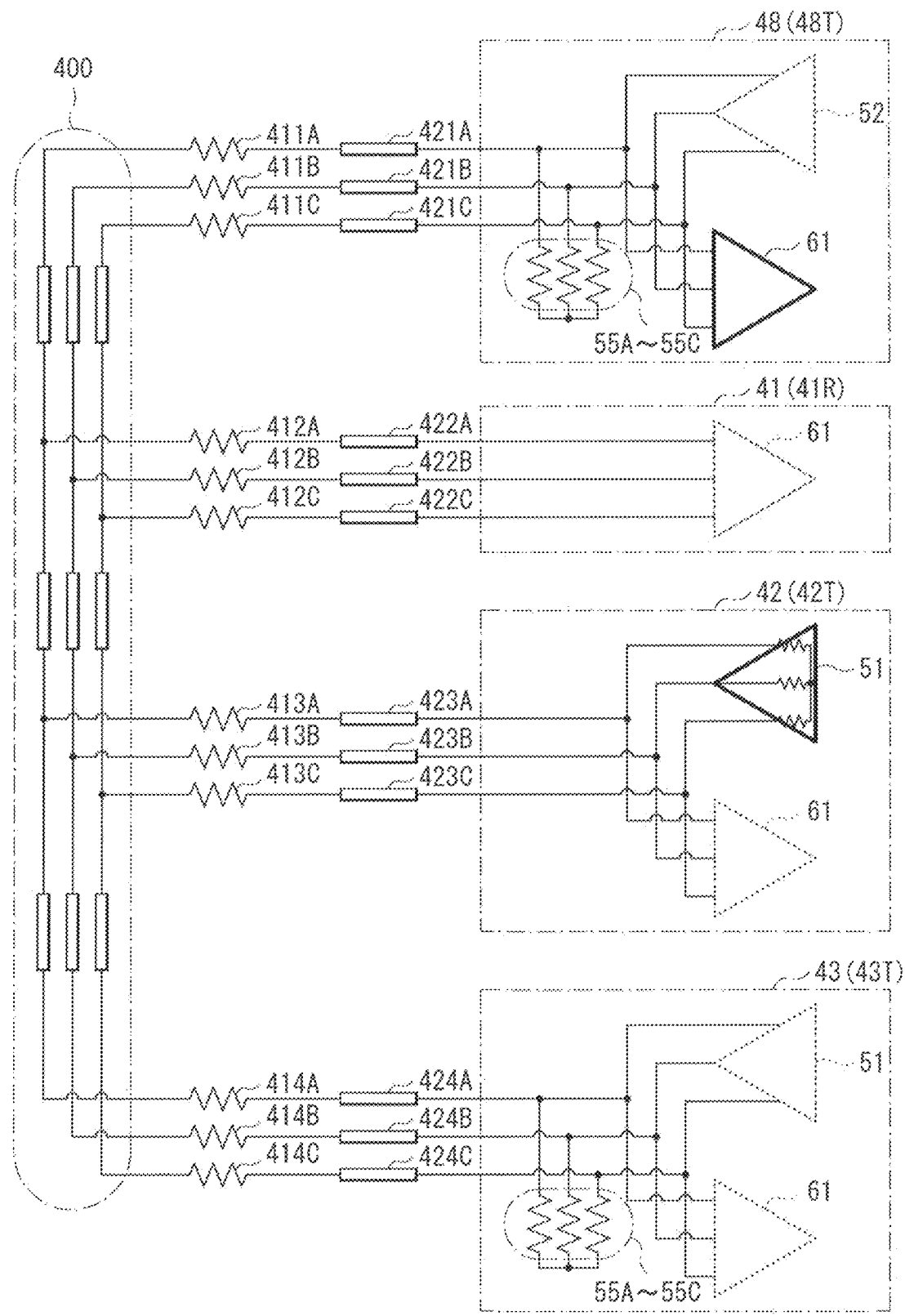

[FIG. 18]
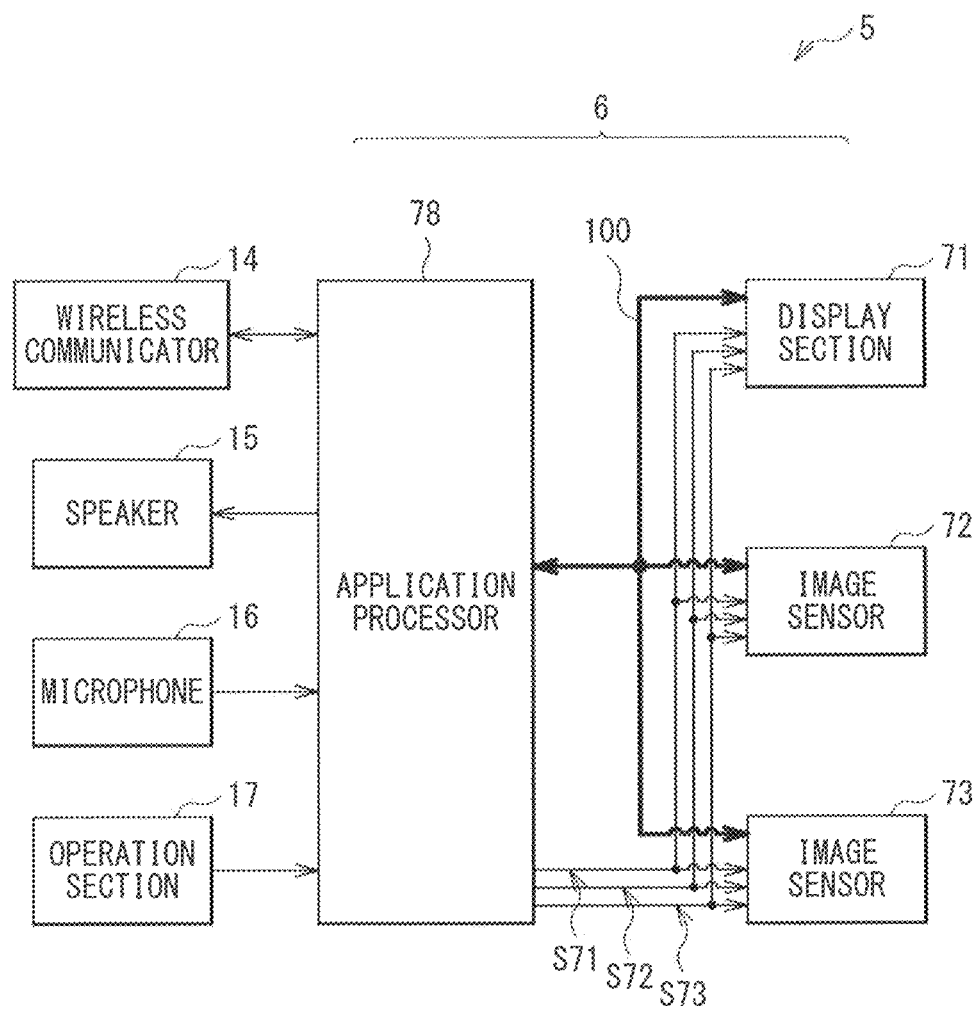

[FIG. 19]
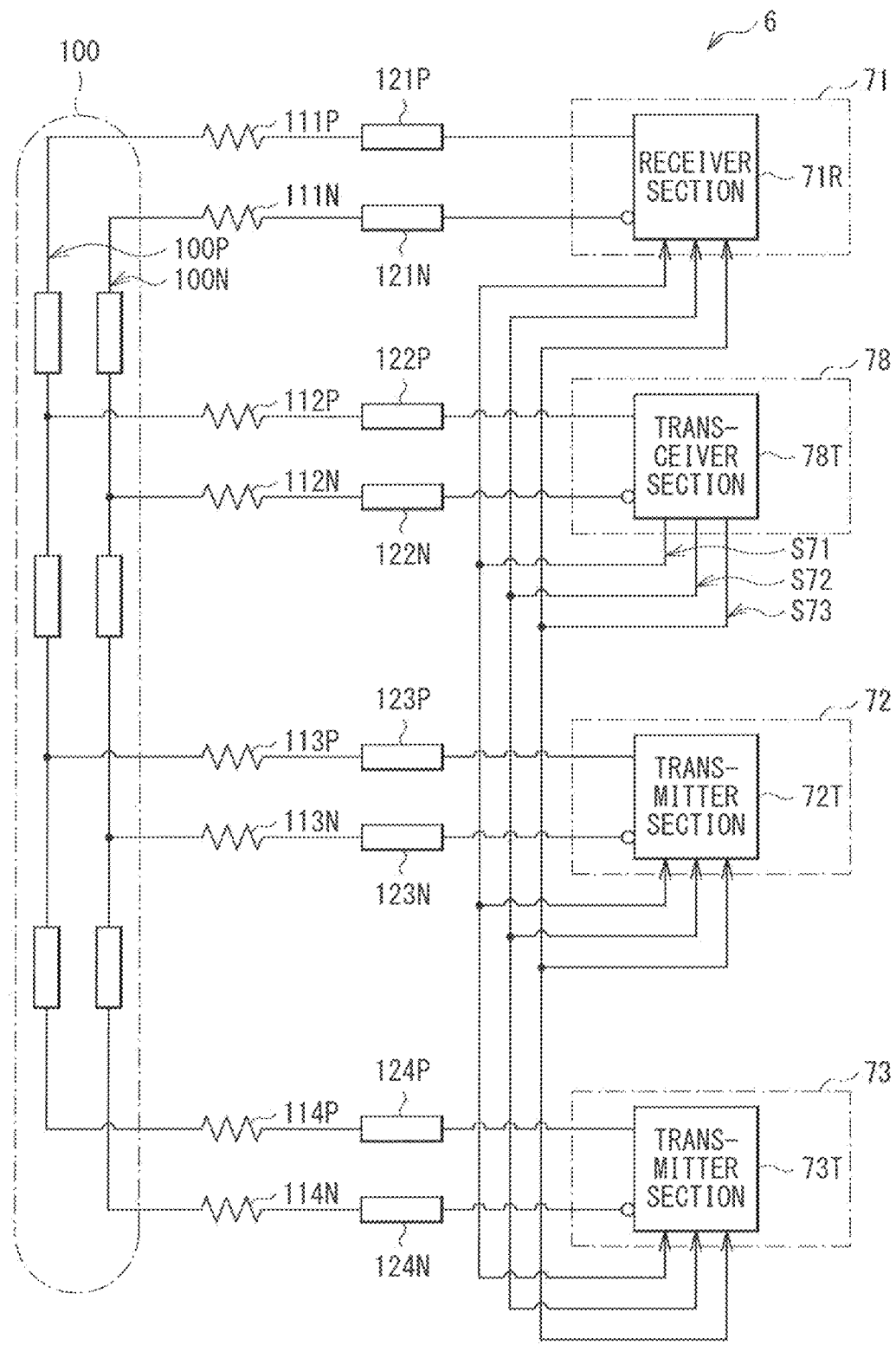

[ FIG. 20 ]
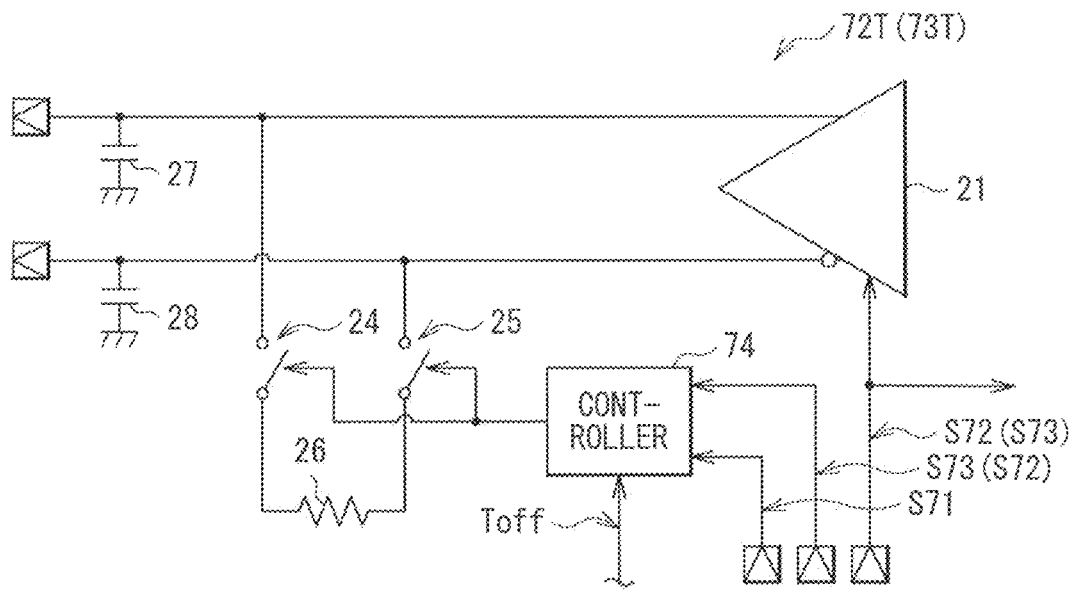
[ FIG. 21 ]
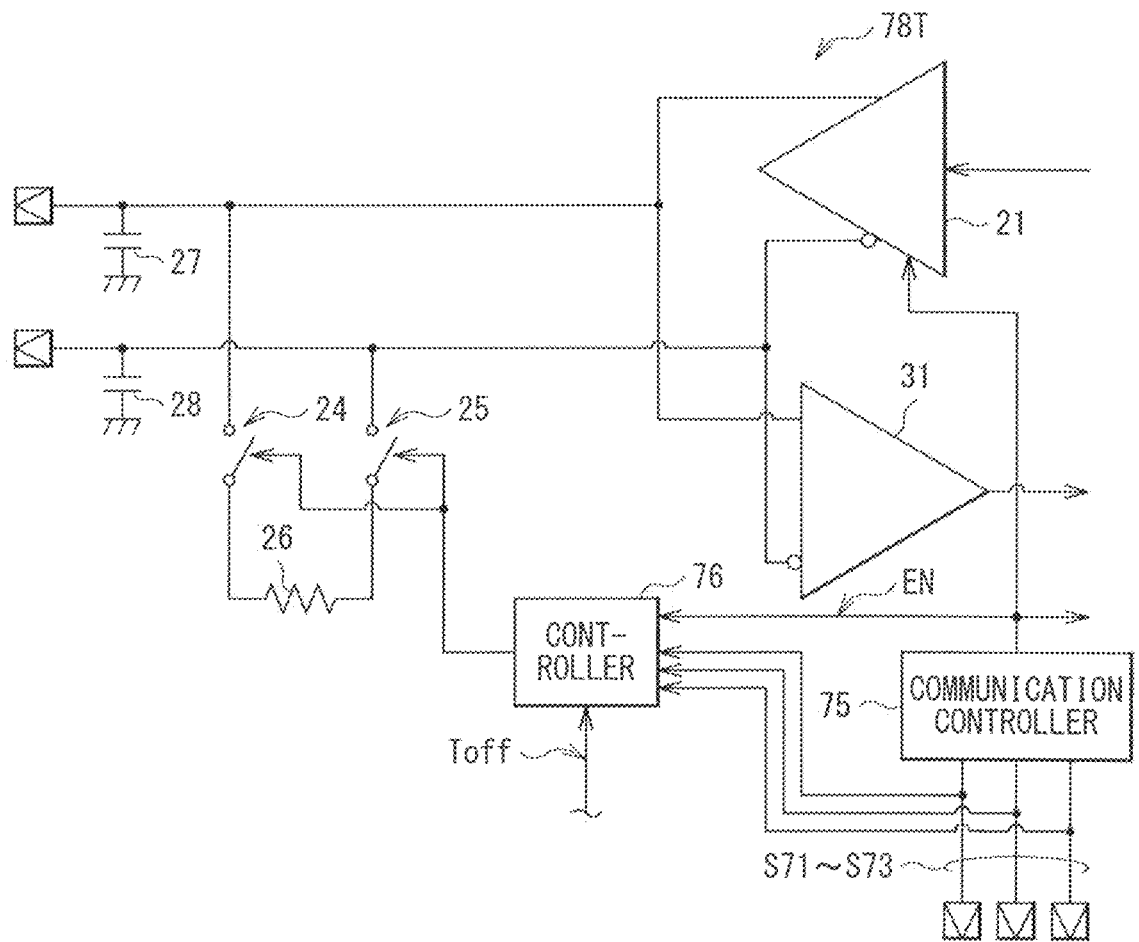

[FIG. 22]
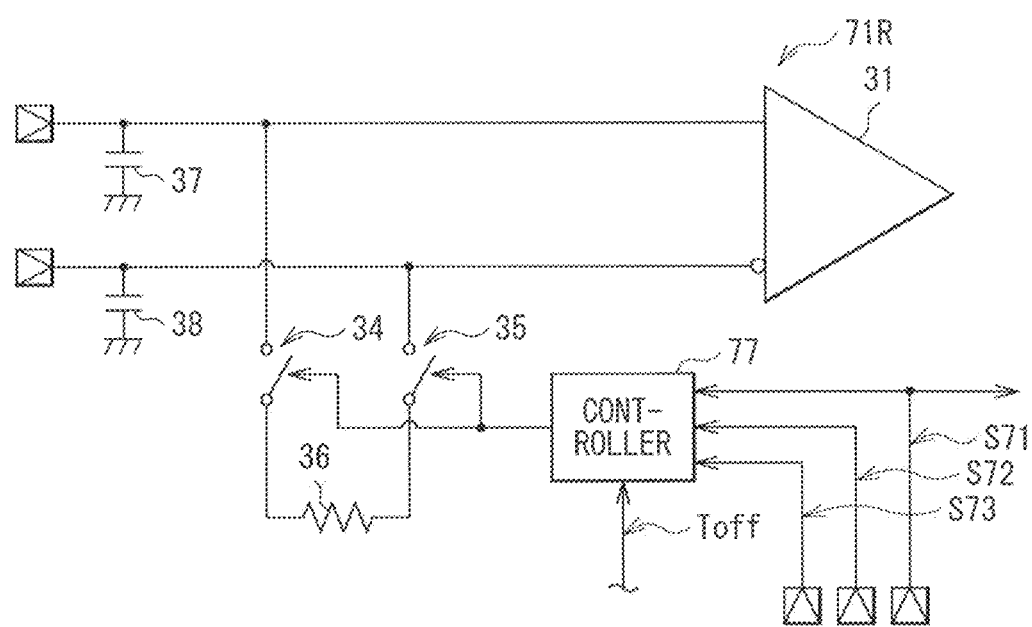

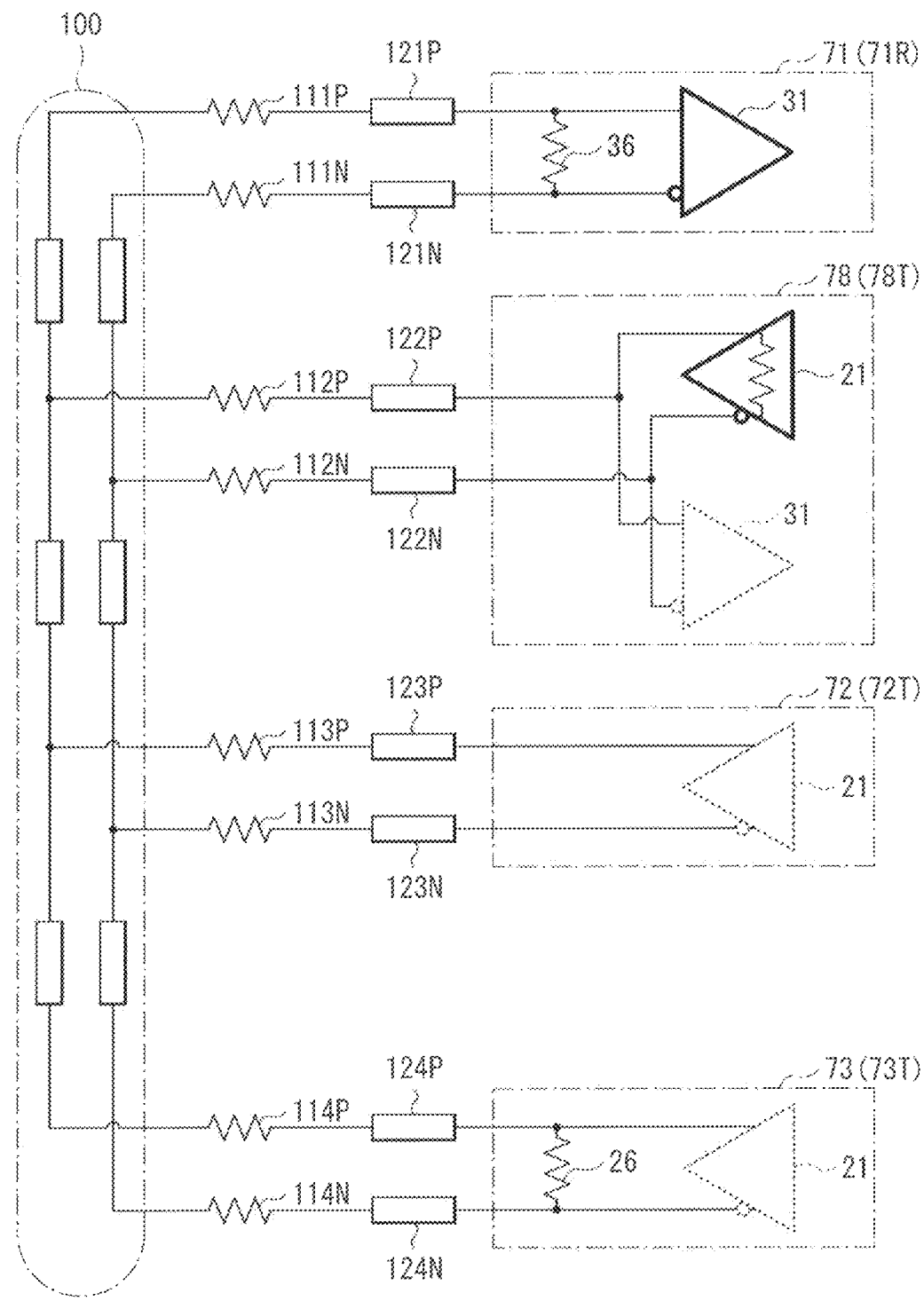
[FIG. 24A]

[FIG. 24B]
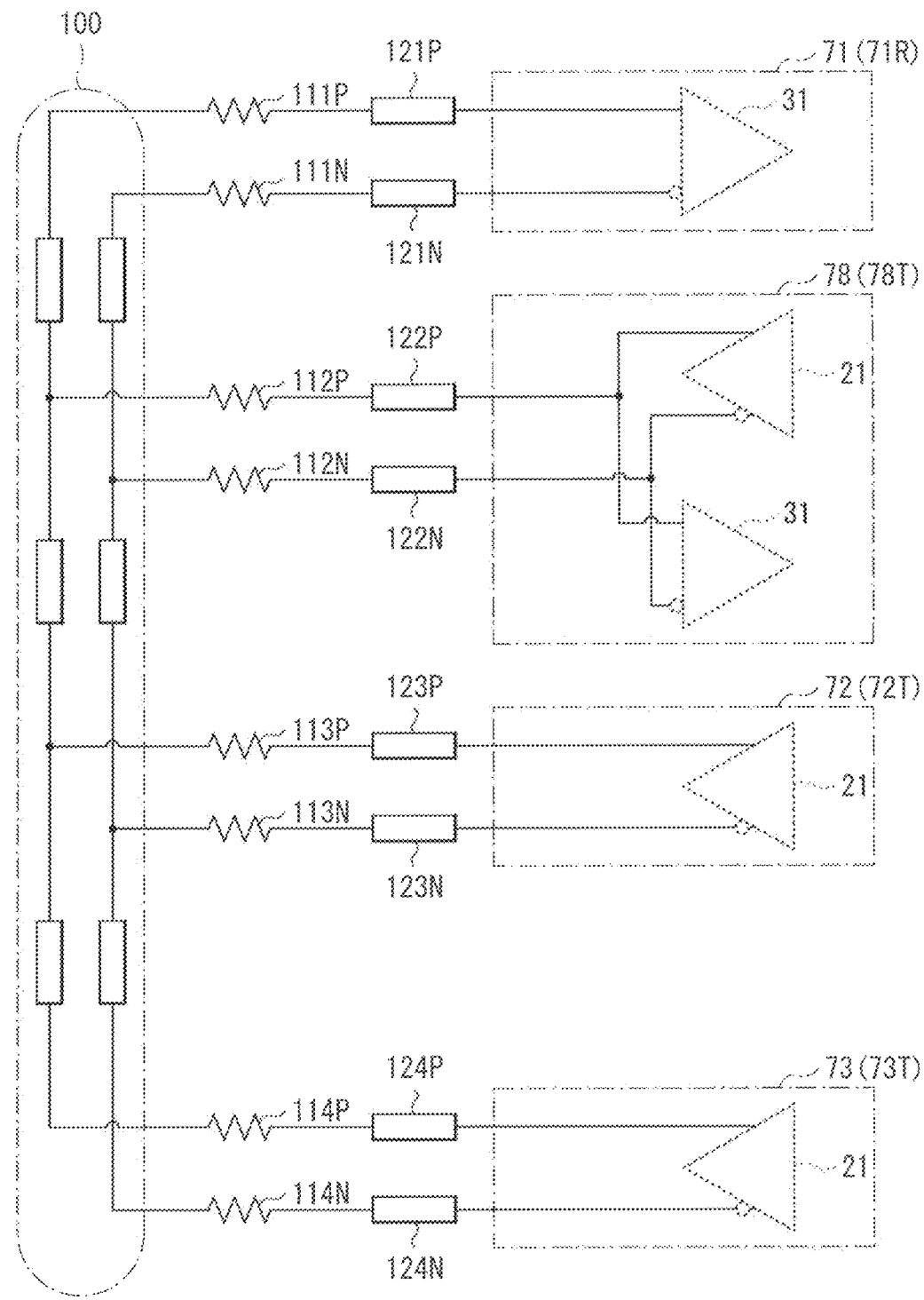

[FIG. 24C]
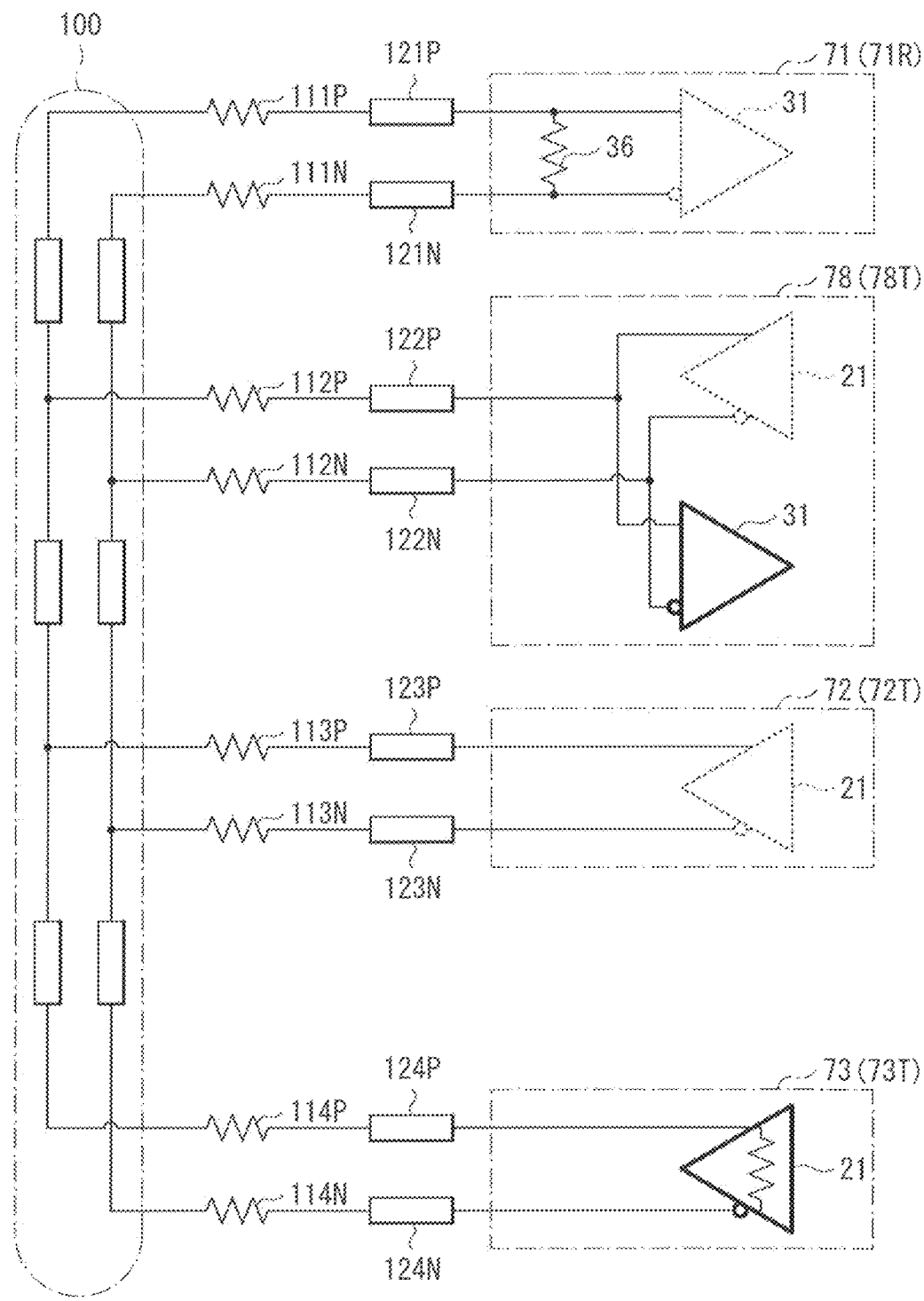

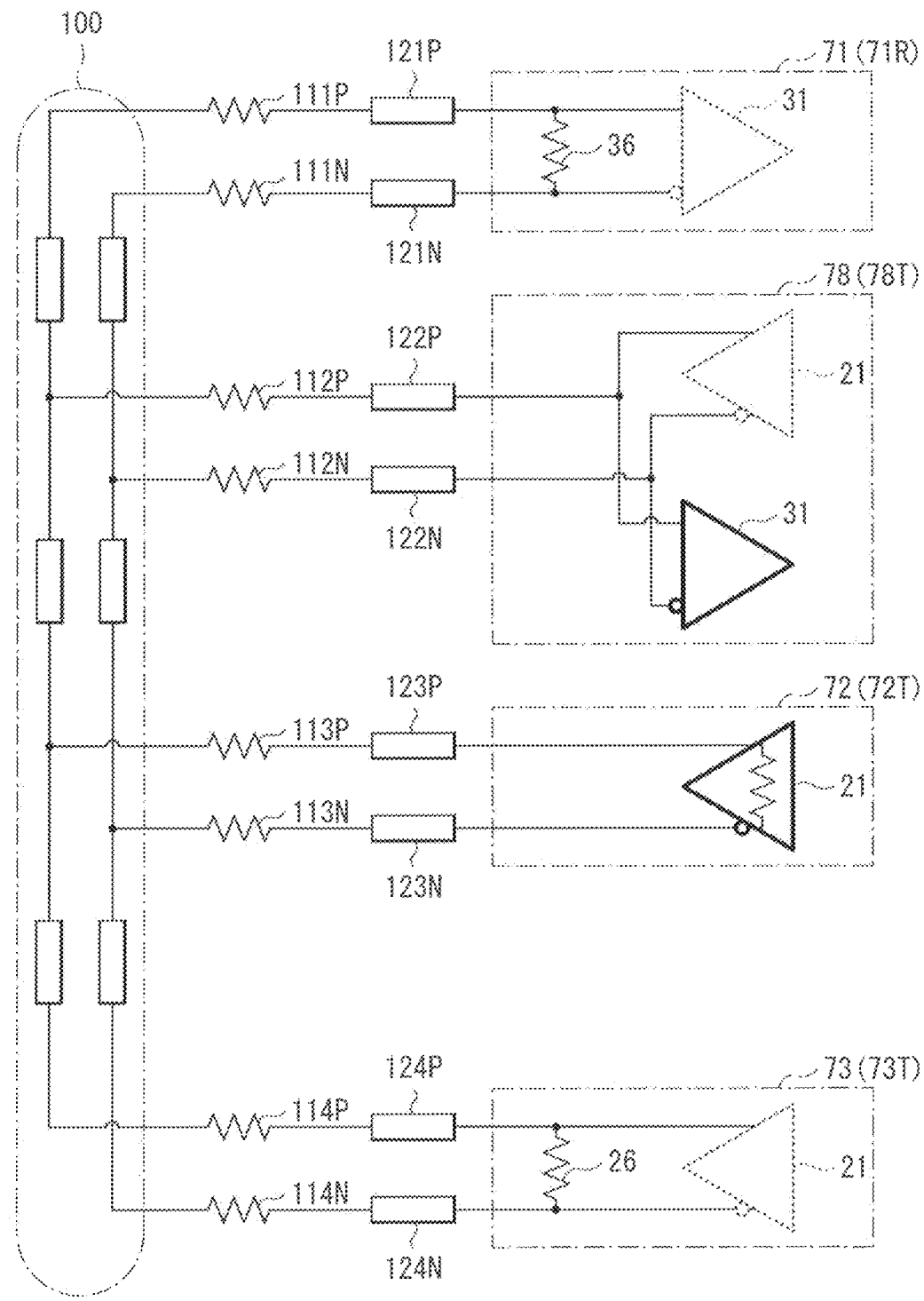
[FIG. 24D]

[FIG. 25]
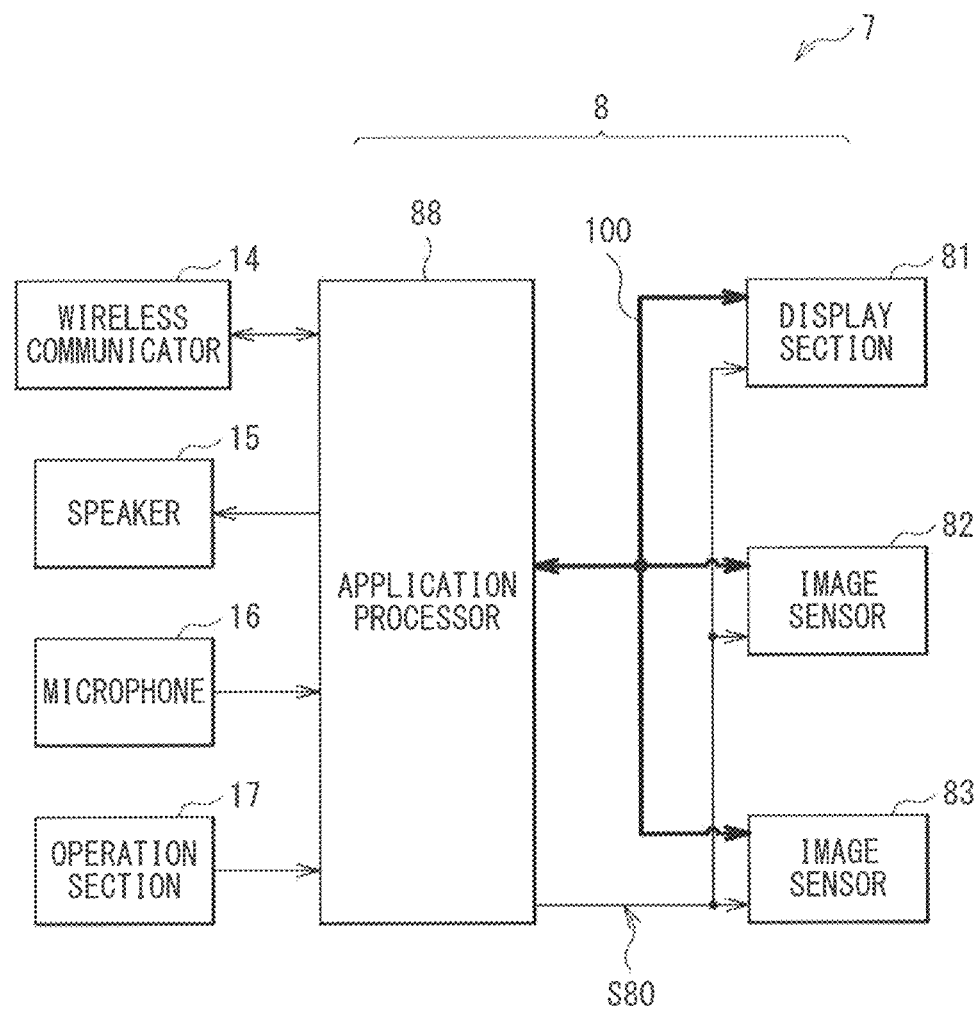

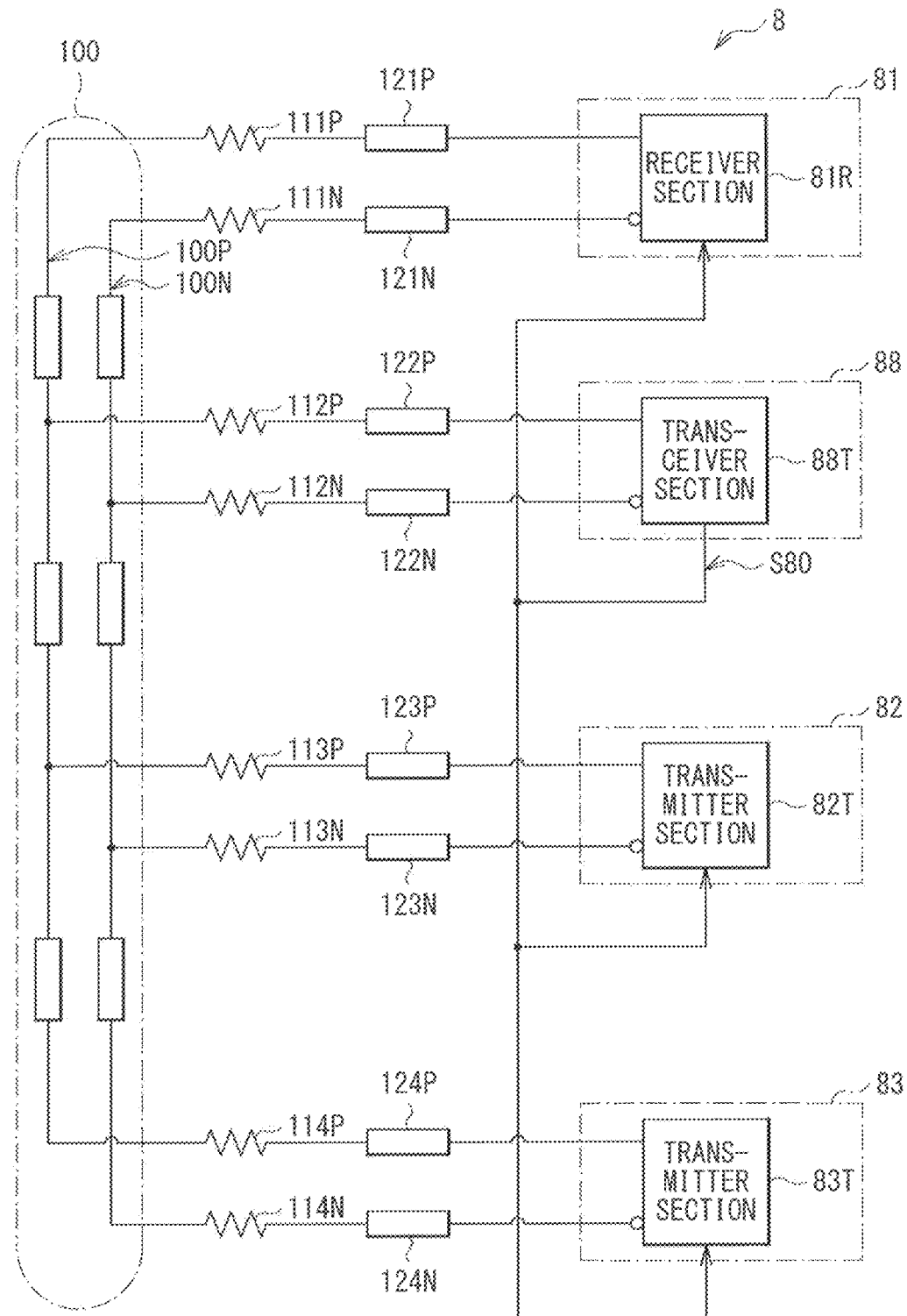
[FIG. 26]

[ FIG. 27 ]
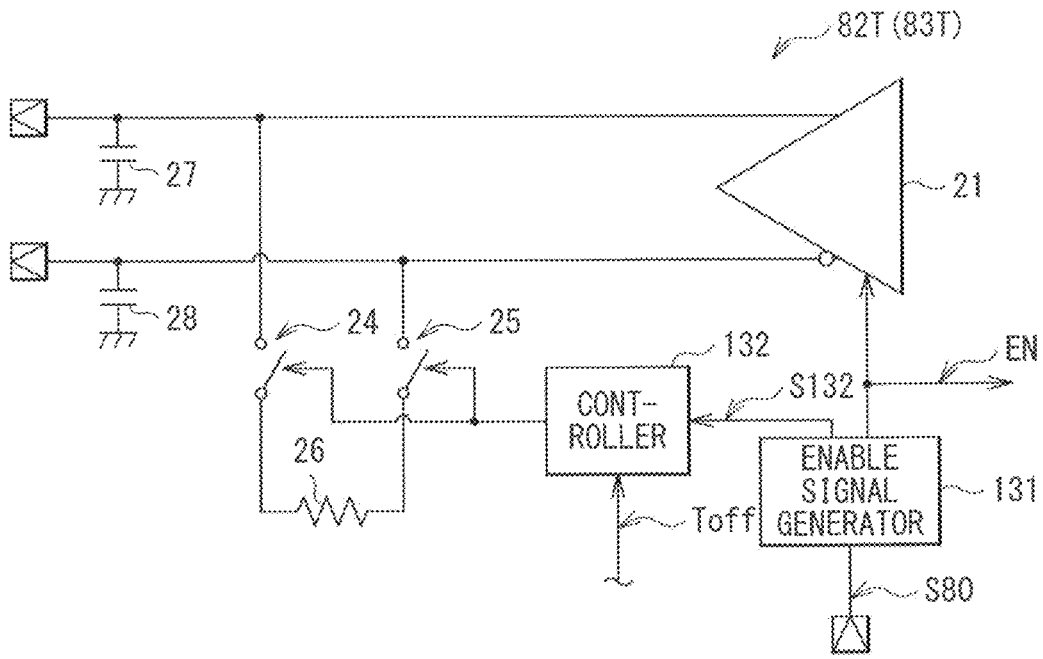
[ FIG. 28 ]
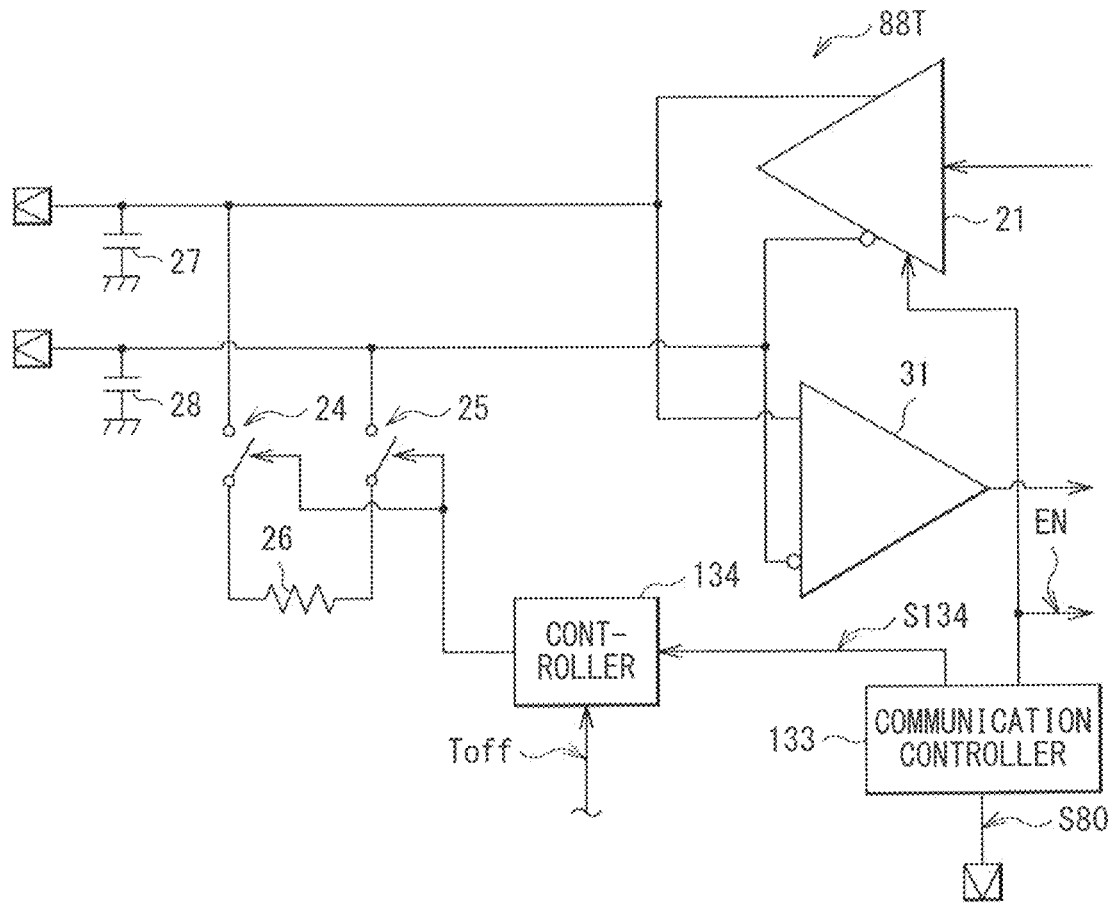

[FIG. 29]
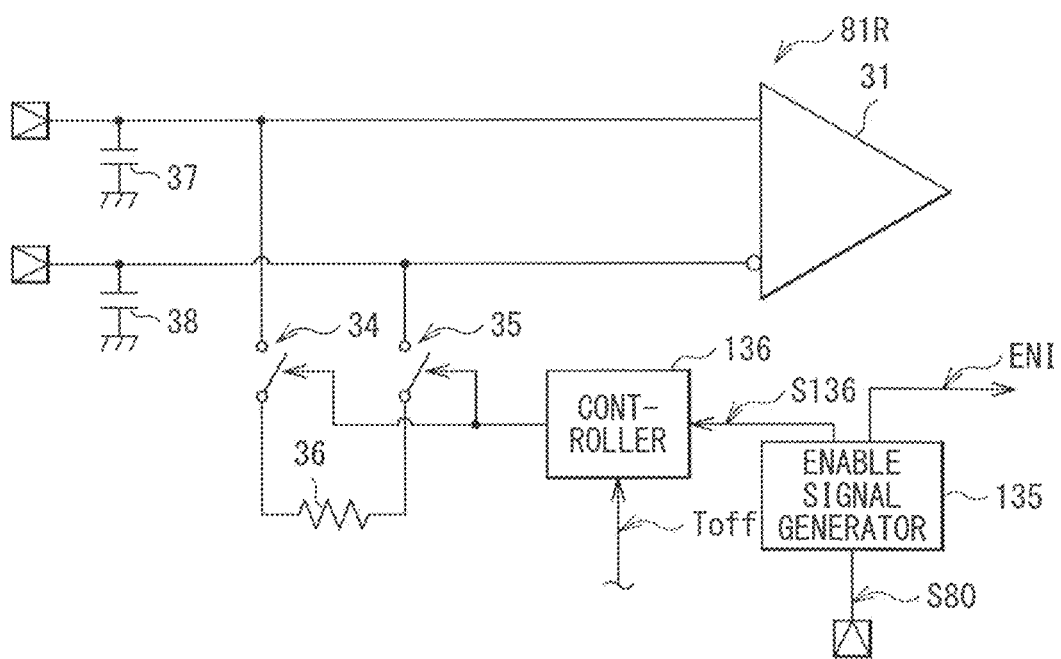

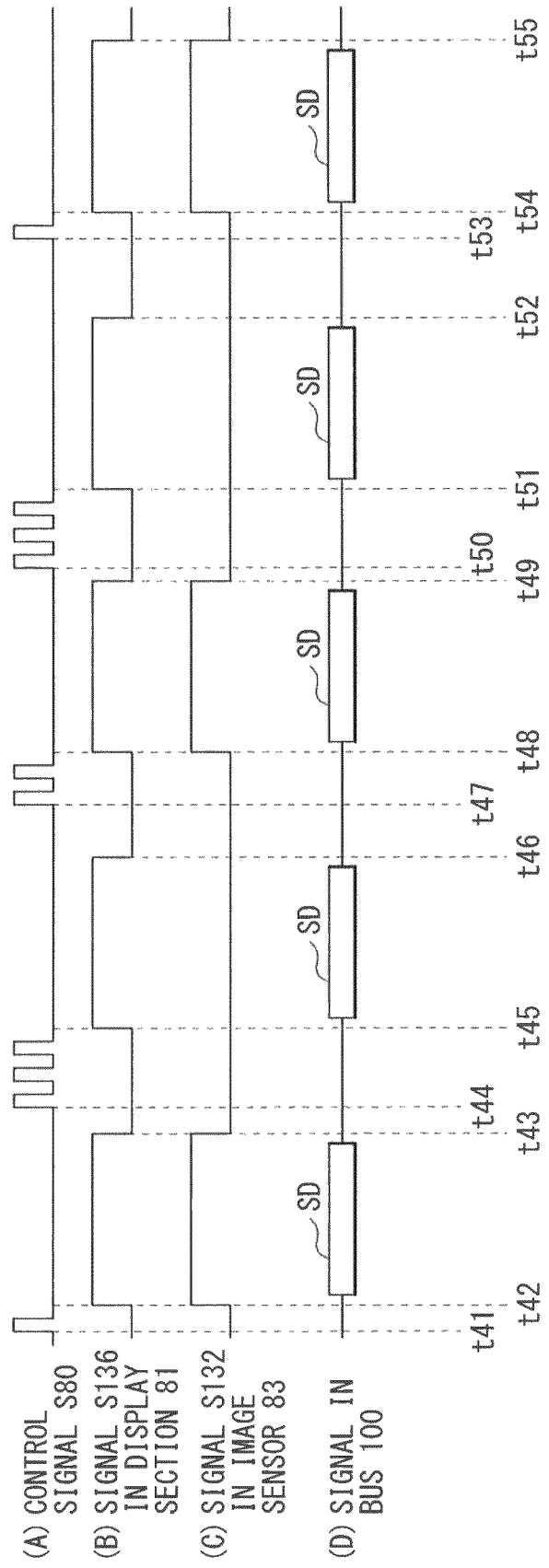

[ FIG. 32 ]
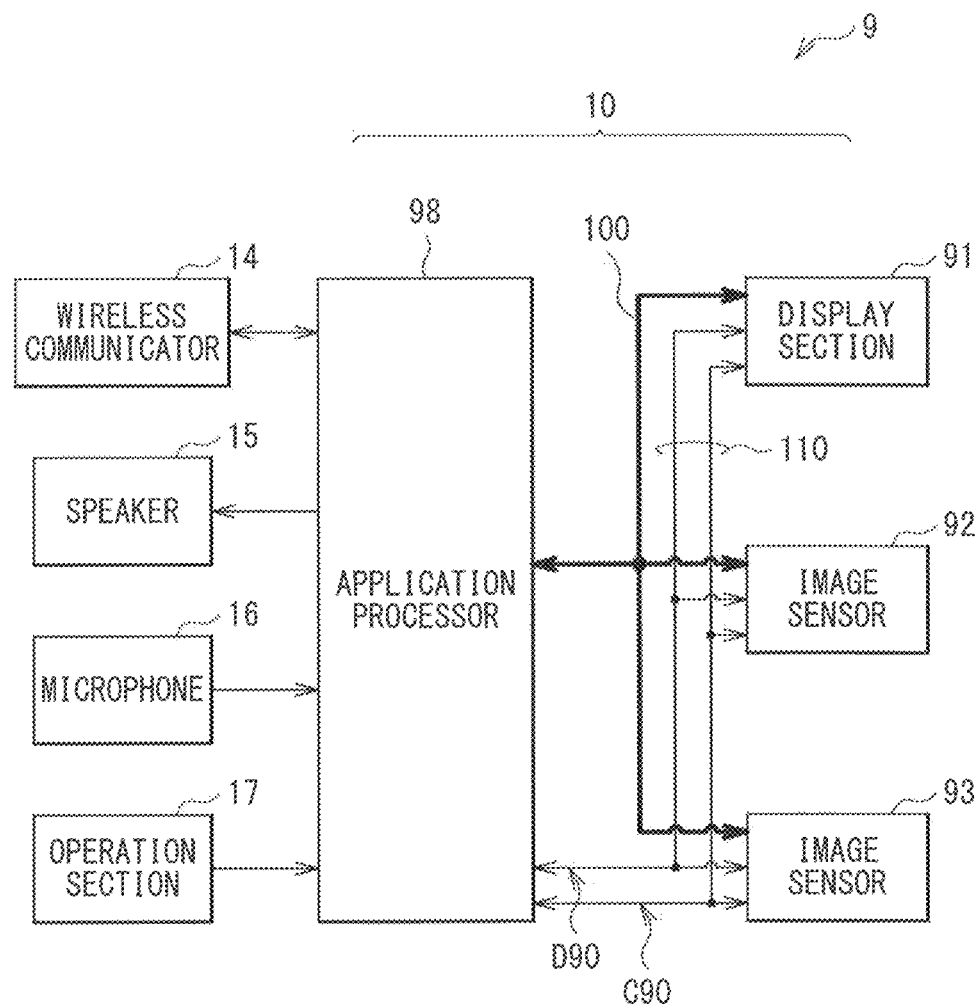
[ FIG. 33 ]
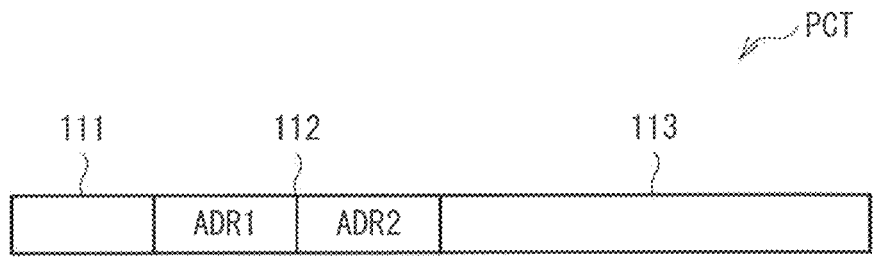

[FIG. 34]
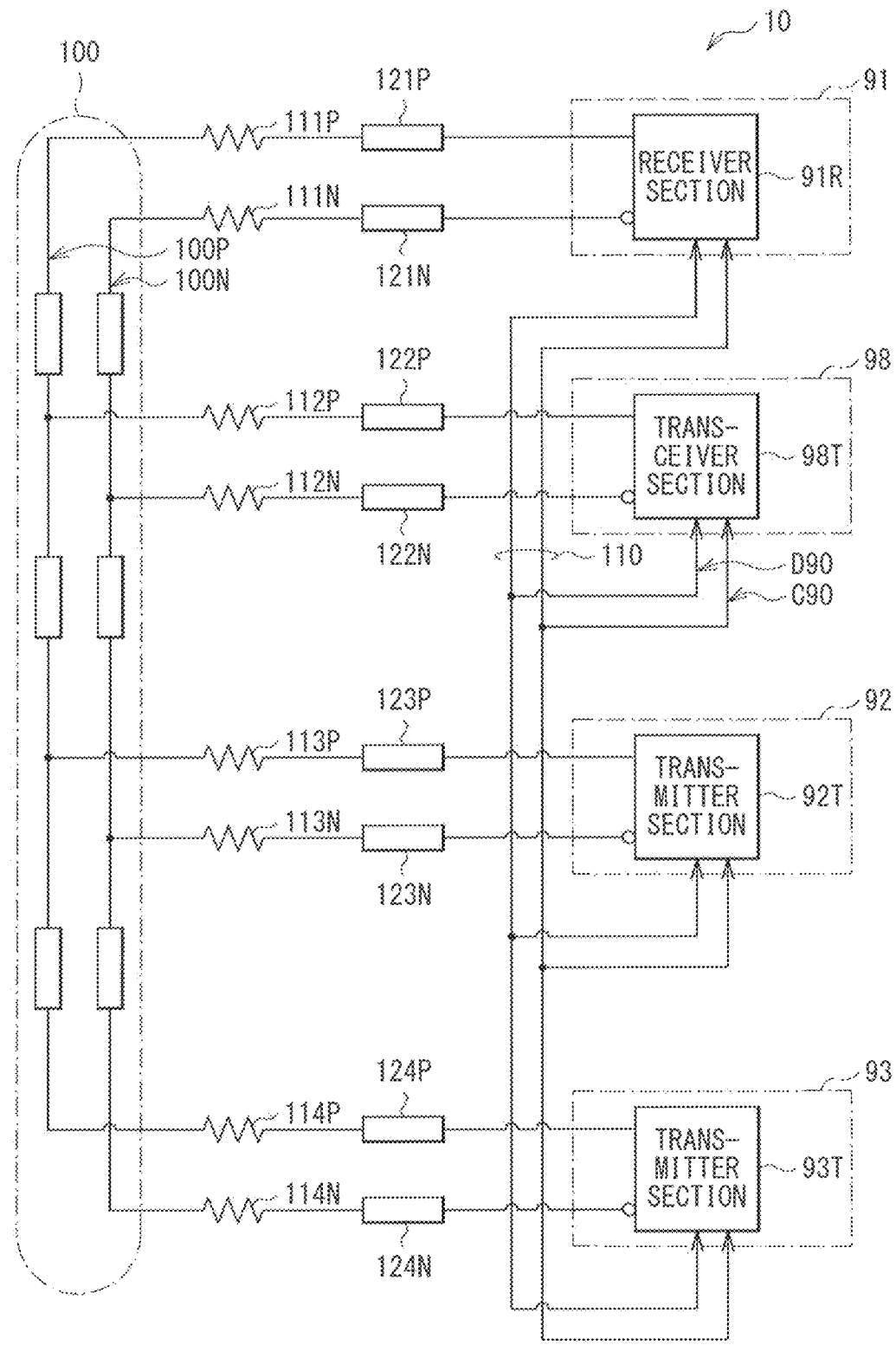

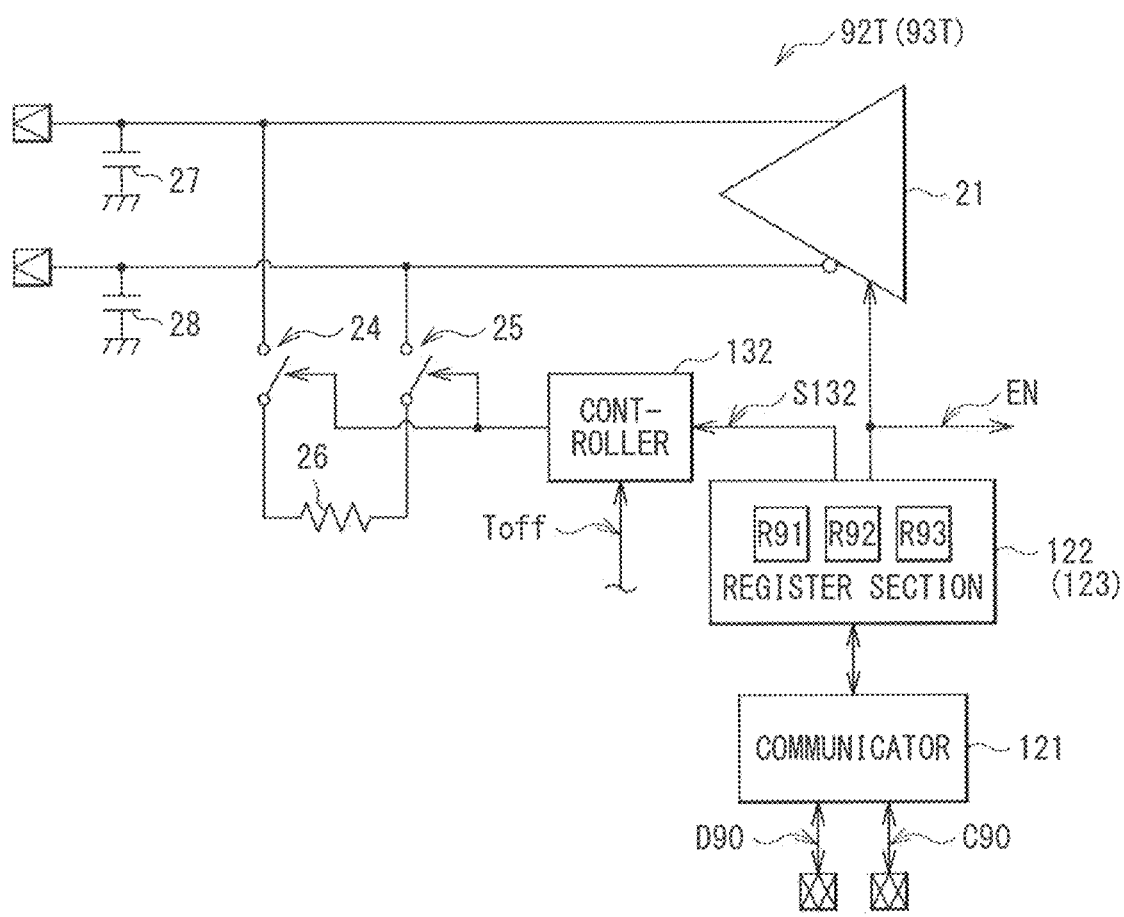
[FIG. 35]

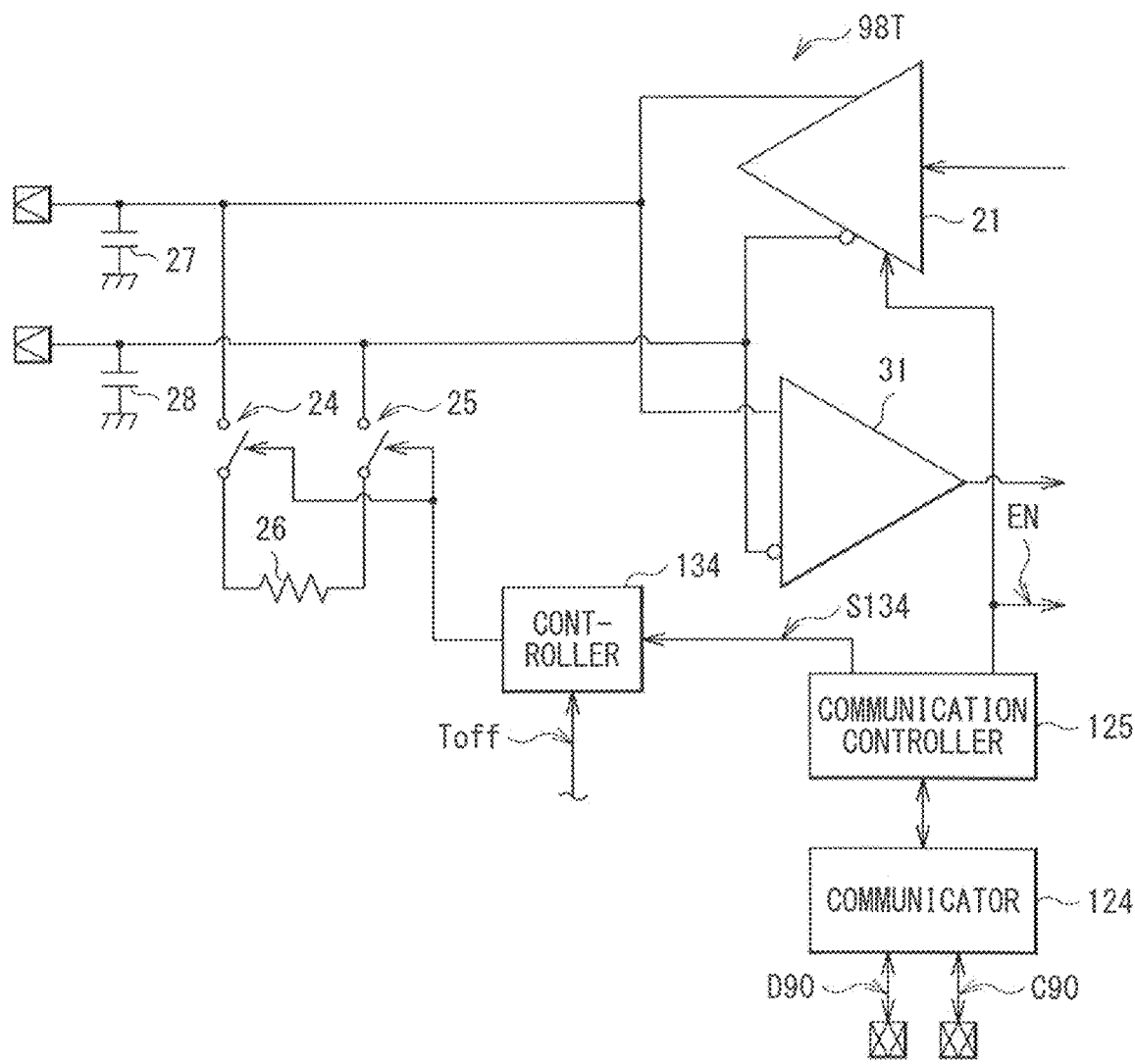
[FIG. 36]

[ FIG. 37 ]
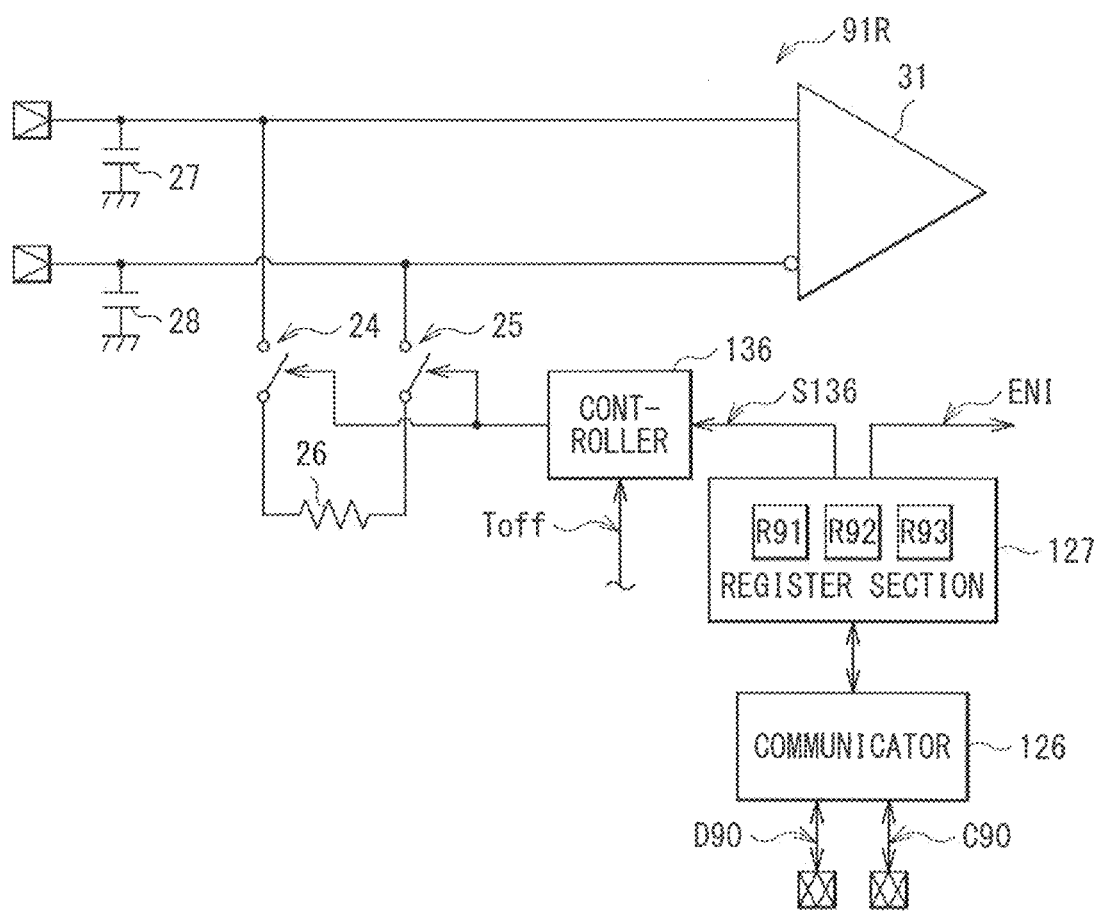

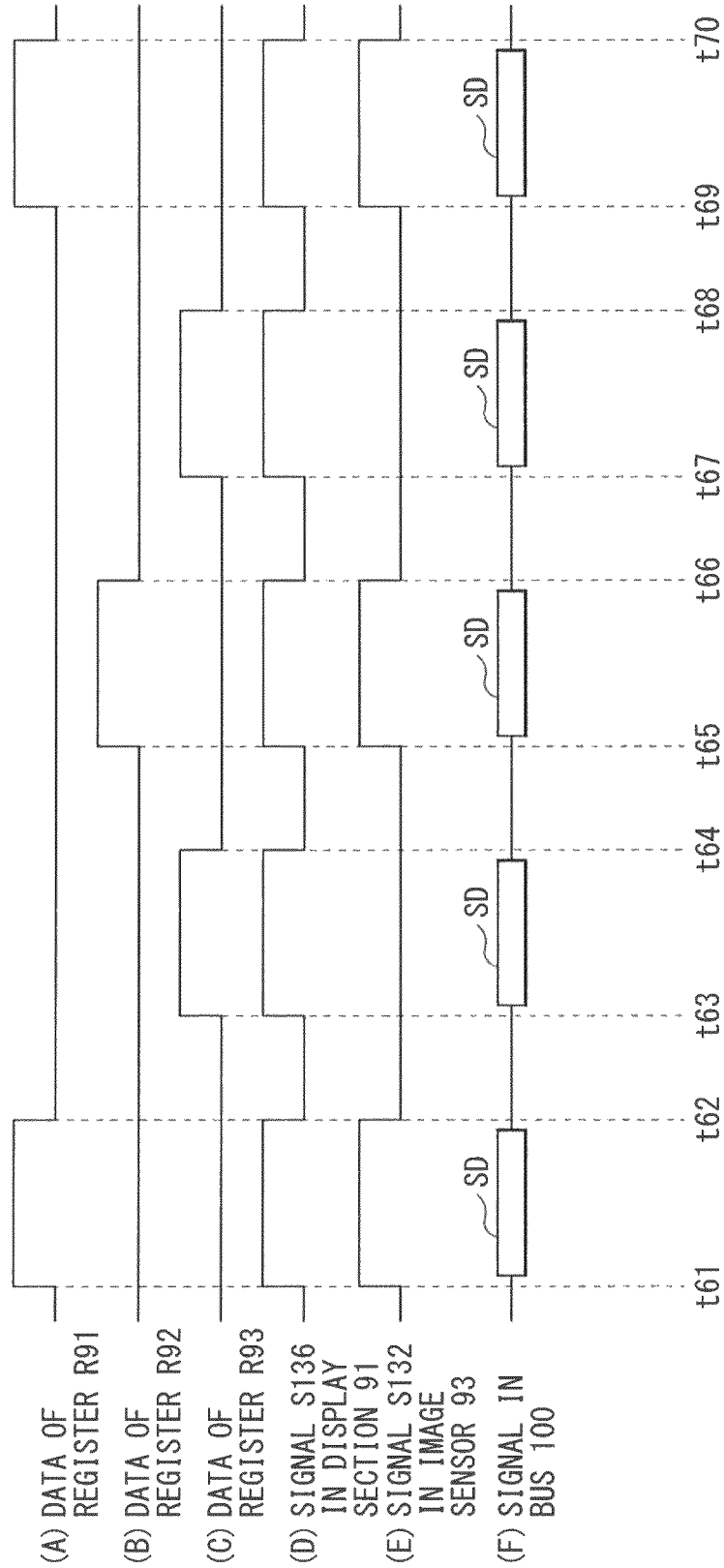

[ FIG. 39 ]
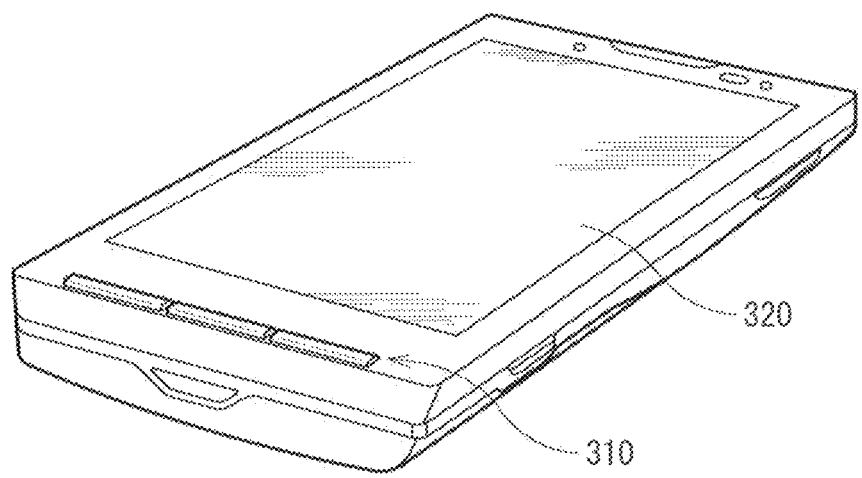

BUS SYSTEM AND COMMUNICATION DEVICE

TECHNICAL FIELD

The disclosure relates to a bus system that performs exchange of data, and to a communication device used in such a bus system.

BACKGROUND ART

Along with high functionalization and multi-functionalization of an electronic apparatus in recent years, various devices such as a semiconductor chip, an image sensor, and a display device are mounted in the electronic apparatus. More data is exchanged between the devices, and the data quantity is increased along with the high functionalization and multi-functionalization of the electronic apparatus. Therefore, the data is often exchanged with use of a high-speed interface that makes it possible to transmit and receive the data, for example, at several Gbps.

Various technologies have been disclosed as for such a high-speed interface. For example, PTL 1 discloses a platform that couples an image sensor to an application processor through a differential serial interface on a one-on-one basis.

CITATION LIST

Patent Literature

PTL 1: U.S. Patent Application Publication No. 2014/0281753 specification

SUMMARY OF INVENTION

In recent years, an electronic apparatus is being downsized, and reduction of a wiring space is desired for an interface between devices in the electronic apparatus.

Accordingly, it is desirable to provide a bus system and a communication device that make it possible to reduce a wiring space.

A bus system according to an embodiment of the disclosure includes three or more devices and a bus. The three or more devices include one or a plurality of imaging devices, and transmit or receive data signals in a time-division manner. The three or more devices are coupled to the bus.

A first communication device according to an embodiment of the disclosure includes: a driver; a termination resistor; and a termination controller. The termination resistor is settable to be enabled or disabled. The termination controller controls the termination resistor to be enabled in a period in which an amplitude value of a signal at an output terminal of the driver is within a predetermined range, among periods other than a period in which the driver transmits a data signal.

A second communication device according to an embodiment of the disclosure includes: a receiver; a termination resistor; and a termination controller. The termination resistor is settable to be enabled or disabled. The termination controller controls the termination resistor to be enabled in a period in which an amplitude value of a signal at an input terminal of the receiver is within a predetermined range, among periods other than a period in which the receiver receives a data signal.

In the bus system according to the embodiment of the disclosure, the three or more devices are coupled to the bus. The three or more devices include one or the plurality of imaging devices. Further, the data signal is transmitted or received among the three or more devices in a time-division manner.

In the first communication device according to the embodiment of the disclosure, the termination resistor is set to be enabled or disabled. At this time, the termination resistor is enabled in the period in which the amplitude value of the signal at the output terminal of the driver is within the predetermined range, among the periods other than the period in which the driver transmits the data signal.

In the second communication device according to the embodiment of the disclosure, the termination resistor is set to be enabled or disabled. At this time, the termination resistor is enabled in the period in which the amplitude value of the signal at the input terminal of the receiver is within the predetermined range, among the periods other than the period in which the receiver receives the data signal.

In the bus system according to the embodiment of the disclosure, the three or more devices including the one or the plurality of imaging devices are coupled to the bus, which makes it possible to reduce the wiring space.

In the first communication device according to the embodiment of the disclosure, in the above-described bus system, the termination resistor is enabled in the period in which the amplitude value of the signal at the output terminal of the driver is within the predetermined range, among the periods other than the period in which the driver transmits the data signal. This makes it possible to reduce the wiring space.

In the second communication device according to the embodiment of the disclosure, in the above-described bus system, the termination resistor is enabled in the period in which the amplitude value of the signal at the input terminal of the receiver is within the predetermined range, among the periods other than the period in which the receiver receives the data signal. This makes it possible to reduce the wiring space.

Note that effects described here are non-limiting. Effects achieved by the technology may be one or more of effects described in the present disclosure.

BRIEF DESCRIPTION OF DRAWINGS

FIG. 1 is a block diagram illustrating a configuration example of a smartphone according to an embodiment of the disclosure.

FIG. 2 is a circuit diagram illustrating a configuration example of a bus system according to a first embodiment.

FIG. 3 is a circuit diagram illustrating a configuration example of a transceiver section illustrated in FIG. 2.

FIG. 4 is a circuit diagram illustrating a configuration example of a receiver section illustrated in FIG. 2.

FIG. 6A is an explanatory diagram illustrating an operation state in the bus system illustrated in FIG. 2.

FIG. 6B is an explanatory diagram illustrating another operation state in the bus system illustrated in FIG. 2.

FIG. 6C is an explanatory diagram illustrating still another operation state in the bus system illustrated in FIG. 2.

FIG. 6D is an explanatory diagram illustrating still another operation state in the bus system illustrated in FIG. 2.

FIG. 6E is an explanatory diagram illustrating still another operation state in the bus system illustrated in FIG. 2.

FIG. 7A is a waveform diagram illustrating an operation example in a bus system according to a comparative example.

FIG. 7B is a waveform diagram illustrating an operation example in the bus system illustrated in FIG. 2.

FIG. 8 is a waveform diagram illustrating an operation example in a case where an equalizer is provided.

FIG. 9 is a circuit diagram illustrating a configuration example of a bus system according to a modification of the first embodiment.

FIG. 10A is an explanatory diagram illustrating an operation state in the bus system illustrated in FIG. 9.

FIG. 10B is an explanatory diagram illustrating another operation state in the bus system illustrated in FIG. 9.

FIG. 10C is an explanatory diagram illustrating still another operation state in the bus system illustrated in FIG. 9.

FIG. 11 is a circuit diagram illustrating a configuration example of a bus system according to another modification of the first embodiment.

FIG. 12 is a block diagram illustrating a configuration example of a smartphone according to another modification of the first embodiment.

FIG. 13 is a circuit diagram illustrating a configuration example of a bus system according to a second embodiment.

FIG. 14 is a circuit diagram illustrating a configuration example of a transceiver section illustrated in FIG. 13.

FIG. 15 is an explanatory diagram illustrating an example of an output signal of a transmitter section illustrated in FIG. 13.

FIG. 16 is a circuit diagram illustrating a configuration example of a receiver section illustrated in FIG. 13.

FIG. 17A is an explanatory diagram illustrating an operation state in the bus system illustrated in FIG. 13.

FIG. 17B is an explanatory diagram illustrating another operation state in the bus system illustrated in FIG. 13.

FIG. 17C is an explanatory diagram illustrating still another operation state in the bus system illustrated in FIG. 13.

FIG. 18 is a block diagram illustrating a configuration example of a smartphone according to a third embodiment.

FIG. 19 is a circuit diagram illustrating a configuration example of a bus system illustrated in FIG. 18.

FIG. 20 is a circuit diagram illustrating a configuration example of a transmitter section illustrated in FIG. 19.

FIG. 21 is a circuit diagram illustrating a configuration example of a transceiver section illustrated in FIG. 19.

FIG. 22 is a circuit diagram illustrating a configuration example of a receiver section illustrated in FIG. 19.

FIG. 24A is an explanatory diagram illustrating an operation state in the bus system illustrated in FIG. 19.

FIG. 24B is an explanatory diagram illustrating another operation state in the bus system illustrated in FIG. 19.

FIG. 24C is an explanatory diagram illustrating still another operation state in the bus system illustrated in FIG. 19.

FIG. 24D is an explanatory diagram illustrating still another operation state in the bus system illustrated in FIG. 19.

FIG. 25 is a block diagram illustrating a configuration example of a smartphone according to a fourth embodiment.

FIG. 26 is a circuit diagram illustrating a configuration example of a bus system illustrated in FIG. 25.

FIG. 27 is a circuit diagram illustrating a configuration example of a transmitter section illustrated in FIG. 26.

FIG. 28 is a circuit diagram illustrating a configuration example of a transceiver section illustrated in FIG. 26.

FIG. 29 is a circuit diagram illustrating a configuration example of a receiver section illustrated in FIG. 26.

FIG. 31 is a timing diagram illustrating an operation example of a bus system according to a modification of the fourth embodiment.

FIG. 32 is a block diagram illustrating a configuration example of a smartphone according to a fifth embodiment.

FIG. 33 is an explanatory diagram illustrating an example of a packet according to the fifth embodiment.

FIG. 34 is a circuit diagram illustrating a configuration example of a bus system illustrated in FIG. 32.

FIG. 35 is a circuit diagram illustrating a configuration example of a transmitter section illustrated in FIG. 34.

FIG. 36 is a circuit diagram illustrating a configuration example of a transceiver section illustrated in FIG. 34.

FIG. 37 is a circuit diagram illustrating a configuration example of a receiver section illustrated in FIG. 34.

FIG. 38 is a timing diagram illustrating an operation example of the bus system illustrated in FIG. 34.

FIG. 39 is a perspective view illustrating a configuration example of a smartphone to which the bus system according to any of the embodiments is applied.

MODES FOR CARRYING OUT THE INVENTION

Figure 5:
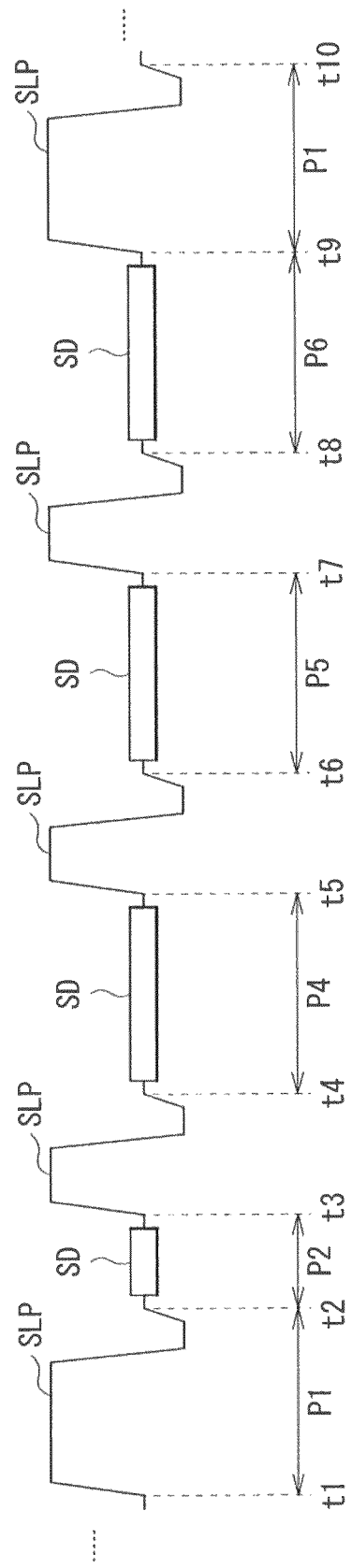
FIG. 5 is a timing diagram illustrating an operation example of the bus system illustrated in FIG. 2.

Some embodiments of the disclosure are described in detail below with reference to drawings. Note that description is given in the following order.

1. First embodiment (an example of controlling communication with use of a bus)
2. Second embodiment (an example of controlling communication with use of a bus)
3. Third embodiment (an example of controlling communication with use of a control signal line)
4. Fourth embodiment (an example of controlling communication with use of a control signal line)
5. Fifth embodiment (an example of controlling communication with use of a control bus)
6. Application example 1. First Embodiment

[Configuration Example]
[Entire Configuration Example]

FIG. 1 is a diagram illustrating a configuration example of a smartphone (a smartphone 1) including a bus system according to a first embodiment. Note that a communication device according to an embodiment of the disclosure is embodied by the present embodiment and is therefore described together. The smartphone 1 includes a display section 11, image sensors 12 and 13, a bus 100, a wireless communicator 14, a speaker 15, a microphone 16, an operation section 17, and an application processor 18.

The display section 11 displays an image and is configured of, for example, a liquid crystal display panel or an organic electroluminescence (EL) display panel. The display section 11 is coupled to the bus 100. The display section 11 displays an image, on the basis of image data that is supplied from the application processor 18 through the bus 100.

The image sensors 12 and 13 image an object, and are each configured of, for example, a complementary metal oxide semiconductor (CMOS) image sensor. In this example, the image sensor 12 is disposed on a surface opposite to a surface provided with the display section 11, in the smartphone 1, and has high resolution. In addition, the image sensor 13 is disposed on the surface provided with the display section 11, in the smartphone 1, and has low resolution. The image sensors 12 and 13 are coupled to the bus 100. In this example, the image sensors 12 and 13 perform imaging operation on the basis of control data that is supplied from the application processor 18 through the bus 100, and supply imaging data to the application processor 18 through the bus 100.

The bus 100 transmits data between devices coupled to the bus. The bus 100 is coupled to the display section 11, the image sensors 12 and 13, and the application processor 18.

The wireless communicator 14 performs wireless communication with a base station of a mobile phone. Note that the wireless communicator 14 may further have a function of performing wireless communication through, for example, wireless local area network (LAN), Bluetooth (registered trademark), and near field communication (NFC), without limitation. The wireless communicator 14 performs exchange of communication data with the application processor 18 in this example.

The speaker 15 outputs sound, and the microphone 16 receives sound. In this example, the speaker 15 receives sound data from the application processor 18, and the microphone 16 supplies sound data to the application processor 18.

The operation section 17 is a user interface that receives operation of a user, and is configured using, for example, a touch panel or various kinds of buttons. The operation section 17 supplies operation data relating to the user operation, to the application processor 18 in this example.

The application processor 18 controls operation of each of the devices in the smartphone 1. The application processor 18 is coupled to the bus 100. Further, the application processor 18 supplies the control data and the image data to the display section 11 through, for example, the bus 100. In addition, the application processor 18 supplies the control data to the image sensors 12 and 13 through the bus 100, and receives the imaging data from the image sensors 12 and 13 through the bus 100. The application processor 18 also has functions of performing exchange of the communication data with the wireless communicator 14, supplying the sound data to the speaker 15, receiving the sound data from the microphone 16, and receiving the operation data from the operation section 17.

[Bus System 2]

The bus 100 configures a bus system 2, together with the display section 11, the image sensors 12 and 13, and the application processor 18. The bus system 2 is described in detail below.

FIG. 2 is a diagram illustrating a configuration example of the bus system 2. The bus system 2 includes the bus 100, resistors 111P to 114P and 111N to 114N, the display section 11, the application processor 18, and the image sensors 12 and 13. The bus system 2 is configured by coupling the display section 11 to one end of the bus 100, and coupling the image sensor 13 to the other end of the bus 100. The display section 11 includes a receiver section 11R. The application processor 18 includes a transceiver section 18T. The image sensor 12 includes a transceiver section 12T. The image sensor 13 includes a transceiver section 13T.

The bus 100 includes transmission paths 100P and 100N. The transmission paths 100P and 100N transmit differential signals, and are each configured of, for example, a wiring pattern on a printed circuit board. A characteristic impedance of each of the transmission paths 100P and 100N is about 50Ω in this example.

The transmission path 100P is coupled to a positive input terminal of the receiver section 11R, a positive input output terminal of the transceiver section 18T, a positive input output terminal of the transceiver section 12T, and a positive input output terminal of the transceiver section 13T, at respective positions different from one another in the transmission path 100P. One end of the transmission path 100P is coupled to the positive input terminal of the receiver section 11R, and the other end thereof is coupled to the positive input output terminal of the transceiver section 13T. Likewise, the transmission path 100N is coupled to a negative input terminal of the receiver section 11R, a negative input output terminal of the transceiver section 18T, a negative input output terminal of the transceiver section 12T, and a negative input output terminal of the transceiver section 13T, at respective positions different from one another in the transmission path 10N. One end of the transmission path 10N is coupled to the negative input terminal of the receiver section 11R and the other end thereof is coupled to the negative input output terminal of the transceiver section 13T.

The positive input terminal of the receiver section 11R is coupled to the one end of the transmission path 100P through the resistor 113P and a transmission path 121P, and the negative input terminal thereof is coupled to the one end of the transmission path 100N through the resistor 111N and a transmission path 121N. The resistors 111P and 111N suppress reflection of signals as described later.

The positive input output terminal of the transceiver section 18T is coupled to the transmission path 100P through the resistor 112P and a transmission path 122P, and the negative input output terminal thereof is coupled to the transmission path 100N through the resistor 112N and a transmission path 122N. The resistors 112P and 112N suppress reflection of signals as described later.

The positive input output terminal of the transceiver section 12T is coupled to the transmission path 100P through the resistor 113P and a transmission path 123P, and the negative input output terminal thereof is coupled to the transmission path 100N through the resistor 113N and a transmission path 123N. The resistors 113P and 113N suppress reflection of signals as described later.

The positive input output terminal of the transceiver section 13T is coupled to the other end of the transmission path 100P through the resistor 114P and a transmission path 124P, and the negative input output terminal thereof is coupled to the other end of the transmission path 100N through the resistor 114N and a transmission path 124N. The resistors 114P and 114N suppress reflection of signals as described later.

[Transceiver Sections 12T, 13T, and 18T]

FIG. 3 is a diagram illustrating a configuration example of the transceiver section 12T of the image sensor 12. The transceiver section 12T includes a driver 21, a receiver 31, a controller 23, switches 24 and 25, a resistor 26, and pads 27 and 28.

The driver 21 outputs a data signal SD in a case where an output enable signal EN is active. The data signal SD is a differential signal that has, for example, a bit rate of several Gbps, and has a differential amplitude of about 200 mV. In a case where the driver 21 outputs the signal, an output impedance at each of output terminals of the driver 21 is about 50Ω in this example. In addition, in a case where the output enable signal EN is inactive, the driver 21 makes the output impedance high.

The receiver 31 receives an inputted differential signal.

The controller 23 turns on the switches 24 and 25 in a case where the output enable signal EN is inactive and an amplitude value of a signal at the input output terminal of the transceiver section 12T is equal to or lower than a predetermined value Vth, and turns off the switches 24 and 25 in other cases. The predetermined value Vth is set to a value that is larger than an amplitude value of the data signal SD and is smaller than an amplitude value of a signal SLP described later. Further, the controller 23 forcibly turns off the switches 24 and 25 irrespective of the output enable signal EN and the amplitude value of the signal at the input output terminal of the transceiver section 12T, in a case where a termination control signal Toff is active.

The switches 24 and 25 are switches that are turned on or off on the basis of instruction from the controller 23. One end of the switch 24 is coupled to the positive input output terminal of the transceiver section 12T, and the other end thereof is coupled to one end of the resistor 26. One end of the switch 25 is coupled to the negative input output terminal of the transceiver section 12T, and the other end thereof is coupled to the other end of the resistor 26.

The resistor 26 functions as a termination resistor of the transceiver section 12T, and one end of the resistor 26 is coupled to the other end of the switch 24 and the other end thereof is coupled to the other end of the switch 25. A resistance value of the resistor 26 is about 100Ω in this example.

The pad 27 is an input output pad at the positive input output terminal of the transceiver section 12T, and the pad 28 is an input output pad at the negative input output terminal of the transceiver section 12T. In the figure, the pad 27 is illustrated as a capacitor inserted between the positive input output terminal of the transceiver section 12T and the ground, and the pad 28 is illustrated as a capacitor inserted between the negative input output terminal of the transceiver section 12T and the ground.

In the transceiver section 12T, the termination control signal Toff is set to active. In other words, as described later, in the transceiver section 12T, the termination control signal Toff is set to active because the transceiver section 12T is not coupled to the one end or the other end of the bus 100 as illustrated in FIG. 2. This forcibly turns off the switches 24 and 25, which forcibly disables the termination resistor (the resistor 26).

As mentioned above, the transceiver section 12T of the image sensor 12 has been described as an example; however, the transceiver section 13T of the image sensor 13 is similarly configured. In the transceiver section 13T, however, the termination control signal Toff is set to inactive, unlike the transceiver section 12T. In other words, as described later, in the transceiver section 13T, the termination control signal Toff is set to inactive because the transceiver section 13T is coupled to the other end of the bus 100 as illustrated in FIG. 2. As a result, in the transceiver section 13T, the switches 24 and 25 are turned on in a case where the output enable signal EN is inactive and the amplitude value of the signal at the input output terminal is equal to or lower than the predetermined value Vth. Therefore, the termination resistor (the resistor 26) is enabled. Moreover, the termination resistor (the resistor 26) is disabled in other cases because the switches 24 and 25 are turned off.

As illustrated in FIG. 3, the transceiver section 18T of the application processor 18 includes a driver 22. The driver 22 outputs the data signal SD or the signal SLP in the case where the output enable signal EN is active. The signal SLP is, for example, a signal having a low frequency and an amplitude of about 1 V. In a case where the driver 22 outputs the signal, an output impedance at each of output terminals of the driver 22 is about 50Ω in this example. In addition, the driver 22 makes the output impedance high in the case where the output enable signal EN is inactive.

In the transceiver section 18T, the termination control signal Toff is set to active because the transceiver section 18T is also not coupled to the one end or the other end of the bus 100 as illustrated in FIG. 2. As a result, the termination resistor (the resistor 26) is forcibly disabled also in the transceiver section 18T.

[Receiver Section 11R]

FIG. 4 is a diagram illustrating a configuration example of the receiver section 11R of the display section 11. The receiver section 11R includes a receiver 31, a controller 33, switches 34 and 35, a resistor 36, and pads 37 and 38.

The controller 33 turns on the switches 34 and 35 in a case where an amplitude value of the signal at the input terminal of the receiver section 11R is equal to or lower than the predetermined value Vth, and turns off the switches 34 and 35 in other cases. Further, the controller 33 forcibly turns off the switches 34 and 35 irrespective of the amplitude value of the signal at the input terminal of the receiver section 11R in the case where the termination control signal Toff is active.

The switches 34 and 35 are switches that are turned on or off on the basis of instruction from the controller 33. One end of the switch 34 is coupled to the positive input terminal of the receiver section 11R, and the other end thereof is coupled to one end of the resistor 36. One end of the switch 35 is coupled to the negative input terminal of the receiver section 11R, and the other end thereof is coupled to the other end of the resistor 36.

The resistor 36 functions as an input termination resistor of the receiver section 11R. One end of the resistor 36 is coupled to the other end of the switch 34, and the other end thereof is coupled to the other end of the switch 35. A resistance value of the resistor 36 is about 100Ω in this example.

The pad 37 is an input pad at the positive input terminal of the receiver section 11R, and the pad 38 is an input pad at the negative input terminal of the receiver section 11R.

In the receiver section 11R, the termination control signal Toff is set to inactive. In other words, as described later, in the receiver section 11R, the termination control signal Toff is set to inactive because the receiver section 11R is coupled to the one end of the bus 100 as illustrated in FIG. 2. Accordingly, the switches 34 and 35 are turned on in the case where the amplitude value of the signal at the input terminal of the receiver section 11R is equal to or lower than the predetermined value Vth, which enables the termination resistor (the resistor 36) in the receiver section 11R. In addition, the switches 34 and 35 are turned off in a case where the amplitude value of the signal at the input terminal of the receiver section 11R is larger than the predetermined value Vth, which disables the termination resistor (the resistor 36).

Here, the image sensors 12 and 13 correspond to a specific example of "one or a plurality of imaging devices" in the disclosure. Each of the transceiver sections 12T, 13T, and 18T, and the receiver section 11R corresponds to a specific example of a "communicator" in the disclosure. The receiver section 11R corresponds to a specific example of a "first communicator" in the disclosure. The resistor 36 and the switches 34 and 35 in the receiver section 11R correspond to a specific example of a "first termination resistor" in the disclosure. The controller 33 in the receiver section 11R corresponds to a specific example of a "termination controller" in the disclosure. The transceiver section 13T corresponds to a specific example of a "second communicator" in the disclosure. The resistor 26 and the switches 24 and 25 in the transceiver section 13T correspond to a specific example of a "second termination resistor" in the disclosure.

[Operation and Action]

Subsequently, operation and action of the smartphone 1 according to the present embodiment are described.

[Entire Operation Outline]

First, entire operation outline of the smartphone 1 is described with reference to FIG. 1. The display section 11 displays an image on the bases of image data that is supplied from the application processor 18 through the bus 100. The image sensors 12 and 13 perform imaging operation on the basis of control data that is supplied from the application processor 18 through the bus 100, and supply imaging data to the application processor 18 through the bus 100. The wireless communicator 14 performs wireless communication with a base station of a mobile phone and performs exchange of communication data with the application processor 18. The speaker 15 receives sound data from the application processor 18, and outputs sound. The microphone 16 supplies inputted sound as sound data to the application processor 18. The operation section 17 receives operation of a user and supplies operation data to the application processor 18. The application processor 18 controls operation of each of the devices in the smartphone 1.

[Detailed Operation]

In FIG. 2, in the receiver section 11R of the display section 11 coupled to the one end of the bus 100, the termination resistor (the resistor 36) is enabled in the case where the amplitude value of the signal at the input terminal is equal to or lower than the predetermined value Vth, and the termination resistor (the resistor 36) is disabled in other cases. In addition, in the transceiver section 13T of the image sensor 13 coupled to the other end of the bus 100, the termination resistor (the resistor 26) is enabled in the case where the output enable signal EN is inactive and the amplitude value of the signal at the input output terminal is equal to or lower than the predetermined value Vth, and the termination resistor (the resistor 26) is disabled in other cases. Further, in the transceiver section 18T of the application processor 18 and the transceiver section 12T of the image sensor 12, the termination resistor (the resistor 26) is forcibly disabled. Operation of the bus system 2 set in the above-described manner is described below.

FIG. 5 is a waveform diagram of the signal in the bus 100. FIGS. 6A to 6E are diagrams illustrating operation states of the bus system 2 in various periods. In FIGS. 6A to 6E, the drivers 21 and 22 illustrated by solid lines are drivers transmitting signals, and drivers 21 and 22 illustrated by dashed lines are drivers not transmitting signals. A resistor that indicates output impedance is illustrated between the positive output terminal and the negative output terminal in the driver transmitting a signal. A resistance value of the resistor is about 100Ω in this example. Likewise, the receiver 31 illustrated by a solid line is a receiver receiving a signal, and the receiver 31 illustrated by a dashed line is a receiver not receiving a signal. In addition, only an enabled termination resistor is illustrated for convenience of explanation, and a disabled termination resistor is omitted in illustration in FIGS. 6A to 6E.

In the bus system 2, the application processor 18 first gives instruction of the order of communication, communication bands, etc. to the display section 11 and the image sensors 12 and 13. Thereafter, the display section 11 and the image sensors 12 and 13 each perform communication in the instructed order. The operation is described in detail below.

First, as illustrated in FIG. 5, the transceiver section 18T of the application processor 18 transmits the signal SLP in a period from timing t1 to timing t2 (a reset period P1).

In the reset period P1, as illustrated in FIG. 6A, the driver 22 of the application processor 18 transmits the signal SLP, and the respective receivers 31 of the display section 11 and the image sensors 12 and 13 receive the signal SLP. At this time, in the receiver section 11R coupled to the one end of the bus 100, the termination resistor (the resistor 36) is disabled because the amplitude value of the signal at the input terminal is larger than the predetermined value Vth. Further, in the transceiver section 13T coupled to the other end of the bus 100, the termination resistor (the resistor 26) is disabled because the amplitude value of the signal at the input output terminal is larger than the predetermined value Vth.

The display section 11 and the image sensors 12 and 13 receive such a signal SLP to prepare for instruction from the application processor 18 in a next period (an instruction period P2).

Next, as illustrated in FIG. 5, the transceiver section 18T of the application processor 18 transmits a data signal SD in a period from timing t2 to timing t3 (the instruction period P2). The application processor 18 thus transmits control data to the display section 11 and the image sensors 12 and 13 to give instruction of the order of communication, communication bands, etc.

In the instruction period P2, as illustrated in FIG. 6B, the driver 22 of the application processor 18 transmits the data signal SD (the control data), and the respective receivers 31 of the display section 11 and the image sensors 12 and 13 receive the data signal SD. At this time, in the receiver section 11R coupled to the one end of the bus 100, the termination resistor (the resistor 36) is enabled because the amplitude value of the signal at the input terminal is equal to or lower than the predetermined value Vth. In addition, in the transceiver section 13T coupled to the other end of the bus 100, the termination resistor (the resistor 26) is enabled because the output enable signal EN is inactive and the amplitude value of the signal at the input output terminal is equal to or lower than the predetermined value Vth.

Note that the application processor 18 transmits the data signal SD (the control data) to the three devices (the display section 11 and the image sensors 12 and 13) at the same time in this example; however, the transmission order is not limited thereto. For example, the application processor 18 may sequentially transmit the data signal SD (the control data) to the three devices in a time-division manner.

In this example, the application processor 18 instructs the image sensor 12 to transmit the imaging data in a first data communication period (a data communication period P4). In addition, the application processor 18 instructs the image sensor 13 to transmit the imaging data in a subsequent data communication period (a data communication period P5). Furthermore, the application processor 18 instructs the display section 11 to receive the image data in a subsequent data communication period (a data communication period P6). The display section 11 and the image sensors 12 and 13 receive the instruction to perform communication in accordance with the instruction thereafter.

Next, as illustrated in FIG. 5, the transceiver section 18T of the application processor 18 transmits the signal SLP in a period from timing t3 to timing t4. At this time, the transceiver section 18T transmits the signal SLP in a period shorter than the reset period P1. The operation state of the bus system 2 in this period is similar to the operation state in the reset period P1 (FIG. 6A). The display section 11 and the image sensors 12 and 13 receive the signal SLP, thereby grasping start of a new data communication period (the data communication period P4) after the signal. The image sensor 12 then prepares for transmission of the imaging data in the data communication period.

Next, as illustrated in FIG. 5, the transceiver section 12T of the image sensor 12 transmits the data signal SD in a period from timing t4 to timing t5 (the data communication period P4). The image sensor 12 thus transmits the imaging data to the application processor 18.

In the data communication period P4, as illustrated in FIG. 6C, the driver 21 of the image sensor 12 transmits the data signal SD (the imaging data), and the receiver 31 of the application processor 18 receives the data signal SD. At this time, in the receiver section 11R coupled to the one end of the bus 100, the termination resistor (the resistor 36) is enabled because the amplitude value of the signal at the input terminal is equal to or lower than the predetermined value Vth. As mentioned above, the receiver section 11R enables the termination resistor in spite of not receiving the data signal SD. Further, in the transceiver section 13T coupled to the other end of the bus 100, the termination resistor (the resistor 26) is enabled because the output enable signal EN is inactive and the amplitude value of the signal at the input output terminal is equal to or lower than the predetermined value Vth. As mentioned above, the transceiver section 13T enables the termination resistor in spite of not transmitting and receiving the data signal SD.

Next, as illustrated in FIG. 5, the transceiver section 18T of the application processor 18 transmits the signal SLP in a period from timing t5 to timing t6. At this time, the transceiver section 18T transmits the signal SLP in a period shorter than the reset period P1. The operation state of the bus system 2 in this period is similar to the operation state in the reset period P1 (FIG. 6A). The display section 11 and the image sensors 12 and 13 receive the signal SLP, thereby grasping start of a new data communication period (the data communication period P5) after the signal. The image sensor 13 then prepares for transmission of the imaging data in the data communication period.

Next, as illustrated in FIG. 5, the transceiver section 13T of the image sensor 13 transmits the data signal SD in a period from timing 16 to timing t7 (the data communication period P5). The image sensor 13 thus transmits the imaging data to the application processor 18.

In the data communication period P5, as illustrated in FIG. 6D, the driver 21 of the image sensor 13 transmits the data signal SD (the imaging data), and the receiver 31 of the application processor 18 receives the data signal SD. At this time, in the receiver section 11R coupled to the one end of the bus 100, the termination resistor (the resistor 36) is enabled because the amplitude value of the signal at the input terminal is equal to or lower than the predetermined value Vth. As mentioned above, the receiver section 11R enables the termination resistor in spite of not receiving the data signal SD. In contrast, in the transceiver section 13T coupled to the other end of the bus 100, the termination resistor (the resistor 26) is disabled because the output enable signal EN is active. In other words, in the transceiver section 13T, the termination resistor (the resistor 26) is disabled because the output impedance of the driver 21 functions as an output termination resistor.

Next, as illustrated in FIG. 5, the transceiver section 18T of the application processor 18 transmits the signal SLP in a period from timing t7 to timing t8. At this time, the transceiver section 18T transmits the signal SLP in a period shorter than the reset period P1. The operation state of the bus system 2 in this period is similar to the operation state in the reset period P1 (FIG. 6A). The display section 11 and the image sensors 12 and 13 receive the signal SLP, thereby grasping start of a new data communication period (the data communication period P6) after the signal. The display section 11 then prepares for reception of the image data in the data communication period.

Next, as illustrated in FIG. 5, the transceiver section 18T of the application processor 18 transmits the data signal SD in a period from timing t8 to timing t9 (the data communication period P6). The application processor 18 thus transmits the image data to the display section 11.

In the data communication period P6, as illustrated in FIG. 6E, the driver 22 of the application processor 18 transmits the data signal SD (the image data), and the receiver 31 of the display section 11 receives the data signal SD. At this time, in the receiver section 11R coupled to the one end of the bus 100, the termination resistor (the resistor 36) is enabled because the amplitude value of the signal at the input terminal is equal to or lower than the predetermined value Vth. In addition, in the transceiver section 13T coupled to the other end of the bus 100, the termination resistor (the resistor 26) is enabled because the output enable signal EN is inactive and the amplitude value of the signal at the input output terminal is equal to or lower than the predetermined value Vth. As mentioned above, the transceiver section 13T enables the termination resistor in spite of not transmitting and receiving the data signal SD.

In the bus system 2, such operation is repeated. The transmission and reception of the data is accordingly performed in the bus system 2.

As mentioned above, in the bus system 2, the plurality of devices (the display section 11, the image sensors 12 and 13, and the application processor 18) are coupled to the bus 100. This makes it possible to reduce a wiring space as compared with a case where devices are coupled to one another on a one-on-one basis.

In addition, in the bus system 2, the termination resistor (the resistor 36) of the receiver section 11R is enabled in the instruction period P2 (FIG. 6B) and the data communication periods P4 to P6 (FIGS. 6C to 6E), and the termination resistor (the resistor 26) of the transceiver section 13T is enabled in the instruction period P2 (FIG. 6B) and the data communication periods P4 and P6 (FIGS. 6C and 6E). This makes it possible to enhance communication quality. In other words, the receiver section 11R is coupled to the one end of the bus 100, and the transceiver section 13T is coupled to the other end of the bus 100. Therefore, enabling the respective termination resistor in the receiver section 11R and the transceiver section 13T makes it possible to reduce reflection in the bus 100. As a result, it is possible to enhance communication quality in the bus system 2.

Further, in the bus system 2, the termination resistor (the resistor 36) in the receiver section 11R and the termination resistor (the resistor 26) in the transceiver section 13T are disabled in the period in which the transceiver section 18T of the application processor 18 transmits the signal SLP, for example, in the reset period P1 (FIG. 6A). This makes it possible to reduce power consumption. In other words, influence of reflection to communication quality is small because the frequency of the signal is low in such a period. Therefore, disabling the respective termination resistor of the receiver section 11R and the transceiver section 13T in such a period makes it possible to reduce power consumption while maintaining communication quality.

Furthermore, in the bus system 2, the resistors 111P to 114P and 111N to 114N are provided between the bus 100 and the respective devices. More specifically, the resistors 111P and 111N are inserted between the bus 100 and the receiver section 11R, the resistors 112P and 112N are inserted between the bus 100 and the transceiver section 18T, the resistors 113P and 113N are inserted between the bus 100 and the transceiver section 12T, and the resistors 114P and 114N are inserted between the bus 100 and the transceiver section 13T. This makes it possible to enhance communication quality as described below.

FIGS. 7A and 7B are eye diagrams of differential signals at an input terminal of a certain receiver section, where FIG. 7A illustrates an example (a comparative example) in a case where the resistors 111P to 114P and 111N to 114N are omitted, and FIG. 7B illustrates an example in a case where the resistors 111P to 114P and 111N to 114N are provided. As illustrated in FIG. 7A, in the case where the resistors 111P to 114P and 111N to 114N are not provided, the signal is reflected and the waveform thereof is largely disturbed. In contrast, as illustrated in FIG. 7B, these resistors are inserted, which makes it possible to reduce reflection of the signal. Further, for example, in a case where an equalizer is provided in the receiver section, it is possible to open the eye as illustrated in FIG. 8, and to enhance communication quality. As mentioned above, in the bus system 2, the resistors 111P to 114P and 111N to 114N are provided between the bus 100 and the respective devices. This makes it possible to enhance communication quality.

In addition, in the bus system 2, the application processor 18 instructs the order of communication of the display section 11 and the image sensors 12 and 13. This allows each of the devices to use the bus 100 in the time-division manner, thereby enhancing flexibility of communication in the bus system 2. Further, in the bus system 2, the control data for such instruction is also transmitted and received through the bus 100, in addition to the imaging data and the image data. This makes it possible to reduce a wiring space as compared with a case where a wiring is separately provided for the control data.

Furthermore, in the bus system 2, the length of the period in which the application processor 18 transmits the signal SLP is varied. More specifically, the length of the period (the reset period P1) in which the application processor 18 transmits the signal SLP before the instruction period P2 is made different from the length of the period in which the application processor 18 transmits the signal SLP before each of the data communication periods P4 to P6. This allows the display section 11 and the image sensors 12 and 13 to grasp whether the data signal SD after reception of the signal SLP is control data, and to accordingly grasp that the communicable device is to be changed. As a result, in the bus system 2, it is possible to control communication by a simple method.

[Effects]

As mentioned above, in the present embodiment, since the plurality of devices are coupled to the bus, it is possible to reduce a wiring space.

In the present embodiment, since the termination resistor of the respective device coupled to the ends of the bus are enabled in the instruction period and the data communication period, it is possible to enhance communication quality.

In the present embodiment, since the termination resistor of the respective devices coupled to the ends of the bus are disabled in the reset period and other period, it is possible to reduce power consumption.

In the present embodiment, since the resistors are inserted between the bus and the respective devices, it is possible to enhance communication quality.

In the present embodiment, since the length of the period in which the application processor transmits the signal SLP is varied, it is possible to control communication by a simple method.

[Modification 1-1]

In the above-described embodiment, the display section 11 is coupled to the one end of the bus 100, and the image sensor 13 is coupled to the other end of the bus 100; however, the coupling is not limited thereto, and the devices may be optionally disposed. An example of other disposition is described below.

FIG. 9 is a diagram illustrating a configuration example of a bus system 2A according to the present modification. In the bus system 2A, the application processor 18 is coupled to the one end of the bus 100, and the image sensor 13 is coupled to the other end of the bus 100.

The transmission path 100P is coupled to the positive input output terminal of the transceiver section 18T, the positive input terminal of the receiver section 11R, the positive input output terminal of the transceiver section 12T, and the positive input output terminal of the transceiver section 13T, at respective positions different from one another in the transmission path 100P. The one end of the transmission path 100P is coupled to the positive input output terminal of the transceiver section 18T, and the other end thereof is coupled to the positive input output terminal of the transceiver section 13T. Likewise, the transmission path 100N is coupled to the negative input output terminal of the transceiver section 18T, the negative input terminal of the receiver section 11R, the negative input output terminal of the transceiver section 12T, and the negative input output terminal of the transceiver section 13T, at respective positions different from one another in the transmission path 100N. The one end of the transmission path 100N is coupled to the negative input output terminal of the transceiver section 18T, and the other end thereof is coupled to the negative input output terminal of the transceiver section 13T.

The positive input output terminal of the transceiver section 18T is coupled to the one end of the transmission path 100P through the resistor 111P and the transmission path 121P, and the negative input output terminal thereof is coupled to the one end of the transmission path 100N through the resistor 111N and the transmission path 121N. The positive input terminal of the receiver section 11R is coupled to the transmission path 100P through the resistor 112P and the transmission path 122P, and the negative input terminal thereof is coupled to the transmission path 100N through the resistor 112N and the transmission path 122N.

The transceiver sections 12T and 13T are similar to those in the bus system 2 (FIG. 2) according to the above-described embodiment.

In the transceiver section 18T, the termination control signal Toff is set to inactive because the transceiver section 18T is coupled to the one end of the bus 100, in this example. Therefore, in the transceiver section 18T, the termination resistor (the resistor 26) is enabled in the case where the output enable signal EN is inactive and the amplitude value of the signal at the input output terminal is equal to or lower than the predetermined value Vth, and the termination resistor (the resistor 26) is disabled in other cases.

In contrast, in the receiver section 11R, the termination control signal Toff is set to active because the receiver section 11R is not coupled to the one end or the other end of the bus 100 in this example. Accordingly, the termination resistor (the resistor 36) is forcibly disabled in the receiver section 11R.

FIG. 10A is a diagram illustrating an operation state of the bus system 2A in the reset period P1. In the reset period P1, the driver 22 of the application processor 18 transmits the signal SLP, and the respective receivers 31 of the display section 11 and the image sensors 12 and 13 receive the signal SLP. At this time, in the transceiver section 18T coupled to the one end of the bus 100, the termination resistor (the resistor 26) is disabled because the output enable signal EN is active. In addition, in the transceiver section 13T coupled to the other end of the bus 100, the termination resistor (the resistor 26) is disabled because the amplitude value of the signal at the input output terminal is larger than the predetermined value Vth.

FIG. 10B is a diagram illustrating the operation state of the bus system 2A in the instruction period P2. In the instruction period P2, the driver 22 of the application processor 18 transmits the data signal SD (the control data), and the respective receivers 31 of the display section 11 and the image sensors 12 and 13 receive the data signal SD. At this time, in the transceiver section 18T coupled to the one end of the bus 100, the termination resistor (the resistor 26) is disabled because the output enable signal EN is active. In other words, in the transceiver section 18T, the termination resistor (the resistor 26) is disabled because the output impedance of the driver 22 functions as an output termination resistor. In contrast, in the transceiver section 13T coupled to the other end of the bus 100, the termination resistor (the resistor 26) is enabled because the output enable signal EN is inactive and the amplitude value of the signal at the input output terminal is equal to or lower than the predetermined value Vth.

FIG. 10C is a diagram illustrating the operation state of the bus system 2A in the data communication period P4. In the data communication period P4, the driver 21 of the image sensor 12 transmits the data signal SD (the imaging data), and the receiver 31 of the application processor 18 receives the data signal SD. At this time, in the transceiver section 18T coupled to the one end of the bus 100, the termination resistor (the resistor 26) is enabled because the output enable signal EN is inactive and the amplitude value of the signal at the input output terminal is equal to or lower than the predetermined value Vth. In addition, in the transceiver section 13T coupled to the other end of the bus 100, the termination resistor (the resistor 26) is enabled because the output enable signal EN is inactive and the amplitude value of the signal at the input output terminal is equal to or lower than the predetermined value Vth. As mentioned above, the transceiver section 13T enables the termination resistor in spite of not transmitting and receiving the signal.

As mentioned above, the bus system 2A makes it possible to achieve effects similar to the effects of the bus system 2 according to the above-described embodiment. In other words, the technology makes it possible to flexibly deal with a case where the disposition of the devices are changed to change the bus structure.

[Modification 1-2]

In the above-described embodiment, as illustrated in FIG. 2, the resistors 111P to 114P and 111N to 114N are provided between the bus 100 and the respective devices; however, the configuration is not limited thereto. For example, as with a bus system 2B illustrated in FIG. 11, some of the resistors may be removed within a range in which communication quality satisfies specifications. In this example, the resistors 111P and 111N between the bus 100 and the receiver section 11R are removed from the bus system 2 (FIG. 2). In other words, since the receiver section 11R is coupled to the one end of the bus 100, the termination resistor (the resistor 36) is enabled in the instruction period P2 (FIG. 6B) and the data communication periods P4 to P6 (FIGS. 6C to 6E). As a result, reflection of the signal is suppressed. Therefore, the resistors 111P and 111N may be removed within a range in which communication quality satisfies specifications.

[Modification 1-3]

In the above-described embodiment, one bus 100 is provided; however, the configuration is not limited thereto. For example, as with a smartphone 1C illustrated in FIG. 12, a clock bus 200 that transmits a clock signal may be further provided, in addition to the bus 100. The smartphone 1C includes a display section 11C, image sensors 12C and 13C, and an application processor 18C. These devices are each coupled to the bus 100X) and the clock bus 200.

[Modification 1-4]

In the above-described embodiment, in addition to the imaging data and the image data, the control data for instruction of the order of communication is also transmitted and received through the bus 100; however, the configuration is not limited thereto. For example, the control data may be transmitted and received through another wiring.

[Modification 1-5]

In the above-described embodiment, the application processor 18 transmits the signal SLP; however, the configuration is not limited thereto. For example, one of the image sensors 12 and 13 may transmit the signal SLP. In addition, two or more of the application processor 18 and the image sensors 12 and 13 may transmit the signal SLP.

[Other Modification]

Moreover, two or more of these modifications may be combined.

2. Second Embodiment

Next, a smartphone 3 including a bus system according to a second embodiment is described. The present embodiment is different in the configuration of the bus from the above-described first embodiment. In other words, the bus 100 is configured using the two transmission paths 100P and 100N in the above-described embodiment (FIG. 2). In the present embodiment, alternatively, the bus is configured using three transmission paths. Note that components substantially same as those of the smartphone 1 according to the above-described first embodiment are denoted by the same reference numerals, and description of such components is appropriately omitted.

The smartphone 3 includes a display section 41, an image sensor 42, an image sensor 43, a bus 400, and an application processor 48, as illustrated in FIG. 1. The bus 400 configures the bus system 4, together with the display section 41, the image sensors 42 and 43, and the application processor 48.

[Bus System 4]

FIG. 13 is a diagram illustrating a configuration example of the bus system 4. The bus system 4 includes the bus 400, resistors 411A to 414A, 411B to 414B, and 411C to 414C, the application processor 48, the display section 41, and the image sensors 42 and 43. The bus system 4 is configured by coupling the application processor 48 to one end of the bus 400, and coupling the image sensor 43 to the other end of the bus 400. The application processor 48 includes a transceiver section 48T. The display section 41 includes a receiver section 41R. The image sensor 42 includes a transceiver section 42T. The image sensor 43 includes a transceiver section 43T.

The bus 400 includes three transmission paths 400A to 400C. The transmission paths 400A to 400C transmit three signals. A characteristic impedance of each of the transmission paths 400A to 400C is about 50Ω in this example.

The transmission path 400A is coupled to a first input output terminal of the transceiver section 48T, a first input terminal of the receiver section 48R, a first input output terminal of the transceiver section 42T, and a first input output terminal of the transceiver section 43T, at respective positions different from one another in the transmission path 400A. One end of the transmission path 400A is coupled to the first input output terminal of the transceiver section 48T, and the other end thereof is coupled to the first input output terminal of the transceiver section 43T. Likewise, the transmission path 400B is coupled to a second input output terminal of the transceiver section 48T, a second input terminal of the receiver section 48R, a second input output terminal of the transceiver section 42T, and a second input output terminal of the transceiver section 43T, at respective positions different from one another in the transmission path 400B. One end of the transmission path 400B is coupled to the second input output terminal of the transceiver section 48T, and the other end thereof is coupled to the second input output terminal of the transceiver section 43T. In addition, the transmission path 400C is coupled to a third input output terminal of the transceiver section 48T, a third input terminal of the receiver section 48R, a third input output terminal of the transceiver section 42T, and a third input output terminal of the transceiver section 43T, at respective positions different from one another in the transmission path 400C. One end of the transmission path 400C is coupled to the third input output terminal of the transceiver section 48T, and the other end thereof is coupled to the third input output terminal of the transceiver section 43T.

The first input output terminal of the transceiver section 48T is coupled to the one end of the transmission path 400A through the resistor 411A and a transmission path 421A, the second input output terminal thereof is coupled to the one end of the transmission path 400B through the resistor 411B and a transmission path 421B, and the third input output terminal thereof is coupled to the one end of the transmission path 400C through the resistor 411C and a transmission path 421C.

The first input terminal of the receiver section 41R is coupled to the transmission path 400A through the resistor 412A and a transmission path 422A, the second input terminal thereof is coupled to the transmission path 400B through the resistor 412B and a transmission path 422B, and the third input terminal thereof is coupled to the transmission path 400C through the resistor 412C and a transmission path 422C.

The first input output terminal of the transceiver section 42T is coupled to the transmission path 400A through the resistor 413A and a transmission path 423A, the second input output terminal thereof is coupled to the transmission path 400B through the resistor 413B and a transmission path 423B, and the third input output terminal thereof is coupled to the transmission path 400C through the resistor 413C and a transmission path 423C.

The first input output terminal of the transceiver section 43T is coupled to the other end of the transmission path 400A through the resistor 414A and a transmission path 424A, the second input output terminal thereof is coupled to the other end of the transmission path 400B through the resistor 414B and a transmission path 424B, and the third input output terminal thereof is coupled to the other end of the transmission path 400C through the resistor 414C and a transmission path 424C.

[Transceiver Sections 42T, 43T, and 48T]

FIG. 14 is a diagram illustrating a configuration example of the transceiver section 42T of the image sensor 42. The transceiver section 42T includes a driver 51, a receiver 61, a controller 53, switches 54A to 54C, resistors 55A to 55C, and pads 56A to 56C.

The driver 51 outputs data signals SD (signals SIGA to SIGC) in the case where the output enable signal EN is active. In a case where the driver 51 outputs the signals, the output impedance at each of output terminals of the driver 51 is about 50Ω in this example. In addition, in the case where the output enable signal EN is inactive, the driver 51 makes the output impedance high.

FIG. 15 is a diagram illustrating an example of the signals SIGA to SIGC. The driver 51 uses the three signals SIGA to SIGC to transmit six symbols "+x", "−x", "+y", "−y", "+z", and "−z". For example, in a case of transmitting the symbol "+x", the driver 51 sets the signal SIGA to a high level voltage VH, sets the signal SIGB to a low level voltage VL, and sets the signal SIGC to a middle level voltage VM. In a case of transmitting the symbol "−x", the driver 51 sets the signal SIGA to the low level voltage VL, sets the signal SIGB to the high level voltage VH, and sets the signal SIGC to the middle level voltage VM. In a case of transmitting the symbol "+y", the driver 51 sets the signal SIGA to the middle level voltage VM, sets the signal SIGB to the high level voltage VH, and sets the signal SIGC to the low level voltage VL. In a case of transmitting the symbol "−y", the driver 51 sets the signal SIGA to the middle level voltage VM, sets the signal SIGB to the low level voltage VL, and sets the signal SIGC to the high level voltage VH. In a case of transmitting the symbol "+z", the driver 51 sets the signal SIGA to the low level voltage VL, sets the signal SIGB to the middle level voltage VM, and sets the signal SIGC to the high level voltage VH. In a case of transmitting the symbol "−z", the driver 51 sets the signal SIGA to the high level voltage VH, sets the signal SIGB to the middle level voltage VM, and sets the signal SIGC to the low level voltage VL.

The receiver 61 receives the inputted three signals.

The controller 53 turns on the switches 54A to 54C in a case where the output enable signal EN is inactive and an amplitude value of the signal at the input output terminal of the transceiver section 42T is equal to or lower than the predetermined value Vth, and turns off the switches 54A to 54C in other cases. Further, the controller 53 forcibly turns off the switches 54A to 54C irrespective of the output enable signal EN and the amplitude value of the signal at the input output terminal of the transceiver section 42T, in the case where the termination control signal Toff is active.

The switches 54A to 54C are switches that are turned on or off on the basis of instruction from the controller 53. One end of the switch 54A is coupled to the first input output terminal of the transceiver section 42T, and the other end thereof is coupled to one end of the resistor 55A. One end of the switch 54B is coupled to the second input output terminal of the transceiver section 42T, and the other end thereof is coupled to one end of the resistor 55B. One end of the switch 54C is coupled to the third input output terminal of the transceiver section 42T, and the other end thereof is coupled to one end of the resistor 55C.

The resistors 55A to 55C each function as a termination resistor of the transceiver section 42T. The one end of the resistor 55A is coupled to the other end of the switch 54A, and the other end thereof is coupled to the other ends of the respective resistors 55B and 55C. The one end of the resistor 55B is coupled to the other end of the switch 54B, and the other end thereof is coupled to the other ends of the respective resistors 55A and 55C. The one end of the resistor 55C is coupled to the other end of the switch 54C, and the other end thereof is coupled to the other ends of the respective resistors 55A and 55B. A resistance value of each of the resistors 55A to 55C is about 50Ω in this example.

The pad 56A is an input output pad at the first input output terminal of the transceiver section 42T, the pad 56B is an input output pad at the second input output terminal of the transceiver section 42T, and the pad 56C is an input output pad at the third input output terminal of the transceiver section 42T.

In the transceiver section 42T, the termination control signal Toff is set to active because the transceiver section 42T is not coupled to the one end or the other end of the bus 400 as illustrated in FIG. 13. As a result, the switches 54A to 54C are forcibly turned off, and the termination resistors (the resistors 55A to 55C) are accordingly forcibly disabled.

Hereinbefore, although the transceiver section 42T of the image sensor 42 has been described as an example, the same applies to the transceiver section 43T of the image sensor 43. The transceiver section 43T, however, is coupled to the other end of the bus 400 as illustrated in FIG. 13. Therefore, the termination control signal Toff is set to inactive in the transceiver section 43T. As a result, in the transceiver section 43T, the termination resistors (the resistors 55A to 55C) are enabled in the case where the output enable signal EN is inactive and the amplitude value of the signal at the input output terminal is equal to or lower than the predetermined value Vth, and the termination resistors (the resistors 55A to 55C) are disabled in other cases.

The transceiver section 48T of the application processor 48 includes a driver 52, as illustrated in FIG. 14. The driver 52 outputs the data signal SD or the signal SLP in the case where the output enable signal EN is active. In a case where the driver 52 outputs the signal, the output impedance at each of output terminals is about 50Ω in this example. In addition, in the case where the output enable signal EN is inactive, the driver 52 makes the output impedance high.

In the transceiver section 48T, the termination control signal Toff is set to inactive because the transceiver section 48T is coupled to the one end of the bus 400 as illustrated in FIG. 13. As a result, in the transceiver section 48T, the termination resistors (the resistors 55A to 55C) are enabled in the case where the output enable signal EN is inactive and the amplitude value of the signal at the input output terminal is equal to or lower than the predetermined value Vth, and the termination resistors (the resistors 55A to 55C) are disabled in other cases.

[Receiver Section 41R]

FIG. 16 is a diagram illustrating a configuration example of the receiver section 41R of the display section 11. The receiver section 41R includes the receiver 61, a controller 63, switches 64A to 64C, resistors 65A to 65C, and pads 66A to 66C.

The controller 63 turns on the switches 64A to 64C in a case where an amplitude value of the signal at the input terminal of the receiver section 41R is equal to or lower than the predetermined value Vth, and turns off the switches 64A to 64C in other cases. Further, the controller 63 forcibly turns off the switches 64A to 64C irrespective of the amplitude value of the signal at the input terminal of the receiver section 41R, in the case where the termination control signal Toff is active.

The switches 64A to 64C are switches that are turned on or off on the basis of instruction from the controller 63. One end of the switch 64A is coupled to the first input terminal of the receiver section 41R, and the other end thereof is coupled to one end of the resistor 65A. One end of the switch 64B is coupled to the second input terminal of the receiver section 41R, and the other end thereof is coupled to one end of the resistor 65B. One end of the switch 64C is coupled to the third input terminal of the receiver section 41R, and the other end thereof is coupled to one end of the resistor 65C.

The resistors 65A to 65C each function as an input termination resistor of the receiver section 41R. The one end of the resistor 65A is coupled to the other end of the switch 64A, and the other end thereof is coupled to the other ends of the respective resistors 65B and 65C. The one end of the resistor 65B is coupled to the other end of the switch 64B, and the other end thereof is coupled to the other ends of the respective resistors 65A and 65C. The one end of the resistor 65C is coupled to the other end of the switch 64C, and the other end thereof is coupled to the other ends of the respective resistors 65A and 65B. The resistance value of each of the resistors 65A to 65C is about 50Ω in this example.

The pad 66A is an input pad at the first input terminal of the receiver section 41R, the pad 66B is an input pad at the second input terminal of the receiver section 41R, and the pad 66C is an input pad at the third input terminal of the receiver section 41R.

In the receiver section 41R, the termination control signal Toff is set to active because the receiver section 41R is not coupled to the one end or the other end of the bus 400 as illustrated in FIG. 13. As a result, the termination resistors (the resistors 65A to 65C) are forcibly disabled in the receiver section 41R.

[Detailed Operation]

FIG. 17A is a diagram illustrating the operation state of the bus system 4 in the reset period P1. In FIG. 17A, a resistor that indicates output impedance is illustrated in the driver transmitting the signal. A resistance value of each of the resistors is about 50Ω in this example.

In the reset period P1, the driver 52 of the application processor 48 transmits the signal SLP, and the respective receivers 61 of the display section 41 and the image sensors 42 and 43 receive the signal SLP. At this time, in the transceiver section 48T coupled to the one end of the bus 400, the termination resistors (the resistors 55A to 55C) are disabled because the output enable signal EN is active. Further, in the transceiver section 43T coupled to the other end of the bus 400, the termination resistors (the resistors 55A to 55C) are disabled because the amplitude value of the signal at the input output terminal is larger than the predetermined value Vth.

FIG. 17B is a diagram illustrating the operation state of the bus system 4 in the instruction period P2. In the instruction period P2, the driver 52 of the application processor 48 transmits the data signal SD (the control data), and the respective receivers 61 of the display section 41 and the image sensors 42 and 43 receive the data signal SD. At this time, in the transceiver section 48T coupled to the one end of the bus 400, the termination resistors (the resistors 55A to 55C) are disabled because the output enable signal EN is active. In other words, in the transceiver section 48T, the termination resistors (the resistors 55A to 55C) are disabled because the output impedance of the driver 52 functions as an output termination resistor. In contrast, in the transceiver section 43T coupled to the other end of the bus 400, the termination resistors (the resistors 55A to 55C) are enabled because the output enable signal EN is inactive and the amplitude value of the signal at the input output terminal is equal to or lower than the predetermined value Vth.

FIG. 17C is a diagram illustrating the operation state of the bus system 4 in the data communication period P4. In the data communication period P4, the driver 51 of the image sensor 42 transmits the data signal SD (the imaging data), and the receiver 61 of the application processor 48 receives the data signal SD. At this time, in the transceiver section 48T coupled to the one end of the bus 400, the termination resistors (the resistors 55A to 55C) are enabled because the output enable signal EN is inactive and the amplitude value of the signal at the input output terminal is equal to or lower than the predetermined value Vth. In addition, in the transceiver section 43T coupled to the other end of the bus 400, the termination resistors (the resistors 55A to 55C) are enabled because the output enable signal EN is inactive and the amplitude value of the signal at the input output terminal is equal to or lower than the predetermined value Vth. As mentioned above, the transceiver section 43T coupled to the other end of the bus 400 enables the termination resistor in spite of not transmitting and receiving the data signal SD.

As mentioned above, even in a case where the bus 400 is configured using the three transmission paths 400A to 400C, it is possible to achieve effects similar to the effects of the bus system according to the first embodiment.

[Modification 2-1]

Each of the above-described modifications of the first embodiment may be applied to the bus system 4 according to the above-described embodiment.

3. Third Embodiment

Next, a smartphone 5 including a bus system according to a third embodiment is described. The present embodiment controls communication with use of three control signal lines. Note that components substantially same as those of the smartphone 1 according to the above-described first embodiment are denoted by the same reference numerals, and description of such components is appropriately omitted.

FIG. 18 is a diagram illustrating a configuration example of the smartphone 5. The smartphone 5 includes a display section 71, image sensors 72 and 73, the bus 100, and an application processor 78. The display section 71 and the image sensors 72 and 73 perform communication on the basis of control signals S71 to S73. The application processor 78 supplies the control signals S71 to S73 to the display section 71 and the image sensors 72 and 73. The bus 100 configures a bus system 6, together with the display section 71, the image sensors 72 and 73, and the application processor 78.

FIG. 19 is a diagram illustrating a configuration example of the bus system 6. The bus system 6 is configured by coupling the display section 71 to one end of the bus 100, and coupling the image sensor 73 to the other end of the bus 100. The display section 71 includes a receiver section 71R. The application processor 78 includes a transceiver section 78T. The image sensor 72 includes a transmitter section 72T. The image sensor 73 includes a transmitter section 73T.

Further, the transceiver section 78T of the application processor 67 supplies the control signals S71 to S73 to the receiver section 71R of the display section 71, the transmitter section 72T of the image sensor 72, and the transmitter section 73T of the image sensor 73 through the three control signal lines.

FIG. 20 is a diagram illustrating a configuration example of the transmitter section 72T of the image sensor 72. The transmitter section 72T includes the driver 21 and a controller 74.

The driver 21 outputs the data signal SD in a case where the control signal S72 is active. In other words, the control signal S72 corresponds to the output enable signal EN according to the above-described first embodiment. In addition, in a case where the control signal S72 is inactive, the driver 21 makes the output impedance high.

The controller 74 turns on the switches 24 and 25 in a case where one of the control signals S71 and S73 is active, and turns off the switches 24 and 25 in other cases. Further, the controller 74 forcibly turns off the switches 24 and 25 irrespective of the control signals S71 and S73 in the case where the termination control signal Toff is active.

In the transmitter section 72T, the termination control signal Toff is set to active because the transmitter section 72T is not coupled to the one end or the other end of the bus 100 as illustrated in FIG. 19. This forcibly disables the termination resistor (the resistor 26) in the transmitter section 72T.

Hereinbefore, although the transmitter section 72T of the image sensor 72 has been described as an example, the same applies to the transmitter section 73T of the image sensor 73. The driver 21 of the transmitter section 73T outputs the data signal SD in the case where the control signal S73 is active. In addition, the controller 74 of the transmitter section 73T turns on the switches 24 and 25 in the case where one of the control signals S71 and S72 is active, and turns off the switches 24 and 25 in other cases.

In the transmitter section 73T, the termination control signal Toff is set to inactive because the transmitter section 73T is coupled to the other end of the bus 100 as illustrated in FIG. 19. As a result, in the transmitter section 73T, the termination resistor (the resistor 26) is enabled in the case where one of the control signals S71 and S72 is active, and the termination resistor (the resistor 26) is disabled in other cases.

FIG. 21 is a diagram illustrating a configuration example of the transceiver section 78T of the application processor 78. The transceiver section 78T includes a communication controller 75 and a controller 76.

The communication controller 75 controls communication in the bus system 6. More specifically, the communication controller 75 generates the control signals S71 to S73 and generates the output enable signal EN. Further, the communication controller 75 supplies the control signals S71 to S73 to each of the display section 71 and the image sensors 72 and 73, and supplies the output enable signal EN to the driver 21. This allows the communication controller 75 to control communication in the bus system 6.

The controller 76 turns on the switches 24 and 25 in a case where one of the control signals S71 to S73 is active and the output enable signal EN is inactive, and turns off the switches 24 and 25 in other cases. Further, the controller 76 forcibly turns off the switches 24 and 25 irrespective of the control signals S71 to S73 and the output enable signal EN in the case where the termination control signal Toff is active.

In the transceiver section 78T, the termination control signal Toff is set to active because the transceiver section 78T is not coupled to the one end or the other end of the bus 100 as illustrated in FIG. 19. This forcibly disables the termination resistor (the resistor 26) in the transceiver section 78T.

FIG. 22 is a diagram illustrating a configuration example of the receiver section 71R of the display section 71. The receiver section 71R includes a controller 77. The controller 77 turns on the switches 34 and 35 in a case where one of the control signals S71 to S73 is active, and turns off the switches 34 and 35 in other cases. Further, the controller 77 forcibly turns off the switches 34 and 35 irrespective of the control signals S71 to S73 in the case where the termination control signal Toff is active.

In the receiver section 71R, the termination control signal Toff is set to inactive because the receiver section 71R is coupled to the one end of the bus 100 as illustrated in FIG. 19. As a result, in the receiver section 71R, the termination resistor (the resistor 36) is enabled in the case where one of the control signals S71 to S73 is active, and the termination resistor (the resistor 36) is disabled in other cases.

Figure 23:
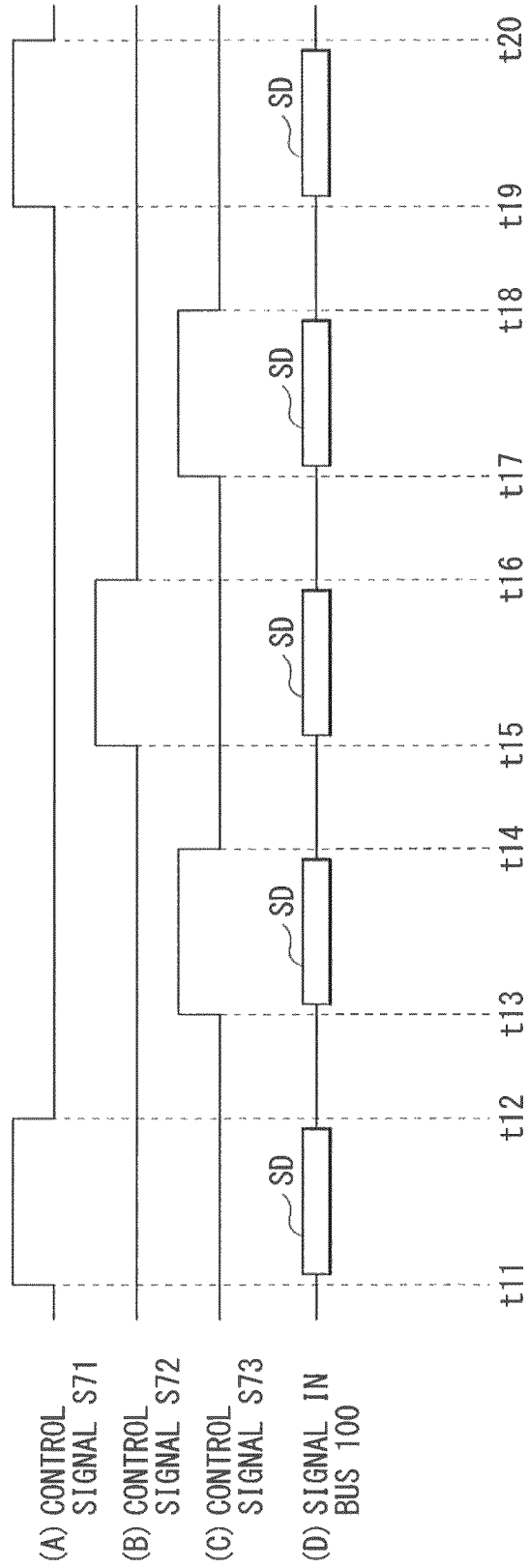
FIG. 23 is a timing diagram illustrating an operation example of the bus system illustrated in FIG. 19.

FIG. 23 is a diagram illustrating an example of communication operation in the bus system 6, where (A) illustrates a waveform of the control signal S71, (B) illustrates a waveform of the control signal S72, (C) illustrates a waveform of the control signal S73, and (D) illustrates a waveform of the signal in the bus 100. FIGS. 24A to 24D are diagrams illustrating the operation states of the bus system 6 in various periods. Note that illustration of the control signals S71 to S73 is omitted in FIGS. 24A to 24D.

First, as illustrated in FIG. 23, the transceiver section 78T of the application processor 78 changes the control signal S71 from a low level to a high level (active) at timing t11 (FIG. 23(A)). The display section 71 grasps that the display section 71 itself should receive the data signal SD (the image data) on the basis of the control signal S71. In addition, the transceiver section 78T of the application processor 78 transmits the data signal SD (the image data) in a period from timing t11 to timing t12, and the receiver section 71R of the display section 71 receives the data signal SD (FIG. 23(D)).

At this time, in the receiver section 71R coupled to the one end of the bus 100, the termination resistor (the resistor 36) is enabled because the control signal S71 is active, as illustrated in FIG. 24A. Further, in the transmitter section 73T coupled to the other end of the bus 100, the termination resistor (the resistor 26) is enabled because the control signal S71 is active. In other words, the transmitter section 73T enables the termination resistor in spite of not transmitting the data signal SD.

Next, the transceiver section 78T of the application processor 78 changes the control signal S71 from the high level to the low level (inactive) at timing t12 (FIG. 23(A)). Therefore, the control signals S71 to S73 become the low level (inactive) in a period from timing t12 to timing t13. As a result, as illustrated in FIG. 24B, the termination resistor (the resistor 36) is disabled in the receiver section 71R coupled to the one end of the bus 100, and the termination resistor (the resistor 26) is disabled in the transmitter section 73T coupled to the other end of the bus 100.

Next, as illustrated in FIG. 23, the transceiver section 78T of the application processor 78 changes the control signal S73 from the low level to the high level (active) at timing t13 (FIG. 23(C)). The image sensor 73 grasps that the image sensor 73 itself should transmit the data signal SD (the imaging data) on the basis of the control signal S73. The transmitter section 73T of the image sensor 73 then transmits the data signal SD (the imaging data) in a period from timing t13 to timing t14, and the transceiver section 78T of the application processor 78 receives the data signal SD (FIG. 23(D)).

At this time, as illustrated in FIG. 24C, in the receiver section 71R coupled to the one end of the bus 100, the termination resistor (the resistor 36) is enabled because the control signal S73 is active. In other words, the receiver section 71R enables the termination resistor in spite of not receiving the data signal SD. In addition, in the transmitter section 73T coupled to the other end of the bus 100, the termination resistor (the resistor 26) is disabled because both of the control signals S71 and S72 are inactive. In other words, in the transmitter section 73T, the termination resistor (the resistor 26) is disabled because the output impedance of the driver 21 functions as the output termination resistor.

Next, the transceiver section 78T of the application processor 78 changes the control signal S73 from the high level to the low level (inactive) at timing t14 (FIG. 23(C)). As a result, in a period from timing t14 to timing t15, the termination resistor (the resistor 36) is disabled in the receiver section 71R coupled to the one end of the bus 100, and the termination resistor (the resistor 26) is disabled in the transmitter section 73T coupled to the other end of the bus 100, as illustrated in FIG. 24B.

Next, as illustrated in FIG. 23, the transceiver section 78T of the application processor 78 changes the control signal S72 from the low level to the high level (active) at timing t15 (FIG. 23(B)). The image sensor 72 grasps that the image sensor 72 itself should transmit the data signal SD (the imaging data) on the basis of the control signal S72. The transmitter section 72T of the image sensor 72 then transmits the data signal SD (the imaging data) in a period from timing t15 to timing t16, and the transceiver section 78T of the application processor 78 receives the data signal SD (FIG. 23(D)).

At this time, in the receiver section 71R coupled to the one end of the bus 100, the termination resistor (the resistor 36) is enabled because the control signal S72 is active, as illustrated in FIG. 24D. In other words, the receiver section 71R enables the termination resistor in spite of not receiving the data signal SD. In addition, in the transmitter section 73T coupled to the other end of the bus 100, the termination resistor (the resistor 26) is enabled because the control signal S72 is active. In other words, the transmitter section 73T enables the termination resistor in spite of not transmitting the data signal SD.

Next, the transceiver section 78T of the application processor 78 changes the control signal S72 from the high level to the low level (inactive) at timing t16 (FIG. 23(B)). As a result, in a period from timing t16 to timing t17, the termination resistor (the resistor 36) is disabled in the receiver section 71R coupled to the one end of the bus 100, and the termination resistor (the resistor 26) is disabled in the transmitter section 73T coupled to the other end of the bus 100, as illustrated in FIG. 24B.

As mentioned above, since the communication is controlled with use of the control signal lines in the bus system 6, it is possible to simplify the configuration. In other words, in the case where the communication is controlled with use of the bus 100 as with, for example, the first embodiment, the circuit may become complicated because the bus 100 transmits the control data in addition to the imaging data and the image data. In contrast, since the communication is controlled with use of the control signal lines in the bus system 6, the bus 100 does not transmit the control data, which makes it possible to simplify the configuration.

In addition, in the bus system 6, since the bus 100 does not transmit the control data as mentioned above, it is possible to enhance usage efficiency of the bus 100.

As mentioned above, in the present embodiment, since the communication is controlled with use of the control signal lines, it is possible to simplify the configuration and to enhance usage efficiency of the bus. Other effects are similar to those in the above-described first embodiment.

[Modification 3-1]

In the above-described embodiment, the control signal lines that transmit the control signals S71 to S73 are provided in addition to the bus 100; however, the configuration is not limited thereto. Other control signal lines that allow the application processor to give an instruction of a communication band, resolution of the image, etc. to the devices may be further provided. As an interface that transmits such a control signal, for example, an inter-integrated circuit ($I^2C$) may be usable.

[Modification 3-2]

Any of the above-described modifications 1-1 to 1-3 of the first embodiment may be applied to the bus system 6 according to the above-described embodiment.

4. Fourth Embodiment

Next, a smartphone 7 including a bus system according to a fourth embodiment is described. The present embodiment controls communication with use of one control signal line. Note that components substantially same as those of the smartphone 5 according to the above-described third embodiment are denoted by the same reference numerals, and description of such components is appropriately omitted.

FIG. 25 is a diagram illustrating a configuration example of the smartphone 7. The smartphone 7 includes a display section 81, image sensors 82 and 83, the bus 100, and an application processor 88. The display section 81 and the image sensors 82 and 83 perform communication on the basis of a control signal S80. The application processor 88 supplies the control signal S80 to the display section 81 and the image sensors 82 and 83. The bus 100 configures a bus system 8, together with the display section 81, the image sensors 82 and 83, and the application processor 88.

FIG. 26 is a diagram illustrating a configuration example of the bus system 8. The bus system 8 is configured by coupling the display section 81 to one end of the bus 100, and coupling the image sensor 83 to the other end of the bus 100. The display section 81 includes a receiver section 81R. The application processor 88 includes a transceiver section 88T. The image sensor 82 includes a transmitter section 82T. The image sensor 83 includes a transmitter section 83T.

Further, the transceiver section 88T of the application processor 88 supplies the control signal S80 to the receiver section 81R of the display section 81, the transmitter section 82T of the image sensor 82, and the transmitter section 83T of the image sensor 83 through the one control signal line.

FIG. 27 is a diagram illustrating a configuration example of the transmitter section 82T of the image sensor 82. The transmitter section 82T includes an enable signal generator 131 and a controller 132.

The enable signal generator 131 generates the output enable signal EN and a signal S132 on the basis of the control signal S80. Specifically, as described later, in a case where a pulse appearing in the control signal S80 has a predetermined pulse width PW2, the enable signal generator 131 determines that the transmitter section 82T should transmit the data signal SD, and makes the output enable signal EN active during a predetermined period. In addition, in a case where the pulse appearing in the control signal S80 does not have the pulse width PW2, the enable signal generator 131 determines that a section other than the transmitter section 82T transmits the data signal SD, and makes the signal S132 active during a predetermined period.

The controller 132 turns on the switches 24 and 25 in a case where the signal S132 is active, and turns off the switches 24 and 25 in other cases. Further, the controller 132 forcibly turns off the switches 24 and 25 irrespective of the signal S132 in the case where the termination control signal Toff is active.

In the transmitter section 82T, the termination control signal Toff is set to active because the transmitter section 82T is not coupled to the one end or the other end of the bus 100 as illustrated in FIG. 26. This forcibly disables the termination resistor (the resistor 26) in the transmitter section 82T.

Hereinbefore, although the transmitter section 82T of the image sensor 82 has been described as an example, the same applies to the transmitter section 83T of the image sensor 83. In a case where the pulse appearing in the control signal S80 has a predetermined pulse width PW3, the enable signal generator 131 of the transmitter section 83T determines that the transmitter section 83T should transmit the data signal SD, and makes the output enable signal EN active during a predetermined period. In addition, in a case where the pulse appearing in the control signal S80 does not have the pulse width PW3, the enable signal generator 131 of the transmitter section 83T determines that a section other than the transmitter section 83T transmits the data signal SD, and makes the signal S132 active during a predetermined period.

In the transmitter section 83T, the termination control signal Toff is set to inactive because the transmitter section 83T is coupled to the other end of the bus 100 as illustrated in FIG. 26. As a result, in the transmitter section 83T, the termination resistor (the resistor 26) is enabled in the case where the signal S132 is active, and the termination resistor (the resistor 26) is disabled in other cases.

FIG. 28 is a diagram illustrating a configuration example of the transceiver section 88T of the application processor 88. The transceiver section 88T includes a communication controller 133 and a controller 134.

The communication controller 133 generates the control signal S80, and generates the output enable signal EN and a signal S134. Specifically, the communication controller 133 generates the control signal S80 that includes a plurality of pulses different in pulse width from one another. In addition, the communication controller 133 makes the output enable signal EN active in a period in which the transceiver section 88T should transmit the data signal SD, and makes the signal S134 active in a period in which a section other than the transceiver section 88T should transmit the data signal SD.

The controller 134 turns on the switches 24 and 25 in a case where the signals S134 is active, and turns off the switches 24 and 25 in other cases. Further, the controller 134 forcibly turns off the switches 24 and 25 irrespective of the signal S134 in the case where the termination control signal Toff is active.

In the transceiver section 88T, the termination control signal Toff is set to active because the transceiver section 88T is not coupled to the one end or the other end of the bus 100 as illustrated in FIG. 26. This forcibly disables the termination resistor (the resistor 26) in the transceiver section 88T.

FIG. 29 is a diagram illustrating a configuration example of the receiver section 81R of the display section 81. The receiver section 81R includes an enable signal generator 135 and a controller 136.

The enable signal generator 135 generates an input enable signal ENI and a signal S136 on the basis of the control signal S80. Specifically, as described later, in a case where a pulse appearing in the control signal S80 has a predetermined pulse width PW1, the enable signal generator 135 determines that the receiver section 81R should receive the data signal SD, and makes the input enable signal ENI active during a predetermined period. In addition, in a case where the pulse appears in the control signal S80, the enable signal generator 135 determines that the data signal SD is transferred by the bus 100, and makes the signal S136 active during a predetermined period.

The controller 136 turns on the switches 24 and 25 in a case where the signal S136 is active, and turns off the switches 24 and 25 in other cases. Further, the controller 132 forcibly turns off the switches 24 and 25 irrespective of the signal S132 in the case where the termination control signal Toff is active.

In the receiver section 81R, the termination control signal Toff is set to inactive because the receiver section 81R is coupled to the one end of the bus 100 as illustrated in FIG. 26. As a result, in the receiver section 81R, the termination resistor (the resistor 36) is enabled in the case where the signal S136 is active, and the termination resistor (the resistor 36) is disabled in other cases.

Figure 30:
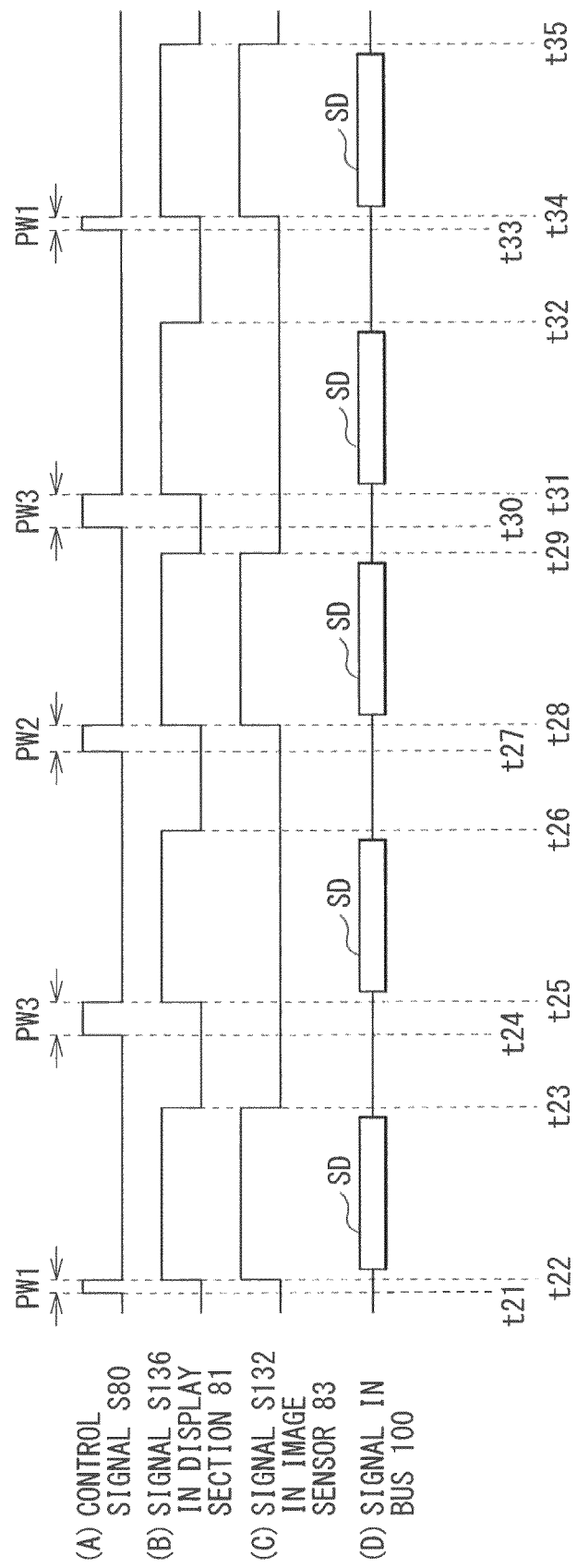
FIG. 30 is a timing diagram illustrating an operation example of the bus system illustrated in FIG. 26.

FIG. 30 is a diagram illustrating an example of communication operation in the bus system 8, where (A) illustrates a waveform of the control signal S80, (B) illustrates a waveform of the signal S136 in the display section 81, (C) illustrates a waveform of the signal S132 in the image sensor 83, and (D) illustrates a waveform of the signal in the bus 100.

The transceiver section 88T of the application processor 88 first sets the control signal S80 to a high level in a period from timing t21 to timing t22 (FIG. 30(A)). This results in a pulse having the pulse width PW1 in the control signal S80. The enable signal generator 135 of the display section 81 makes the input enable signal ENI and the signal S136 active at timing t22 on the basis of the pulse width PW1 of the pulse (FIG. 30(B)). The display section 81 grasps that the display section 81 itself should receive the data signal SD (the image data) on the basis of the input enable signal ENI. In addition, the enable signal generator 131 of the image sensor 83 makes the signal S132 active at timing t22 on the basis of the pulse width PW1 of the pulse (FIG. 30(C)). The transceiver section 88T of the application processor 88 then transmits the data signal SD (the image data) in a period from timing t22 to timing t23, and the receiver section 81R of the display section 81 receives the data signal SD (FIG. 30(D)).

At this time, in the receiver section 81R coupled to the one end of the bus 100, the termination resistor (the resistor 36) is enabled because the signal S136 is active, as with the above-described third embodiment (FIG. 24A). In addition, in the transmitter section 83T coupled to the other end of the bus 100, the termination resistor (the resistor 26) is enabled because the signal S132 is active. In other words, the transmitter section 83T enables the termination resistor in spite of not transmitting the data signal SD.

Next, at timing t23 at which a predetermined time has been elapsed from timing t22, the enable signal generator 135 of the display section 81 makes the input enable signal ENI and the signal S136 inactive (FIG. 30(B)), and the enable signal generator 131 of the image sensor 83 makes the signal S132 inactive (FIG. 30(C)). As a result, in a period from timing t23 to timing t25, the termination resistor (the resistor 36) is disabled in the receiver section 81R coupled to the one end of the bus 100, and the termination resistor (the resistor 26) is disabled in the transmitter section 83T coupled to the other end of the bus 100, as with the above-described third embodiment (FIG. 24B).

Next, the transceiver section 88T of the application processor 88 sets the control signal S80 to the high level in a period from timing t24 to timing t25. This results in a pulse having the pulse width PW3 in the control signal S80. The enable signal generator 131 of the image sensor 83 makes the output enable signal EN active and keeps the signal S132 inactive at timing t25 on the basis of the pulse width PW3 of the pulse (FIG. 30(C)). The image sensor 83 grasps that the image sensor 83 itself should transmit the data signal SD (the imaging data) on the basis of the output enable signal EN. In addition, the enable signal generator 135 of the display section 81 makes the signal S136 active at timing t25 on the basis of the pulse width PW3 of the pulse (FIG. 30(B)). The transmitter section 83T of the image sensor 83 then transmits the data signal SD (the imaging data) in a period from timing t25 to timing t26, and the transceiver section 88T of the application processor 88 receives the data signal SD (FIG. 30(D)).

At this time, in the receiver section 81R coupled to the one end of the bus 100, the termination resistor (the resistor 36) is enabled because the signal S136 is active, as with the above-described third embodiment (FIG. 24C). In other words, the receiver section 81R enables the termination resistor in spite of not receiving the data signal SD. In addition, in the transmitter section 83T coupled to the other end of the bus 100, the termination resistor (the resistor 26) is disabled because the signal S132 is inactive. In other words, in the transmitter section 83T, the termination resistor (the resistor 26) is disabled because the output impedance of the driver 21 functions as the output termination resistor.

Next, at timing t26 at which a predetermined time has been elapsed from timing t25, the enable signal generator 135 of the display section 81 makes the signal S136 inactive (FIG. 30(B)), and the enable signal generator 131 of the image sensor 83 makes the output enable signal EN inactive. As a result, in a period from timing t26 to timing t28, the termination resistor (the resistor 36) is disabled in the receiver section 81R coupled to the one end of the bus 100, and the termination resistor (the resistor 26) is disabled in the transmitter section 83T coupled to the other end of the bus 100, as with the above-described third embodiment (FIG. 24B).

Next, the transceiver section 88T of the application processor 88 sets the control signal S80 to the high level in a period from timing t27 to timing t28. This results in a pulse having the pulse width PW2 in the control signal S80. The enable signal generator 131 of the image sensor 82 makes the output enable signal EN active at timing t28 on the basis of the pulse width PW2 of the pulse. The image sensor 82 grasps that the image sensor 82 itself should transmit the data signal SD (the imaging data) on the basis of the output enable signal EN. In addition, the enable signal generator 135 of the display section 81 makes the signal S136 active at timing t28 on the basis of the pulse width PW2 of the pulse (FIG. 30 (B)), and the enable signal generator 131 of the image sensor 83 makes the signal S132 active (FIG. 30(C)). The transmitter section 82T of the image sensor 82 then transmits the data signal SD (the imaging data) in a period from timing t28 to timing t29, and the transceiver section 88T of the application processor 88 receives the data signal SD (FIG. 30(D)).

At this time, in the receiver section 81R coupled to the one end of the bus 100, the termination resistor (the resistor 36) is enabled because the signal S136 is active, as with the above-described third embodiment (FIG. 24D). In other words, the receiver section 81R enables the termination resistor in spite of not receiving the data signal SD. In addition, in the transmitter section 83T coupled to the other end of the bus 100, the termination resistor (the resistor 26) is enabled because the signal S132 is active. In other words, the transmitter section 83T enables the termination resistor in spite of not transmitting the data signal SD.

Next, at timing t29 at which a predetermined time has been elapsed from timing t28, the enable signal generator 135 of the display section 81 makes the signal S136 inactive (FIG. 30(B)), and the enable signal generator 131 of the image sensor 83 makes the signal S132 inactive (FIG. 30(C)). As a result, in a period from timing t29 to timing t31, the termination resistor (the resistor 36) is disabled in the receiver section 81R coupled to the one end of the bus 100, and the termination resistor (the resistor 26) is disabled in the transmitter section 83T coupled to the other end of the bus 100, as with the above-described third embodiment (FIG. 24B).

As mentioned above, in the bus system 8, since communication is controlled with use of the plurality of pulses different in the pulse width from one another, it is possible to reduce the number of the control signal lines and to accordingly simplify the configuration.

As mentioned above, in the present embodiment, since communication is controlled with use of the plurality of pulses different in the pulse width from one another, it is possible to simplify the configuration. Other effects are similar to those in the above-described third embodiment.

[Modification 4-1]

In the above-described embodiment, communication is controlled on the basis of the pulse width; however, the configuration is not limited thereto. Alternatively, for example, communication may be controlled on the basis of the number of pulses, as illustrated in FIG. 31.

[Modification 4-2]

Any of the above-described modifications of the third embodiment may be applied to the bus system 8 according to the above-described embodiment.

5. Fifth Embodiment

Next, a smartphone 9 including a bus system according to a fifth embodiment is described. The present embodiment controls communication with use of a control bus that is provided separately from the bus 100. Note that components substantially same as those of the smartphone 5 according to the above-described third embodiment are denoted by the same reference numerals, and description of such components is appropriately omitted.

FIG. 32 is a diagram illustrating a configuration example of the smartphone 9. The smartphone 9 includes a display section 91, image sensors 92 and 93, the bus 100, and an application processor 98. The display section 91, the image sensors 92 and 93, and the application processor 98 perform exchange of a control packet PCT including control data, through a control bus 110. The control packet PCT is used, for example, in a case where the application processor 98 gives instructions of communication timing, a communication band, resolution of an image, etc. to each of the devices.

The control bus 110 includes two buses. One of the two buses transmits a data signal D90 and the other bus transmits a clock signal C90 in this example. The control bus 110 may use, for example, an I²C.

FIG. 33 is a diagram illustrating a configuration example of the control packet PCT. The control packet PCT includes a header part 111, an address part 112, and a data part 113. The address part 112 includes two addresses ADR1 and ADR2. The address ADR1 is a device address that specifies one of the display section 91, the image sensors 92 and 93, and the application processor 98. The address ADR2 is an internal address that specifies one of a plurality of registers included in the respective devices.

The bus 100 configures a bus system 10, together with the display section 91, the image sensors 92 and 93, and the application processor 98.

FIG. 34 is a diagram illustrating a configuration example of the bus system 10. The bus system 10 is configured by coupling the display section 91 to one end of the bus 100, and coupling the image sensor 93 to the other end of the bus 100. The display section 91 includes a receiver section 91R. The application processor 98 includes a transceiver section 98T. The image sensor 92 includes a transmitter section 92T. The image sensor 93 includes a transmitter section 93T. The receiver section 91R, the transceiver section 98T, and the transmitter sections 92T and 93T perform exchange of the control packet PCT through the control bus 110.

FIG. 35 is a diagram illustrating a configuration example of the transmitter section 92T of the image sensor 92. The transmitter section 92T includes a communicator 121 and a register section 122. The communicator 121 performs exchange of the control packet PCT with other devices through the control bus 110. The resistor section 122 temporarily holds various settings of the image sensor 92. The register section 122 includes registers R91, R92, and R93. In a case where the receiver section 91R of the display section 91 should receive the data signal SD, "1" is stored in the register R91. In other cases, "0" is stored in the register R91. In a case where the transmitter section 92T of the image sensor 92 should transmit the data signal SD, "1" is stored in the register R92. In other cases. "0" is stored in the register R92. In a case where the transmitter section 93T of the image sensor 93 should transmit the data signal SD, "1" is stored in the register R93. In other cases, "0" is stored in the register R93. Moreover, the register section 122 has a function of making the output enable signal EN active in a case where the data stored in the register R92 is "1", and making the signal S132 active in a case where one of the data stored in the register R91 and the data stored in the register R93 is "1".

In the transmitter section 92T, the termination control signal Toff is set to active because the transmitter section 92T is not coupled to the one end or the other end of the bus 10) as illustrated in FIG. 34. This forcibly disables the termination resistor (the resistor 26) in the transmitter section 92T.

Hereinbefore, although the transmitter section 92T of the image sensor 92 has been described as an example, the same applies to the transmitter section 93T of the image sensor 93. The transmitter section 93T includes a register section 123. The register section 123 also has a function of outputting, as the output enable signal EN, the data stored in the register R93, and making the signal S132 active in a case where one of the data stored in the register R91 and the data stored in the register R92 is "1".

In the transmitter section 93T, the termination control signal Toff is set to inactive because the transmitter section 93T is coupled to the other end of the bus 100 as illustrated in FIG. 34. As a result, in the transmitter section 93T, the termination resistor (the resistor 26) is enabled in the case where the signal S132 is active, and the termination resistor (the resistor 26) is disabled in other cases.

FIG. 36 is a diagram illustrating a configuration example of the transceiver section 98T of the application processor 98. The transceiver section 98T includes a communicator 124 and a communication controller 125. The communicator 124 performs exchange of the control packet PCT with other devices through the control bus 110. The communication controller 125 generates the control packet PCT and generates the output enable signal EN and the signal S134. At this time, the communication controller 125 makes the output enable signal EN active in a period in which the transceiver section 98T should transmit the data signal SD, and makes the signal S134 active in a period in which a section other than the transceiver section 98T should transmit the data signal SD.

In the transceiver section 98T, the termination control signal Toff is set to active because the transceiver section 98T is not coupled to the one end or the other end of the bus 100 as illustrated in FIG. 34. This forcibly disables the termination resistor (the resistor 26) in the transceiver section 98T.

FIG. 37 is a diagram illustrating a configuration example of the receiver section 91R of the display section 91. The receiver section 91R includes a communicator 126 and a register section 127. The communicator 126 performs exchange of the control packet PCT with other devices through the control bus 110. The resistor section 127 temporarily holds various settings of the display section 91. The register section 127 includes registers R91, R92, and R93. In addition, the register section 127 has a function of making the input enable signal ENI active in the case where the data stored in the register R91 is "1", and making the signal S136 active in the case where one of the data stored in the register R91 to R93 is "1".

In the receiver section 91R, the termination control signal Toff is set to inactive because the receiver section 91R is coupled to the one end of the bus 100 as illustrated in FIG. 34. As a result, in the receiver section 91R, the termination resistor (the resistor 36) is enabled in the case where the signal S136 is active, and the termination resistor (the resistor 36) is disabled in other cases.

FIG. 38 is a diagram illustrating an example of communication operation in the bus system 8, where (A) illustrates the data of the register R91, (B) illustrates the data of the register R92, (C) illustrates the data of the register R93, (D) illustrates a waveform of the signal S136 in the display section 91, (E) illustrates a waveform of the signal S132 in the image sensor 93, and (F) illustrates a waveform of the signal in the bus 100.

First, the transceiver section 98T of the application processor 98 transmits the control packet PCT that includes the data "1", "0", and "0" of the respective registers R91, R92, and R93 through the control bus 110 at timing t61 (FIGS. 38(A) to 38(C)). The register section 127 of the display section 91 stores the data in the registers R91, R92, and R93 and makes the input enable signal ENI and the signal S136 active, on the basis of the control packet PCT (FIG. 38(D)). The display section 91 grasps that the display section 91 itself should receive the data signal SD (the image data) on the basis of the input enable signal ENI. Further, the register section 123 of the image sensor 93 stores the data in the registers R91, R92, and R93 and makes the signal S132 active, on the basis of the control packet PCT (FIG. 38(E)).

The transceiver section 98T of the application processor 98 then transmits the data signal SD (the image data) in a period from timing t61 to timing t62, and the receiver section 91R of the display section 91 receives the data signal SD (FIG. 38(F)).

At this time, in the receiver section 91R coupled to the one end of the bus 100, the termination resistor (the resistor 36) is enabled because the signal S136 is active, as with the above-described third embodiment (FIG. 24A). In addition, in the transmitter section 93T coupled to the other end of the bus 100, the termination resistor (the resistor 26) is enabled because the signal S132 is active. In other words, the transmitter section 93T enables the termination resistor in spite of not transmitting the data signal SD.

Next, the transceiver section 98T of the application processor 98 transmits the control packet PCT that includes the data "0", "0", and "0" of the respective registers R91, R92, and R93 through the control bus 110 at timing t62. The register section 127 of the display section 91 stores the data in the registers R91, R92, and R93 and makes the input enable signal ENI and the signal S136 inactive, on the basis of the control packet PCT (FIG. 38(D)). Further, the register section 123 of the image sensor 93 stores the data in the registers R91, R92, and R93 and makes the signal S132 inactive, on the basis of the control packet PCT (FIG. 38(E)). As a result, in a period from timing t62 to timing t63, the termination resistor (the resistor 36) is disabled in the receiver section 91R coupled to the one end of the bus 100, and the termination resistor (the resistor 26) is disabled in the transmitter section 93T coupled to the other end of the bus 100, as with the above-described third embodiment (FIG. 24B).

Next, the transceiver section 98T of the application processor 98 transmits the control packet PCT that includes the data "0", "0", and "1" of the respective registers R91, R92, and R93 through the control bus 110 at timing t63. The register section 123 of the image sensor 93 stores the data in the registers R91, R92, and R93, makes the output enable signal EN active, and keeps the signal S132 inactive, on the basis of the control packet PCT (FIG. 38(E)). The image sensor 93 grasps that the image sensor 93 itself should transmit the data signal SD (the imaging data) on the basis of the output enable signal EN. Further, the register section 127 of the display section 91 stores the data in the registers R91, R92, and R93 and makes the signal S136 active, on the basis of the control packet PCT (FIG. 38(D)). The transmitter section 93T of the image sensor 93 then transmits the data signal SD (the imaging data) in a period from timing t63 to timing t64, and the transceiver section 98T of the application processor 98 receives the data signal SD (FIG. 38(F)).

At this time, in the receiver section 91R coupled to the one end of the bus 100, the termination resistor (the resistor 36) is enabled because the signal S136 is active, as with the above-described third embodiment (FIG. 24C). In other words, the receiver section 91R enables the termination resistor in spite of not receiving the data signal SD. In addition, in the transmitter section 93T coupled to the other end of the bus 100, the termination resistor (the resistor 26) is disabled because the signal S132 is inactive. In other words, in the transmitter section 93T, the termination resistor (the resistor 26) is disabled because the output impedance of the driver 21 functions as the output termination resistor.

Next, the transceiver section 98T of the application processor 98 transmits the control packet PCT that includes the data "0", "0", and "0" of the respective registers R91, R92, and R93 through the control bus 110 at timing t64. The register section 127 of the display section 91 stores the data in the registers R91, R92, and R93 and makes the signal S136 inactive, on the basis of the control packet PCT (FIG. 38(D)). Further, the register section 123 of the image sensor 93 stores the data in the registers R91, R92, and R93 on the basis of the control packet PCT, and makes the output enable signal EN inactive on the basis of the data. As a result, in a period from timing t64 to timing t65, the termination resistor (the resistor 36) is disabled in the receiver section 91R coupled to the one end of the bus 100, and the termination resistor (the resistor 26) is disabled in the transmitter section 93T coupled to the other end of the bus 100, as with the above-described third embodiment (FIG. 24B).

Next, the transceiver section 98T of the application processor 98 transmits the control packet PCT that includes the data "0", "1", and "0" of the respective registers R91, R92, and R93 through the control bus 110 at timing t65. The register section 122 of the image sensor 92 stores the data in the registers R91, R92, and R93 and makes the output enable signal EN active, on the basis of the control packet PCT. The image sensor 92 grasps that the image sensor 92 itself should transmit the data signal SD (the imaging data) on the basis of the output enable signal EN. Further, the register section 127 of the display section 91 stores the data in the registers R91, R92, and R93 and makes the signal S136 active, on the basis of the control packet PCT (FIG. 38(D)). Furthermore, the register section 123 of the image sensor 93 stores the data in the registers R91, R92, and R93 and makes the signal S132 active, on the basis of the control packet PCT (FIG. 38(E)). The transmitter section 92T of the image sensor 92 then transmits the data signal SD (the imaging data) in a period from timing t65 to timing t66, and the transceiver section 98T of the application processor 98 receives the data signal SD (FIG. 38(F)).

At this time, in the receiver section 91R coupled to the one end of the bus 100, the termination resistor (the resistor 36) is enabled because the signal S136 is active, as with the above-described third embodiment (FIG. 24D). In other words, the receiver section 91R enables the termination resistor in spite of not receiving the data signal SD. In addition, in the transmitter section 93T coupled to the other end of the bus 100, the termination resistor (the resistor 26) is enabled because the signal S132 is active. In other words, the transmitter section 93T enables the termination resistor in spite of not transmitting the data signal SD.

Next, the transceiver section 98T of the application processor 98 transmits the control packet PCT that includes the data "0", "0", and "0" of the respective registers R91, R92, and R93 through the control bus 110 at timing t66. The register section 122 of the image sensor 92 stores the data in the registers R91, R92, and R93 and makes the output enable signal EN inactive, on the basis of the control packet PCT. Further, the register section 127 of the display section 91 stores the data in the registers R91, R92, and R93 and makes the signal S136 inactive, on the basis of the control packet PCT (FIG. 38(D)). Furthermore, the register section 123 of the image sensor 93 stores the data in the registers R91, R92, and R93 and makes the signal S132 inactive, on the basis of the control packet PCT (FIG. 38(E)). As a result, in a period from timing t66 to timing t67, the termination resistor (the resistor 36) is disabled in the receiver section 91R coupled to the one end of the bus 100, and the termination resistor (the resistor 26) is disabled in the transmitter section 93T coupled to the other end of the bus 100, as with the above-described third embodiment (FIG. 24B).

As mentioned above, it is possible to achieve effects similar to those of the bus system according to the third embodiment even in a case there the communication is controlled with use of the control bus provided separately from the bus 100.

6. Application Example

Next, an application example of the bus system according to any of the above-described embodiments and modifications is described.

FIG. 39 is a diagram illustrating an appearance of a smartphone to which the bus system according to any of the above-described embodiments and modifications is applied. The smartphone includes, for example, a display section 320 and a main body section 310. The smartphone includes the bus system according to any of the above-described embodiments and modifications.

The bus system according to any of the above-described embodiments and modifications is applicable to electronic apparatuses in every fields, for example, a digital camera, a video camera, and various types of wearable digital cameras such as an eyeglass type and a watch type, in addition to such a smartphone. In other words, the bus system according to any of the above-described embodiments and modifications is applicable to electronic apparatuses having a function of imaging an object, in every field.

Hereinbefore, although the technology has been described with referring to the embodiments, the modifications, and the application examples to electronic apparatuses, the technology is not limited thereto, and various modifications may be made.

For example, the two image sensors are coupled to the bus in each of the above-described embodiments; however, the number of image sensors is not limited thereto. Alternatively, for example, one or three or more image sensors may be coupled to the bus.

Further, for example, the bus 100 is configured with use of the two transmission paths 100P and 100N in the above-described first embodiment and the bus 400 is configured with use of the three transmission paths 400A to 400C in the above-described second embodiment; however, the number of transmission paths is not limited thereto. For example, the bus may be configured with use of one or four or more transmission paths.

Moreover, for example, the display section is coupled to the bus in each of the above-described embodiments; however, the configuration is not limited thereto, and the display section may not be coupled to the bus.

Note that the effects described in the present specification are illustrative and non-limiting. Effects achieved by the technology may be effects other than those described above.

It is to be noted that the technology may have the following configurations.

(1) A bus system, including:
three or more devices that include one or a plurality of imaging devices, and transmit or receive data signals in a time-division manner; and
a bus to which the three or more devices are coupled.

(2) The bus system according to (1), in which
the three or more devices each include a communicator coupled to the bus, and
a first communicator coupled to one end of the bus, among the communicators of the three or more devices, includes a first termination resistor that is settable to be enabled or disabled.

(3) The bus system according to (2), in which the first communicator includes a termination controller that controls the first termination resistor to be enabled in a period in which the data signal is transferred by the bus and the first communicator itself does not transmit and receive the data signal.

(4) The bus system according to (3), in which the termination controller controls the first termination resistor to be disabled in a period other than a period in which the data signal is transferred by the bus.

(5) The bus system according to (3) or (4), in which the termination controller determines, on a basis of an amplitude of a signal transferred by the bus, whether the signal transferred by the bus is the data signal.

(6) The bus system according to any one of (2) to (5), in which a second communicator coupled to the other end of the bus, among the communicators of the three or more devices, includes a second termination resistor that is settable to be enabled or disabled.

(7) The bus system according to any one of (2) to (6), further including a resistor that is inserted into a path between the bus and one or more of the communicators of the three or more devices.

(8) The bus system according to any one of (2) to (7), in which one communicator among the communicators of the three or more devices transmits a control signal in a first period among periods other than a period in which the data signal is transferred by the bus, the control signal having an amplitude different from an amplitude of the data signal.

(9) The bus system according to (8), in which the one communicator transmits control data as the data signal after the first period, the control data instructing an order of transmission and reception operation.

(10) The bus system according to (8) or (9), in which the one communicator transmits the control signal in a second period among the periods other than the period in which the data signal is transferred by the bus, the second period having a length different from a length of the first period.

(11) The bus system according to (10), in which each of the communicators other than the one communicator among the communicators of the three or more devices grasps a period in which each of the communicators itself should perform transmission and reception operation, on a basis of the control signal in the second period.

(12) The bus system according to any one of (2) to (4), further including a plurality of control signal lines that respectively correspond to a relevant one of the communicators other than the one communicator among the communicators of the three or more devices, in which
the one communicator supplies a control signal to each of the communicators other than the one communicator through corresponding one of the control signal lines, the control signal instructing a period in which corresponding one of the communicators other than the one communicator should transmit or receive the data signal.

(13) The bus system according to (12), in which
the control signal makes a transition between a first logic level and a second logic level, and
the one communicator sets the control signal to the first logic level in a period in which the one communicator should transmit or receive the data signal.

(14) The bus system according to any one of (2) to (4), further including a control signal line to which the communicators of the three or more devices are coupled, in which
one communicator among the communicators of the three or more devices supplies a control signal to each of the communicators other than the one communicator through the control signal line, the control signal instructing a period in which each of the communicators other than the one communicator should transmit or receive the data signal.

(15) The bus system according to (14), in which the control signal includes a pulse in a first period that corresponds to a period in which the data signal is transferred by the bus.

(16) The bus system according to (15), in which each of the communicators other than the one communicator among the communicators of the three or more devices grasps a period in which each of the communicators other than the one communicator itself should transmit or receive the data signal, on a basis of a pulse width of the pulse.

(17) The bus system according to (15), in which each of the communicators other than the one communicator among the communicators of the three or more devices grasps a period in which each of the communicators other than the one communicator itself should transmit or receive the data signal, on a basis of the number of pulses in the first period.

(18) The bus system according to (14), in which
the control signal includes a control packet, and
each of the communicators other than the one communicator among the communicators of the three or more devices grasps a period in which each of the communicators other than the one communicator itself should transmit or receive the data signal, on a basis of the control packet.

(19) The bus system according to any one of (2) to (18), in which the communicator of the one or the plurality of imaging devices transmits imaging data.

(20) The bus system according to (19), in which
the three or more devices include an application processor, and
a communicator of the application processor receives the imaging data.

(21) The bus system according to any one of (1) to (20), in which the bus includes two transmission paths.

(22) The bus system according to any one of (1) to (20), in which the bus includes three transmission paths.

(23) A communication device, including:
a driver;
a termination resistor that is settable to be enabled or disabled; and
a termination controller that controls the termination resistor to be enabled in a period in which an amplitude value of a signal at an output terminal of the driver is within a predetermined range, among periods other than a period in which the driver transmits a data signal.

(24) The communication device according to (23), in which the termination controller controls the termination resistor to be enabled or disabled on a basis of the amplitude value of the signal at the output terminal of the driver in the periods other than the period in which the driver transmits the data signal.

(25) The communication device according to (23) to (24), in which the termination controller controls the termination resistor to be disabled in the period in which the driver transmits the data signal.

(26) A communication device, including:
a receiver;
a termination resistor that is settable to be enabled or disabled; and
a termination controller that controls the termination resistor to be enabled in a period in which an amplitude value of a signal at an input terminal of the receiver is within a predetermined range, among periods other than a period in which the receiver receives a data signal.

(27) The communication device according to (26), in which the termination controller controls the termination resistor to be enabled or disabled on a basis of the amplitude value of the signal at the input terminal of the receiver in the periods other than the period in which the receiver receives the data signal.

This application is based upon and claims the benefit of priority of the Japanese Patent Application No. 2015-77328, filed on Apr. 6, 2015, and the Japanese Patent Application No. 2015-196644, filed on Oct. 2, 2015, both filed in the Japan Patent Office, the entire contents of these applications are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A bus system comprising:
three or more devices that include at least one imaging device, the three or more devices configured to transmit or receive a data signal in a time-division manner; and
a bus coupled to each of the three or more devices,
wherein the three or more devices each include a respective communicator coupled to the bus,
among respective communicators of the three or more devices, a first communicator coupled to a first end of the bus includes:
a receiver,
a first termination resistor connected across respective first and second inputs of the receiver, the first termination resistor being settable to be enabled or disabled,
a termination controller configured to control the first termination resistor to be enabled in a first period during which the data signal is transferred by the bus and the first communicator itself does not transmit and receive the data signal, and control the first termination resistor to be disabled in a period other than the first period,
wherein the termination controller controls the first termination resistor to be enabled regardless of whether the first communicator receives the data signal.

2. The bus system according to claim 1, wherein the termination controller controls the first termination resistor to be disabled in a period other than a period in which the data signal is transferred by the bus.

3. The bus system according to claim 1, wherein the termination controller determines, on a basis of an amplitude of a signal transferred by the bus, whether the signal transferred by the bus is the data signal.

4. The bus system according to claim 1, wherein a second communicator coupled to the other end of the bus, among the communicators of the three or more devices, includes a second termination resistor that is settable to be enabled or disabled.

5. The bus system according to claim 1, further comprising a resistor that is inserted into a path between the bus and one or more of the communicators of the three or more devices.

6. The bus system according to claim 1, wherein one communicator among the communicators of the three or more devices transmits a control signal in a first period among periods other than a period in which the data signal is transferred by the bus, the control signal having an amplitude different from an amplitude of the data signal.

7. The bus system according to claim 6, wherein the one communicator transmits control data as the data signal after the first period, the control data instructing an order of transmission and reception operation.

8. The bus system according to claim 6, wherein the one communicator transmits the control signal in a second period among the periods other than the period in which the data signal is transferred by the bus, the second period having a length different from a length of the first period.

9. The bus system according to claim 8, wherein each of the communicators other than the one communicator among the communicators of the three or more devices grasps a period in which each of the communicators itself should perform transmission and reception operation, on a basis of the control signal in the second period.

10. The bus system according to claim 1, further comprising a plurality of control signal lines that respectively correspond to a relevant one of the communicators other than the one communicator among the communicators of the three or more devices, wherein
the one communicator supplies a control signal to each of the communicators other than the one communicator through corresponding one of the control signal lines, the control signal instructing a period in which corresponding one of the communicators other than the one communicator should transmit or receive the data signal.

11. The bus system according to claim 10, wherein
the control signal makes a transition between a first logic level and a second logic level, and
the one communicator sets the control signal to the first logic level in a period in which the one communicator should transmit or receive the data signal.

12. The bus system according to claim 1, further comprising a control signal line to which the communicators of the three or more devices are coupled, wherein
one communicator among the communicators of the three or more devices supplies a control signal to each of the communicators other than the one communicator through the control signal line, the control signal instructing a period in which each of the communicators other than the one communicator should transmit or receive the data signal.

13. The bus system according to claim 12, wherein the control signal includes a pulse in the first period that corresponds to a period in which the data signal is transferred by the bus.

14. The bus system according to claim 13, wherein each of the communicators other than the one communicator among the communicators of the three or more devices grasps a period in which each of the communicators other than the one communicator itself should transmit or receive the data signal, on a basis of a pulse width of the pulse.

15. The bus system according to claim 13, wherein each of the communicators other than the one communicator among the communicators of the three or more devices grasps a period in which each of the communicators other than the one communicator itself should transmit or receive the data signal, on a basis of the number of pulses in the first period.

16. The bus system according to claim 12, wherein
the control signal includes a control packet, and
each of the communicators other than the one communicator among the communicators of the three or more devices grasps a period in which each of the communicators other than the one communicator itself should transmit or receive the data signal, on a basis of the control packet.

17. The bus system according to claim 1, wherein the communicator of the one or the plurality of imaging devices transmits imaging data.

18. The bus system according to claim 1, wherein
the three or more devices include an application processor, and
a communicator of the application processor receives the imaging data.

* * * * *